(12) United States Patent
Gu et al.

(10) Patent No.: US 11,295,129 B2
(45) Date of Patent: Apr. 5, 2022

(54) IRIS RECOGNITION DEVICE, MANUFACTURING METHOD THEREFOR AND APPLICATION THEREOF

(71) Applicant: NINGBO SUNNY OPOTECH CO., LTD., Ningbo (CN)

(72) Inventors: Yiwu Gu, Ningbo (CN); Mengjie Luo, Ningbo (CN); Xinke Tang, Ningbo (CN); Jiewei Xu, Ningbo (CN); Shixin Xu, Ningbo (CN); Lin Huang, Ningbo (CN)

(73) Assignee: NINGBO SUNNY OPOTECH CO., LTD., Zhejiang Province (CN)

(*) Notice: Subject to any disclaimer, the term of this patent is extended or adjusted under 35 U.S.C. 154(b) by 0 days.

(21) Appl. No.: 17/146,415

(22) Filed: Jan. 11, 2021

(65) Prior Publication Data

US 2021/0209360 A1 Jul. 8, 2021

Related U.S. Application Data

(63) Continuation of application No. 16/691,609, filed on Nov. 22, 2019, now Pat. No. 10,929,660, which is a continuation of application No. 16/188,322, filed on Nov. 13, 2018, now Pat. No. 10,534,959, which is a continuation of application No. 15/313,083, filed on Nov. 21, 2016, now Pat. No. 10,169,651.

(51) Int. Cl.
*H04N 5/33* (2006.01)
*G06K 9/00* (2022.01)
*G06K 9/20* (2006.01)
*H04N 5/225* (2006.01)

(52) U.S. Cl.
CPC ....... *G06K 9/00617* (2013.01); *G06K 9/0061* (2013.01); *G06K 9/00604* (2013.01); *G06K 9/209* (2013.01); *G06K 9/2027* (2013.01); *G06K 9/2036* (2013.01); *H04N 5/2256* (2013.01); *H04N 5/2257* (2013.01); *H04N 5/33* (2013.01); *G06K 9/00228* (2013.01); *G06K 9/00281* (2013.01); *G06K 9/00288* (2013.01)

(58) Field of Classification Search
None
See application file for complete search history.

(56) References Cited

U.S. PATENT DOCUMENTS

| | | | | |
|---|---|---|---|---|
| 2014/0379273 | A1* | 12/2014 | Petisce | G16H 15/00 702/19 |
| 2016/0012292 | A1* | 1/2016 | Perna | G06F 3/013 382/117 |
| 2016/0116979 | A1* | 4/2016 | Border | G06T 19/006 345/156 |
| 2017/0262472 | A1* | 9/2017 | Goldenberg | G06K 9/00295 |

* cited by examiner

*Primary Examiner* — Eileen M Adams
(74) *Attorney, Agent, or Firm* — Wenderoth, Lind & Ponack, L.L.P.

(57) ABSTRACT

The iris recognition device includes an iris camera module used for collecting iris characteristics of a user, and at least one fill light component used for providing a supplementary light source for the iris camera module. When the iris recognition device is used for collecting the iris characteristics of the user, the supplementary light source provided by the fill light component reduces reflective spots on the iris or make reflective spots in areas other than iris such as sclera and pupil, thereby improving precision of the collected iris characteristics of the user.

15 Claims, 38 Drawing Sheets

Provide an iris camera module and collect user iris characteristics using user's pupil as a substantially focal point;

Provide additional light source for user's binoculus region by at least one fill light component to form a uniform brightness on an iris region.

Capture the iris and facial characteristics of a user 500 by an iris and face recognition system 400 which is provided in an apparatus 302, and generate the identification information of the user 500;

Match the generated identification information of the user 500 with the identification information of the user 500 which is stored in an information base 3082 of an operating component 308;

When the operating component 308 judges that the match is successful, the operating component 308 controls the panel 3022 of the operating component 308 to be unlocked.

FIG.27

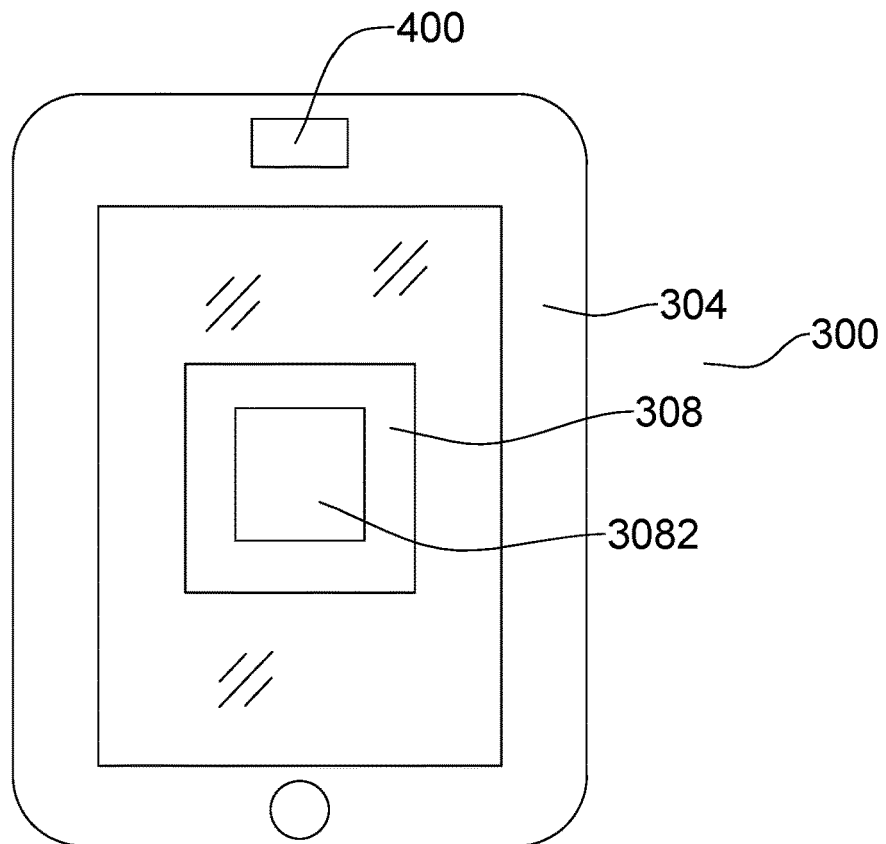

FIG.28

IRIS RECOGNITION DEVICE, MANUFACTURING METHOD THEREFOR AND APPLICATION THEREOF

CROSS REFERENCE OF RELATED APPLICATION

This is a Continuation application that claims the benefit of priority under 35U.S.C.§ 120 to a non-provisional application, application Ser. No. 16/691,609, filed Nov. 22, 2019, which is a Continuation application that claims the benefit of priority under 35U.S.C.§ 120 to a non-provisional application, application Ser. No. 16/188,322, filed Nov. 13, 2018, which is a Continuation application that claims the benefit of priority under 35U.S.C.§ 120 to a non-provisional application Ser. No. 15/313,083, filed Nov. 21, 2016, which is a non-provisional application that claims priority to international application number PCT/CN2015/079363, international filing date May 20, 2015. The afore-mentioned patent applications are hereby incorporated by reference in their entireties.

BACKGROUND OF THE PRESENT INVENTION

Field of Invention

The present invention relates to an optical imaging device, and more particularly to an iris recognition device, a manufacturing method therefor, and an application thereof.

Description of Related Arts

With the development of the Internet and its applications, identification technology and authentication methods have great significance for the user's information security.

The traditional identification technology is based on the development of touch technology and identifies the user's identity by a sensor sensing touching or pressing. However, the required software and logic which are in response to and perform the process of touching and pressing are complex, so that the system matching user information costs a longer time, and the accuracy of the matching results is not effectively guaranteed. In other words, the recognition technology based on the touch technology may has a wrong matching result, as a result, it not only brings unnecessary trouble to the user, but also is a threat to the user's information security.

Iris recognition technology is a bio identification technology. Iris is one of the most stable human biological characteristics and has unique characteristics s, which provides basic conditions for the development and wide application of iris recognition technology. When using iris recognition technology for user authentication, users do not need access to the sensor. Compared with the traditional identification technologies based on the development of touch technology, iris recognition technology has a greater reliability in the aspect of user authentication results.

However, the traditional iris recognition technology also has many problems to limit performances. On one hand, the traditional iris recognition technology has a low image quality to collect a user's iris characteristics, and can only be collected at a close range. Once the distance is relatively far, it cannot accurately capture the iris characteristics of the user, therefore, the practical value of the traditional iris recognition technology is not high.

On the other hand, the traditional use of iris recognition technology use monocular (left or right) iris characteristics s for processing, and the positioning and environmental requirements of shooting subject eyes are very high, resulting in the traditional iris recognition technology having more restrictive conditions of collecting users iris characteristics s, and resulting in not convenience enough to shoot users. More importantly, the collected monocular iris characteristics information by the traditional iris recognition technology is insufficient, which further limits the development of the traditional iris recognition technology.

SUMMARY OF THE PRESENT INVENTION

The invention is advantageous in that it provides an iris recognition device, a manufacturing method for the iris recognition device, and an application of the iris recognition device, wherein a fill light method of the iris recognition application is provided that, during the collection of iris characteristics of a user, the fill light method can reduce reflective spots on the iris or make reflective spots in areas other than iris such as sclera and pupil, thereby improving precision of the collected iris characteristics of the user.

Another advantage of the invention is to provide an iris recognition device, a manufacturing method for the iris recognition device, and an application of the iris recognition device, wherein the fill light method can form a uniform brightness in the user's iris region, thereby improving precision of the collected iris characteristics of the user.

Another advantage of the invention is to provide an iris recognition device, a manufacturing method for the iris recognition device, and an application of the iris recognition device, wherein a fill light component is provided and the fill light component provides infrared lights as a supplementary light source when the fill light component collects the iris characteristics of the user in order to ensure that the images carrying the collected iris characteristics meet the requirements of the iris recognition, and that the fill light component effectively improves precision of the collected iris characteristics and reduces the consumed user identification time.

Another advantage of the invention is to provide an iris recognition device, a manufacturing method for the iris recognition device, and an application of the iris recognition device, wherein the iris recognition device is capable of collecting the iris characteristics of the user in a long distance, and effectively identifies the user's identity, thereby enhancing the actual use value of iris recognition.

Another advantage of the invention is to provide an iris recognition device and its manufacturing method and application, which can cooperate with other identification technologies, such as face recognition technology, voice recognition, fingerprint recognition technology and other techniques to simultaneously collect user's iris characteristics and other biometrics, thereby more accurately identifying the user's identity.

Another advantage of the invention is to provide an iris recognition device and its manufacturing method and application, which is possible to set a variety of biometric technology into a system so as to easy to use.

Another advantage of the invention is to provide an iris recognition device and its manufacturing method and application, which is applied to the user identity authentication of online payments, thereby effectively ensuring users information security.

Another advantage of the invention is to provide an iris recognition device and its manufacturing method and application, wherein an iris and face recognition system is provided that can improve the efficiency and accuracy of user identity information.

Another advantage of the invention is to provide an iris recognition device and its manufacturing method and application, wherein the iris and face recognition system provides an iris recognition module and a face recognition module to acquire the user's iris and facial characteristics and transmits the user's iris and facial characteristics to the internal system for comparing with user identity information stored in the information base, thereby verifying user identity information.

Another advantage of the invention is to provide an iris recognition device and its manufacturing method and application, wherein the iris recognition module and the face recognition module can be integrated into one system so as to easy to use.

Another advantage of the invention is to provide an iris recognition device and its manufacturing method and application, wherein the iris and face recognition system is applied to apparatus and/or electronic devices and/or application programs to effectively guarantee users information safety.

Another advantage of the invention is to provide an iris recognition device and its manufacturing method and application, wherein an implantable recognition system is provided and to be applied to traditional apparatus and/or electronic devices and/or application programs to effectively ensure users information security.

Another advantage of the invention is to provide an iris recognition device and its manufacturing method and application, wherein the iris and face recognition system can be applied to an apparatus.

Another advantage of the invention is to provide an iris recognition device and its manufacturing method and application, wherein the iris and face recognition system can be applied to an electronic device.

Another advantage of the invention is to provide an iris recognition device and its manufacturing method and application, wherein the iris and face recognition system can be applied to an application program.

Another advantage of the invention is to provide an iris recognition device and its manufacturing method and application, wherein an iris camera module is provided to acquire clear user's binoculus iris characteristics images and is widely used in iris recognition and identity authentication.

Another advantage of the invention is to provide an iris recognition device and its manufacturing method and application, which has a miniaturized characteristic to be easily integrated into a portable apparatus and/or electronic device to achieve the iris recognition and identity authentication of the portable apparatus and/or electronic device.

Another advantage of the invention is to provide an iris recognition device and its manufacturing method and application which is applied to the apparatus and/or electronic device to provide a clear iris characteristics image.

Another advantage of the invention is to provide an iris recognition device and its manufacturing method and application, wherein, comparing with the traditional monocular iris recognition technology, a binoculus iris images data acquisition module can acquire users binoculus iris characteristics and can be used in a long distance, and has high accuracy and is convenient and practical to use.

Another advantage of the invention is to provide an iris recognition device and its manufacturing method and application, wherein the iris camera module and the fill light component can be integrated as one module so as to be convenient and practical.

Another advantage of the invention is to provide an iris recognition device and its manufacturing method and application, wherein the iris camera module is preferably an infrared camera module, and the fill light component is preferably an infrared LED light-emitting element, so that when the binoculus iris images data acquisition module collects users iris characteristics, the external visible light influence on the image quality is reduced, visible light on the human eye irritation while filling light is avoided, and users is more comfortable to use.

Another advantage of the invention is to provide an iris recognition device and its manufacturing method and application, wherein the binoculus iris images data acquisition module is equally applicable to the monocular iris characteristics for identity recognition.

Another advantage of the invention is to provide an iris recognition device and its manufacturing method and application, wherein a camera optics lens assembly is provided to implement iris recognition technology used and to improve quantity of information of collected user iris characteristic in order to accurately authenticate user's identity subsequently.

Another advantage of the invention is to provide an iris recognition device, a manufacturing method therefor, and an application thereof, wherein the camera optics lens assembly expands the viewing angle to simultaneously acquire users binoculus iris characteristics, and also has excellent performance for monocular iris characteristics collection.

Another advantage of the invention is to provide an iris recognition device, a manufacturing method therefor, and an application thereof, wherein the camera optics lens assembly can amend distorted phase contrast resulting from the increased viewing angle in order to avoid image distortion.

Another advantage of the invention is to provide an iris recognition device, a manufacturing method therefor, and an application thereof, wherein the camera optics lens assembly has an ultra-small size in subsequent made iris camera module such as the smallest length, breadth and thickness dimensions are up to 5.5 mm×5.5 mm×3.91 mm, and is in favor of being integrated into electronic devices such as mobile phones, tablet computers and so on for iris recognition and user identity authentication.

Another advantage of the invention is to provide an iris recognition device and its manufacturing method and application, which can ensure the stability and reliability during using to improve product yield.

Additional advantages and features of the invention will become apparent from the description which follows, and may be realized by means of the instrumentalities and combinations particular point out in the appended claims.

According to the present invention, the foregoing and other objects and advantages are attained by a fill light method of an iris recognition application, comprising the steps of:

(a) collecting user iris characteristics by providing an iris camera module and using the user's pupil as a focal point; and (b) providing a supplementary light source for user's eye region by at least one fill light component to form a uniform brightness on an iris region, wherein the iris camera module and the fill light component form an iris recognition device.

In one embodiment of the fill light method, the fill light method further comprises the step of:

mounting the iris camera module and the fill light component on a printed circuit board respectively, wherein the iris camera module and the fill light component has a preset angle and the preset angle has a range of 0-45 degree.

In one embodiment of the fill light method, the fill light component comprises at least one light emitting element and a light emitting angle of each of the light emitting elements is respectively greater than a horizontal field angle and a vertical field angle of the iris camera module.

In one embodiment of the fill light method, the light emitting element is an infrared LED light-emitting element providing infrared lights.

In one embodiment of the fill light method, a distance between an iris recognition device and user iris is defined as z, a distance between axles of the iris camera module and the light emitting element of the fill light component is defined as x, an inclination angle of the light emitting element is defined as $\theta$, and a formulas relationship of the z, x and $\theta$ is tan $\theta$=z/x, wherein when z is in a determinate state, x and $\theta$ have a changing rule of tangent function, wherein the value of x is determined by adjusting the value of $\theta$ and the value of $\theta$ is determined by adjusting the value of x.

According to another aspect of the present invention, the present invention also provides a manufacturing method for an iris recognition device, comprising the steps of:

(A) mounting an iris camera module on a printed circuit board; and (B) providing at least one fill light component on the iris camera module, and providing a supplementary light source by the fill light component when the iris camera module collects user's iris characteristics, wherein each of the fill light components comprises at least one light emitting element, a light-emitting angle of each of the light emitting elements is greater than a horizontal field angle and a vertical filed angle of the iris camera module.

In one embodiment of the manufacturing method, a distance between the iris recognition device and user iris is defined as z, a distance between axles of the iris camera module and the light emitting element of the fill light component is defined as x, an inclination angle of the light emitting element is defined as $\theta$, and a formulas relationship of the z, x and $\theta$ is tan $\theta$=z/x, wherein when z is in a determinate state, x and $\theta$ have a changing rule of tangent function, wherein the value of x is determined by adjusting the value of $\theta$ and the value of $\theta$ is determined by adjusting the value of x.

In one embodiment of the manufacturing method, the manufacturing method further comprises the step of:

providing a human face camera module and mount the human face camera module on the printed circuit board.

In one embodiment of the manufacturing method, a horizontal field angle of the human face camera module is greater than a horizontal field angle of the iris camera module, and, accordingly, a vertical field angle of the human face camera module is greater than a vertical field angle of the iris camera module.

In one embodiment of the manufacturing method, the iris recognition device is communicatively connected with a background processing component to process user iris characteristics collected by the iris recognition device.

In one embodiment of the manufacturing method, the background processing component is mounted on the printed circuit board.

In one embodiment of the manufacturing method, the iris recognition device has a data interface and the background processing component has a connection end, wherein the connection end is coupled with the data interface.

In one embodiment of the manufacturing method, the iris recognition device is connected to the background processing component in a wireless connection.

In one embodiment of the manufacturing method, the wireless connection of the iris recognition device and the background processing component is selected from the group consisting of Wi-Fi, Li-Fi, Internet, communication network and Bluetooth.

According to another aspect of the present invention, the present invention also provides an iris recognition device, comprising:

an iris camera module to collect user iris characteristics, and at least one fill light component comprising at least one light emitting element which provides a supplementary light source for the iris camera module.

In one embodiment of the iris recognition device, a light emitting angle of each of the light emitting elements is respectively greater than a horizontal field angle and a vertical field angle of the iris camera module.

In one embodiment of the iris recognition device, the iris recognition device further comprises a printed circuit board, wherein the iris camera module and the fill light component are respectively mounted on the printed circuit board.

In one embodiment of the iris recognition device, the iris recognition device further comprises a human face camera module and the human face camera module is mounted on the printed circuit board.

In one embodiment of the iris recognition device, a horizontal field angle of the human face camera module is greater than a horizontal field angle of the iris camera module, and, accordingly, a vertical field angle of the human face camera module is greater than a vertical field angle of the iris camera module.

In one embodiment of the iris recognition device, the iris recognition device is communicatively connected with a background processing component to process user iris characteristics collected by the iris recognition device.

In one embodiment of the iris recognition device, the background processing component is mounted on the printed circuit board.

In one embodiment of the iris recognition device, the iris recognition device has a data interface and the background processing component has a connection end, wherein the connection end is coupled with the data interface.

In one embodiment of the iris recognition device, the iris recognition device is connected to the background processing component in a wireless connection.

In one embodiment of the iris recognition device, the wireless connection of the iris recognition device and the background processing component is selected from the group consisting of Wi-Fi, Li-Fi, Internet, communication network and Bluetooth.

In one embodiment of the iris recognition device, a distance between the iris recognition device and user iris is defined as z, a distance between axles of the iris camera module and the light emitting element of the fill light component is defined as x, an inclination angle of the light emitting element is defined as $\theta$, and a formulas relationship of the z, x and $\theta$ is tan $\theta$=z/x, wherein when z is in a determinate state, x and $\theta$ have a changing rule of tangent function, wherein the value of x is determined by adjusting the value of $\theta$ and the value of $\theta$ is determined by adjusting the value of x.

In one embodiment of the iris recognition device, the value of $\theta$ has a range of 0-45 degree.

According to another aspect of the present invention, the present invention also provides an iris and face recognition system, comprising:

an iris recognition module to capture iris characteristics of a user, a face recognition module to capture facial characteristics of the user, and a background processing component, wherein the iris recognition module and the face recognition module are respectively communicatively connected with the background processing component, wherein iris characteristics and facial characteristics of the user which are captured by the iris recognition module and the face recognition module are respectively generated an image data flow, and the image data flow is transmitted to the background processing component so as to generate identity information of the user.

In one embodiment, the iris and face recognition system further comprises a printed circuit board, wherein the iris recognition module and the face recognition module are respectively mounted on the printed circuit board and the background processing component is mounted on the printed circuit board.

In one embodiment, the iris and face recognition system further comprises a printed circuit board, wherein the iris recognition module and the face recognition module are respectively mounted on the printed circuit board and the background processing component is provided in an external system, wherein the background processing component is communicatively connected with the iris recognition module and the face recognition module.

In one embodiment of the iris and face recognition system, the background processing component is communicatively connected with the iris recognition module and the face recognition module in a connection which is selected from the group consisting of wired connection and wireless connection.

In one embodiment of the iris and face recognition system, the wireless connection of the background processing component with the iris recognition module and the face recognition module is selected from the group consisting of Wi-Fi, Li-Fi, Internet, communication network and Bluetooth.

In one embodiment of the iris and face recognition system, a horizontal field angle of the face recognition module is greater than a horizontal field angle of the iris recognition module and, accordingly, a vertical field angle of the face recognition module is greater than a vertical field angle of the iris recognition module.

According to another aspect of the present invention, the present invention also provides an iris and face recognition system, comprising:

a face recognition module to capture iris characteristics and facial characteristics of a user, an iris recognition module to capture iris characteristics of the user, and a background processing component, wherein the iris recognition module and the face recognition module are respectively communicatively connected with the background processing component, wherein iris characteristics and facial characteristics of the user which are captured by the iris recognition module and the face recognition module are respectively generated an image data flow, and the image data flow is transmitted to the background processing component so as to generate identity information of the user.

In one embodiment, a horizontal field angle of the face recognition module is greater than a horizontal field angle of the iris recognition module and, accordingly, a vertical field angle of the face recognition module is greater than a vertical field angle of the iris recognition module.

In one embodiment, the iris and face recognition system further comprises a printed circuit board, wherein the iris recognition module and the face recognition module are respectively mounted on the printed circuit board and the background processing component is mounted on the printed circuit board.

In one embodiment, the iris and face recognition system further comprises a printed circuit board, wherein the iris recognition module and the face recognition module are respectively mounted on the printed circuit board and the background processing component is provided in an external system, wherein the background processing component is communicatively connected with the iris recognition module and the face recognition module.

In one embodiment, the background processing component is communicatively connected with the iris recognition module and the face recognition module in a connection which is selected from the group consisting of wired connection and wireless connection.

In one embodiment, the wireless connection of the background processing component with the iris recognition module and the face recognition module is selected from the group consisting of Wi-Fi, Li-Fi, Internet, communication network and Bluetooth.

According to another aspect of the present invention, the present invention also provides an implantable recognition system, which is provided in an external system comprising an operating component, comprising an iris and face recognition system communicatively connected with the operating component, wherein the iris and face recognition system further comprises:

an iris recognition module to capture iris characteristics of a user, a face recognition module to capture facial characteristics of the user, and a background processing component, wherein the iris recognition module and the face recognition module are respectively communicatively connected with the background processing component, wherein iris characteristics and facial characteristics of the user which are captured by the iris recognition module and the face recognition module are respectively generated an image data flow, and the image data flow is transmitted to the background processing component so as to generate identity information of the user.

In one embodiment of the implantable recognition system, the iris and face recognition system is communicatively connected with the external system in a connection which is selected from the group consisting of wired connection and wireless connection.

In one embodiment of the implantable recognition system, the wireless connection of the iris and face recognition system and the external system is selected from the group consisting of Wi-Fi, Li-Fi, Internet, communication network and Bluetooth.

In one embodiment of the implantable recognition system, a horizontal field angle of the face recognition module is greater than a horizontal field angle of the iris recognition module and, accordingly, a vertical field angle of the face recognition module is greater than a vertical field angle of the iris recognition module.

In one embodiment of the implantable recognition system, the iris and face recognition system further comprises a printed circuit board, wherein the iris recognition module and the face recognition module are respectively mounted on the printed circuit board and the background processing component is mounted on the printed circuit board.

In one embodiment of the implantable recognition system, the iris and face recognition system further comprises a printed circuit board, wherein the iris recognition module and the face recognition module are respectively mounted on the printed circuit board and the background processing component is provided in the external system, wherein the background processing component is communicatively connected with the iris recognition module and the face recognition module.

In one embodiment of the implantable recognition system, the background processing component is communicatively connected with the iris recognition module and the face recognition module in a connection which is selected from the group consisting of wired connection and wireless connection.

According to another aspect of the present invention, the present invention also provides a manufacturing method for an iris and face recognition system, comprising the steps of:

(a) mounting an iris recognition module and a face recognition module on a printed circuit board respectively; and (b) communicatively connecting a background processing component to the iris recognition module and the face recognition module.

In one embodiment of the manufacturing method, the step (b) further comprises the step selected from the group consisting of:

mounting the background processing component on the printed circuit board; and communicatively connecting the background processing component with the iris recognition module and the face recognition module in a connection which is selected from the group consisting of wired connection and wireless connection.

In one embodiment of the manufacturing method, a horizontal field angle of the face recognition module is greater than a horizontal field angle of the iris recognition module and, accordingly, a vertical field angle of the face recognition module is greater than a vertical field angle of the iris recognition module.

In one embodiment of the manufacturing method, the wireless connection of the background processing component with the iris recognition module and the face recognition module is selected from the group consisting of Wi-Fi, Li-Fi, Internet, communication network and Bluetooth.

According to another aspect of the present invention, the present invention also provides a constructing method of facial characteristics, comprising the steps of:

(A) capturing facial characteristics of a user by a face recognition module and generating an image data flow and transmit the image data flow to a background processing component;

(B) capturing iris characteristics of the user by a iris recognition module and generating an image data flow and transmit the image data flow to the background processing component; and (C) converting the image data flow to generate identity information of the user by the background processing component, and transmiting the identity information of the user to an operating component for encoding process so as to construct facial characteristics of the user.

In one embodiment of the constructing method, a horizontal field angle of the face recognition module is greater than a horizontal field angle of the iris recognition module and, accordingly, a vertical field angle of the face recognition module is greater than a vertical field angle of the iris recognition module.

In one embodiment of the constructing method, the step (B) is completed before the step (A) or is completed with the step (A) at the same time; thus, capture iris characteristics of the user at first, then capture facial characteristics of the user, or simultaneously capture iris characteristics and facial characteristics of the user.

According to another aspect of the present invention, the present invention also provides a constructing method of facial characteristics, comprising the steps of:

(i) capturing iris and facial characteristics of a user by a face recognition module and generating an image data flow and transmit the image data flow to a background processing component;

(ii) capturing iris characteristics of the user by an iris recognition module and generating an image data flow and transmit the image data flow to the background processing component; and (iii) modifying the iris characteristics of the user captured by the face recognition module using iris characteristics of the user captured by the iris recognition module by the background processing component, and generating identity information of the user, wherein the generated identity information of the user is transmitted to an operating component for encoding process so as to construct facial characteristics of the user.

In one embodiment of the constructing method, a horizontal field angle of the face recognition module is greater than a horizontal field angle of the iris recognition module and, accordingly, a vertical field angle of the face recognition module is greater than a vertical field angle of the iris recognition module.

In one embodiment of the constructing method, the step (ii) is completed before the step (i) or is completed with the step (i) at the same time; thus, capture iris characteristics of the user at first, then capture facial characteristics of the user, or simultaneously capture iris characteristics and facial characteristics of the user.

According to another aspect of the present invention, the present invention also provides an application method for an iris and face recognition system, for a communication between a user and an external system comprising an operating component which comprises an information base, comprising the steps of:

(I) capturing iris and facial characteristics of the user by the iris and face recognition system, and generating identification information of the user;

(II) matching the generated identification information of the user with the identification information of the user which is stored in the information base by the operating component; and (III) when the match is succeeded, communicating the user with the external system.

In one embodiment of the application method, before the step (I), further comprises the steps of:

detecting communication of the external system and the user by the operating component; and driving the iris and face recognition system to capture iris and facial characteristics of the user, and generating the identification information of the user.

In one embodiment of the application method, the application method further comprises the steps of:

restoring the identification information of the user in the information base, and capturing iris and facial characteristics of the user by the iris and face recognition system and generating the identification information of the user to restore in the information base.

In one embodiment of the application method, the external system is an apparatus comprising a panel, wherein when the operating component successfully matches the generated identification information of the user with the identification information of the user which is stored in the information base, the panel is opened.

In one embodiment of the application method, the external system is an electronic device comprising the operating component, wherein when the operating component successfully matches the generated identification information of the user with the identification information of the user which is stored in the information base, the electronic device is unlocked.

In one embodiment of the application method, the external system is an electronic device comprising the operating component, wherein when the operating component is failed to match the generated identification information of the user with the identification information of the user which is stored in the information base, the operating component prevents other operations between the user and the electronic device which are not relative to user authentication.

In one embodiment of the application method, the external system has an application program coupling with the operation component, wherein when the operating component successfully matches the generated identification information of the user with the identification information of the user which is stored in the information base, the application program is executed.

In one embodiment of the application method, before the operating component successfully matches the generated identification information of the user with the identification information of the user which is stored in the information base, reminder events are generated in the external system.

In one embodiment of the application method, the iris and face recognition system further comprises:
an iris recognition module to capture iris characteristics of a user,
a face recognition module to capture facial characteristics of the user, and
a background processing component, wherein the iris recognition module and the face recognition module are respectively communicatively connected with the background processing component, wherein iris characteristics and facial characteristics of the user which are captured by the iris recognition module and the face recognition module are respectively generated an image data flow, and the image data flow is transmitted to the background processing component so as to generate the identification information of the user.

In one embodiment of the application method, the iris and face recognition system further comprises:
a face recognition module to capture iris characteristics and facial characteristics of a user,
an iris recognition module to capture iris characteristics of the user, and
a background processing component, wherein the iris recognition module and the face recognition module are respectively communicatively connected with the background processing component, wherein iris characteristics and facial characteristics of the user which are captured by the iris recognition module and the face recognition module are respectively generated an image data flow, and the image data flow is transmitted to the background processing component.

In one embodiment of the application method, the background processing component modifies iris characteristics of the user captured by the face recognition module using iris characteristics of the user captured by the iris recognition module so as to generate the identification information of the user.

In one embodiment of the application method, a horizontal field angle of the face recognition module is greater than a horizontal field angle of the iris recognition module and, accordingly, a vertical field angle of the face recognition module is greater than a vertical field angle of the iris recognition module.

According to another aspect of the present invention, the present invention also provides an online payment method based on an iris and face recognition system, comprising the following steps:
($\alpha$) in response to an online payment event;
($\beta$) generate identification information of a user, and provide the iris and face recognition system to capture iris and facial characteristics of the user and generate the identification information of the user; and
($\gamma$) match the generated identity information of the user with the identification information of the user which is stored in an information base, wherein when the match is succeed, the response of the online payment event is succeed.

In one embodiment of the online payment method, after the step ($\alpha$), reminder events are generated so as to remind the user for user authentication.

In one embodiment of the online payment method, a response failing time of online payment event exceeds a preset time, the online payment event is locked.

According to another aspect of the present invention, the present invention also provides a binoculus iris images data acquisition module, comprising an iris camera module collecting the user binoculus iris characteristics, wherein the iris camera module comprises:
an image sensor chip, wherein the image sensor chip provides number of pixels and number of pixels of a binoculus region is at least 10 pixels/mm, a total number of pixels of the binoculus region is at least 1920×800 in order to meet the minimum requirements for iris recognition algorithms;
a lens assembly, wherein the lens assembly images an object to be photographed on a photosensitive area of the image sensor chip; wherein when collecting iris characteristics of the user, the lens assembly uses the user's pupil region as a generally focal point, and the shooting range covers the binoculus region and a resolving power of the binoculus region is at least 450 LW/PH; and
a printed circuit board assembly, wherein the image sensor chip and the lens assembly are mounted on the printed circuit board assembly.

In one embodiment, the binoculus iris images data acquisition module further comprises at least one fill light component providing a supplementary light source for the iris camera module.

In one embodiment, the lens assembly comprises a lens, an infrared carrier penetration filter and a lens holder, wherein the lens holder is mounted on the printed circuit board assembly, the lens and the infrared carrier penetration filter are supported by the lens holder, so that a light signal is converted into an electrical signal in a photosensitive region of the image sensor chip after the light signal passes through the lens the infrared carrier penetration filter.

In one embodiment, when collecting user iris characteristics, a coverage range of the fill light component is no less than a coverage range of the iris camera module in the same projection range so as to provide a supplementary light source for the user binoculus region.

In one embodiment, the fill light component is an infrared LED light-emitting element and when collecting user iris characteristics, the fill light component forms a uniform brightness in iris region.

In one embodiment, the fill light component is mounted on the printed circuit board assembly so as to be integrated with the iris camera module to form the binoculus iris images data acquisition module.

In one embodiment, a light-emitting angle of each of the fill light component is greater than a horizontal field angle and a vertical filed angle of the iris camera module.

In one embodiment, the iris camera module and the fill light component has a preset angle and the preset angle has a range of 0-45 degree.

In one embodiment, the printed circuit board assembly comprises a printed circuit board, wherein the printed circuit board is selected from the group consisting of flex board and PCB.

According to another aspect of the present invention, the present invention also provides a manufacturing method for a binoculus iris images data acquisition module, comprising the steps of:

(a) mounting an image sensor chip on a printed circuit board assembly;

(b) assembling a lens assembly coverlay on an upper portion of the image sensor chip, and (c) adjusting a position of the lens assembly so as to form a clear user binoculus iris characteristics image in a distance.

In one embodiment, the manufacturing method further comprises the step of: providing a fill light component as a supplementary light source for the binoculus iris images data acquisition module.

In one embodiment of the manufacturing method for a binoculus iris images data acquisition module, a horizontal field angle of the fill light component is respectively greater than a horizontal field angle and a vertical field angle of the iris camera module, so that when collecting user iris characteristics, the iris camera module uses the user's pupil as a focal point and the fill light component provides a supplementary light source for user binoculus region.

In one embodiment of the manufacturing method for a binoculus iris images data acquisition module, the image sensor chip and the lens assembly are assembled to be an infrared iris camera module and the fill light component is an infrared LED light emitting element, wherein when the iris camera module collects user iris characteristics, the fill light component forms a uniform brightness on an iris region.

In one embodiment of the manufacturing method for a binoculus iris images data acquisition module, the lens assembly comprises a lens, an infrared carrier penetration filter and a lens holder, wherein the lens holder is mounted on the printed circuit board assembly, the lens and the infrared carrier penetration filter are supported by the lens holder, so that a light signal is converted into an electrical signal in a photosensitive region of the image sensor chip after the light signal passes through the lens the infrared carrier penetration filter.

In one embodiment of the manufacturing method for a binoculus iris images data acquisition module, the image sensor chip provides number of pixels and number of pixels of a binoculus region is at least 10 pixels/mm, a total number of pixels of the binoculus region is at least 1920×800 in order to meet the minimum requirements for iris recognition algorithms.

In one embodiment of the manufacturing method for a binoculus iris images data acquisition module, when collecting iris characteristics of the user, a resolving power of the binoculus region is at least 450 LW/PH.

In one embodiment of the manufacturing method for a binoculus iris images data acquisition module, a pixels diameter of the image sensor chip is D, a number of the horizontal maximum output pixels is X, a number of the vertical maximum output pixels is Y; a farthest distance of preset binoculus iris recognition is c, according to a minimum requirement of iris recognition algorithms to pixels which is N pixel/mm, a number of pixels needs not less than f*N in the farthest distance c and in a range of f, and the corresponding image size of the image sensor chip 111 is f*N*D;

wherein according to a principle of similar triangles, a proportional relation is as follows: (f*N*D)/f=a/(c−a); under the condition of known N, D, c, a focal length a of the iris camera module is a=c*D*N/(D*N+1);

wherein based on a principle of similar triangles is: X*D/e=a/(c−a); and in the farthest distance c, a horizontal maximum shooting range of the iris camera module is: e=X*D*(c−a)/a;

wherein according to a principle of similar triangles: (b−a)/a=f/(X*D); a closest distance of user binoculus iris recognition b after being calculated is: b=[f/(X*D)+1]*a; and wherein according to a principle of the triangle function: tan (β/2)=(e/2)/(c−a), a horizontal field angle β of the iris camera module after being calculated is: β=2*arc tan [(e/2)/(c−a)].

According to another aspect of the present invention, the present invention also provides a camera optics lens assembly, comprising:

a first lens having a positive focal power, wherein the first lens has a first lens imaging side surface and a first lens object side surface and the first lens object side surface is a convex surface;

a second lens having a negative focal power, wherein the second lens has a second lens imaging side surface and a second lens object side surface and the second lens object side surface is a concave surface; and a third lens having a negative focal power, wherein the third lens has a third lens imaging side surface and a third lens object side surface and the third lens object side surface is a concave surface, wherein at least one side of the first lens, the second lens, and the third lens is aspherical and an aperture slot is located between a shot object and the second lens.

In one embodiment of the camera optics lens assembly, a distance from the first lens object side surface to an imaging surface on optical axis is TTL and a focal length of the camera optics lens assembly is f, which meets a condition: TTL/f<0.9.

In one embodiment of the camera optics lens assembly, a focal length of the camera optics lens assembly is f and a focal length of the first lens is f1, which meets a condition: 0.6<f1/f<1.0.

In one embodiment of the camera optics lens assembly, an effective radius of the first lens object side surface is SD11 and an effective radius of the third lens imaging side surface is SD32, which meets a condition: 0.6<SD11/SD32<1.5.

In one embodiment of the camera optics lens assembly, a center thickness of the first lens is CT1 and a focal length of the camera optics lens assembly is f, which meets a condition: 0.2<CT1/f<0.5.

In one embodiment of the camera optics lens assembly, a center thickness of the second lens is CT2 and a focal length of the camera optics lens assembly is f, which meets a condition: 0<CT2/f<0.1.

In one embodiment of the camera optics lens assembly, an aperture value of the camera optics lens assembly is Fno, which meets a condition: Fno<2.6.

In one embodiment of the camera optics lens assembly, a distance from the first lens object side surface to an imaging surface on optical axis is TTL; a focal length of the camera optics lens assembly is f, a focal length of the first lens is f1; an effective radius of the first lens object side surface of the first lens is SD11 and an effective radius of the third lens imaging side surface of the third lens is SD32, a center thickness of the first lens is CT1; a center thickness of the second lens is CT2; and an aperture value of the camera optics lens assembly is Fno, wherein the camera optics lens assembly meets at least two or more the following conditions:
  condition 1: TTL/f<0.9;
  condition 2: 0.6<f1/f<1.0;
  condition 3: 0.6<SD11/SD32<1.5;
  condition 4: 0.2<CT1/f<0.5;
  condition 5: 0<CT2/f<0.1; and
  condition 6: Fno<2.6.

In one embodiment of the camera optics lens assembly, the camera optics lens assembly forms an iris camera module.

In one embodiment of the camera optics lens assembly, the third lens imaging side surface is selected from the group consisting of convex surface and concave surface.

In one embodiment of the camera optics lens assembly, the first lens imaging side surface is concave surface.

In one embodiment of the camera optics lens assembly, the first lens imaging side surface is convex surface.

In one embodiment of the camera optics lens assembly, materials of the first lens, the second lens and the third lens are selected from the group consisting of glass and plastic.

According to another aspect of the present invention, the present invention also provides an iris camera module, comprising:
  an image sensor chip having an imaging surface, and
  a camera optics lens assembly, wherein a light signal collected by the camera optics lens assembly is converted into an electrical signal in the image sensor chip, wherein the camera optics lens assembly further comprises:
  a first lens having a positive focal power, wherein the first lens has a first lens imaging side surface and a first lens object side surface and the first lens object side surface is a convex surface;
  a second lens having a negative focal power, wherein the second lens has a second lens imaging side surface and a second lens object side surface and the second lens object side surface is a concave surface; and
  a third lens having a negative focal power, wherein the third lens has a third lens imaging side surface and a third lens object side surface and the third lens object side surface is a concave surface, wherein at least one side of the first lens, the second lens, and the third lens is aspherical and an aperture slot is located between a shot object and the second lens.

In one embodiment of the iris camera module, the iris cameral module further comprises an infrared filter which is provided between the third lens and the image sensor chip.

In one embodiment of the iris camera module, a distance from the first lens object side surface to an imaging surface on optical axis is TTL; a focal length of the camera optics lens assembly is f, a focal length of the first lens is f1; an effective radius of the first lens object side surface of the first lens is SD11 and an effective radius of the third lens imaging side surface of the third lens is SD32, a center thickness of the first lens is CT1; a center thickness of the second lens is CT2; and an aperture value of the camera optics lens assembly is Fno, wherein the camera optics lens assembly meets at least two or more the following conditions:
  condition 1: TTL/f<0.9;
  condition 2: 0.6<f1/f<1.0;
  condition 3: 0.6<SD11/SD32<1.5;
  condition 4: 0.2<CT1/f<0.5;
  condition 5: 0<CT2/f<0.1; and
  condition 6: Fno<2.6.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 27 is a flow diagram of the first application of the iris and face recognition system of the present invention.

FIG. 28 is a schematic view of a second application of the iris and face recognition system of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
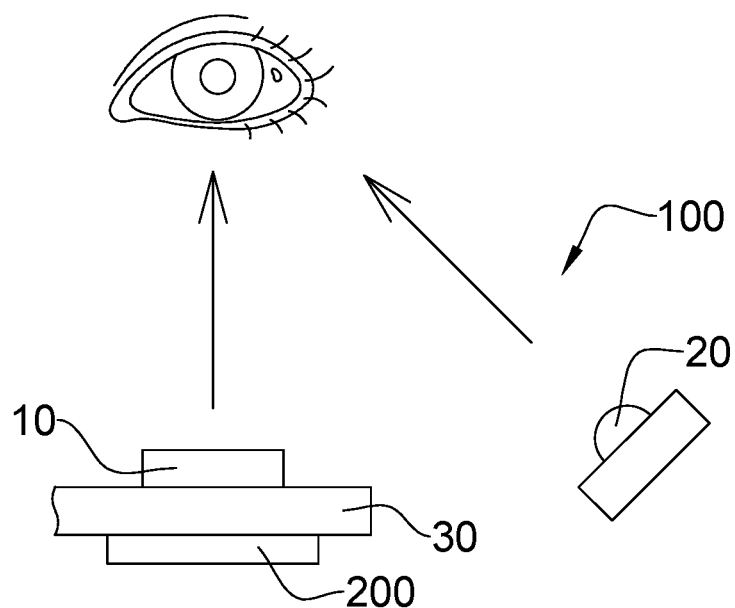
FIG. 1 is a schematic view of an iris recognition device according to a preferred embodiment of the present invention.

Referring to FIG. 1 of the drawings, a fill light method and device on an iris recognition application according to a preferred embodiment of the present invention are illustrated, wherein the iris recognition device 100 comprises an iris camera module 10, at least one fill light component 20, a printed circuit board 30, and other components.

In this embodiment of the present invention, the iris camera module 10 is mounted on the printed circuit board 30, and follow-up is assembled with the fill light component 20 to form the iris recognition device 100.

Figure 2:
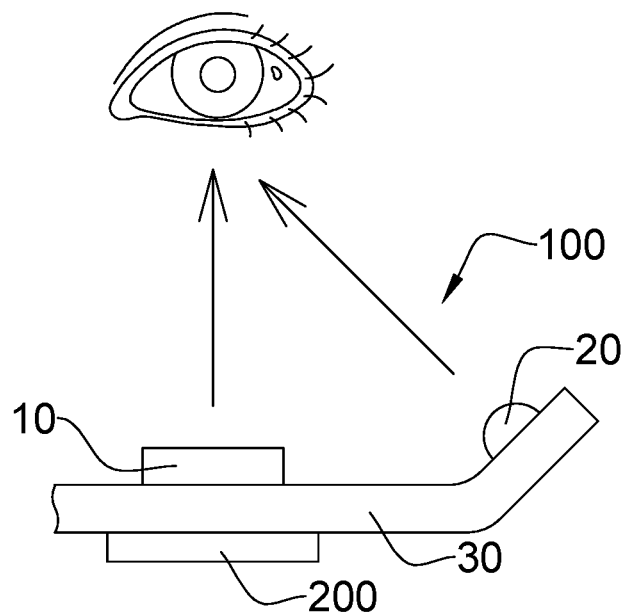
FIG. 2 is a schematic view of an iris recognition device according to another preferred embodiment of the present invention.

As shown in FIG. 2 of the drawings, in other embodiment of the present invention, the camera module 10 and the fill light component 20 are respectively mounted on the corresponding positions of the printed circuit board 30 such that the iris camera module 10 and the fill light component 20 are adapted to complement each other and form the iris recognition device 100.

It is worth mentioning that the printed circuit board 30 can be a flex board or PCB, and the printed circuit board 30 ensures the using stability and reliability of the iris recognition device 100 after the iris camera module 10 and the fill light component 20.

It is worth mentioning that the iris recognition device 100 can be applied in a variety of external systems. In some embodiments of the present invention, the external systems comprise but not limited to safety devices such as safety box, smart devices such as mobile electronic devices, personal digital assistants, personal computers, and application programs such as online payment procedures.

The iris recognition device 100 is further communicatively connected with a background processing component 200, in such a manner that the iris recognition device 100 acquires the user corresponding characteristics and transmits the user corresponding characteristics to the background processing component 200 to be processed such as analysis, calculation, matching and so on. The iris recognition device 100 collecting user iris characteristics can be combined with other recognition devices to collect biometric characteristics such as facial characteristics, fingerprint characteristics, voice characteristics and so on so as to follow-up identify the user's identity, thereby ensuring user information security.

Referring to FIG. 1 and FIG. 2 of the drawings according to an embodiment of the present invention, the background processing component 200 is implemented as a microprocessor, and during manufacturing of the iris recognition device 100, the background processing component 200 is mounted on the printed circuit board 30 such that the iris characteristics collected by the iris camera module 10 is quickly and efficiently transferred to the background processing component 200 to be processed. In the embodiment, the iris recognition device 100 has a high degree of integration to save assembly cost when an external system is assembled.

Figure 3A:
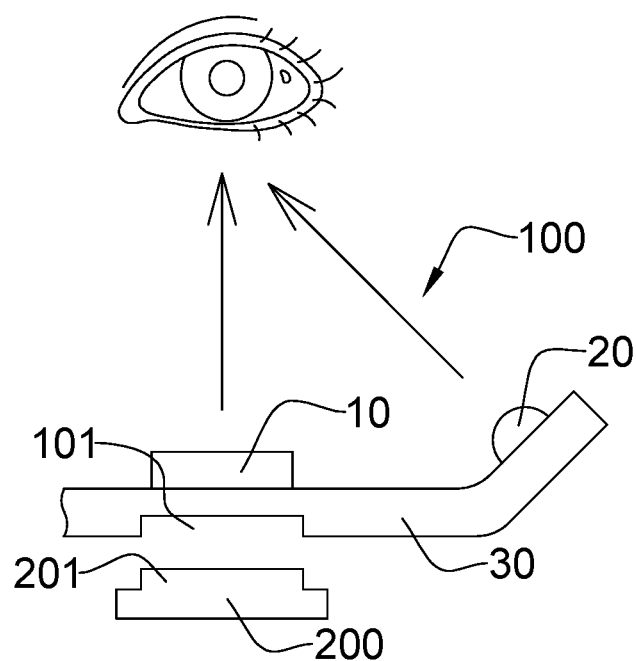
FIG. 3A and FIG. 3B are schematic views of an iris recognition module and a background processing component according to the above preferred embodiment of the present invention, illustrating relationships of the iris recognition module and the background processing component

Referring to FIG. 3A of the drawings, another embodiment of the present invention is illustrated. The iris recognition device 100 is provided with a data interface 101 in advance. The background processing component 200 has a connection end 201 which is coupled with the data interface 101 to communicatively connect the iris recognition device 100 with the background processing component 200, thereby enabling data transmission between the iris recognition device 100 and the background processing component 200.

Figure 3B:
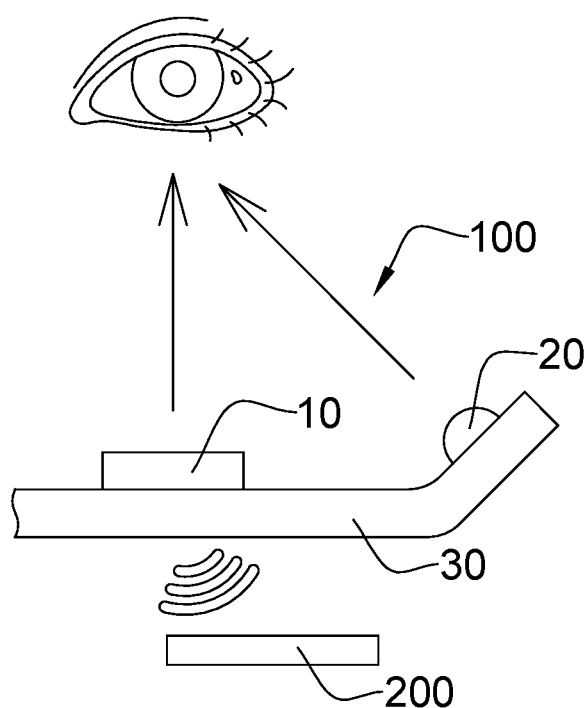

Referring to FIG. 3B of the drawings, another embodiment of the present invention is illustrated. The iris recognition device 100 and background processing component 200 are communicatively connected by a wireless connection in such a manner that the iris recognition device 100 is ensured to have a flexibility on specific application.

It is worth mentioning that the wireless connection between the iris recognition device 100 and the background processing component 200 comprises but not be restricted to Wi-Fi, Li-Fi, internet, communications networks and Bluetooth.

In other words, the iris recognition device 100 and the background processing component 200 are communicatively connected by a wired connection or a wireless connection such that iris recognition device 100 meets different using requirements.

Figure 4A:
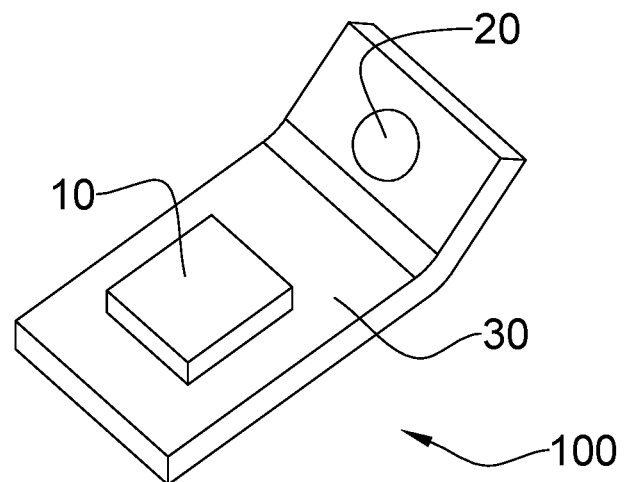
FIG. 4A and FIG. 4B are schematic views of the iris recognition device according to the above preferred embodiment of the present invention.
Figure 4B:
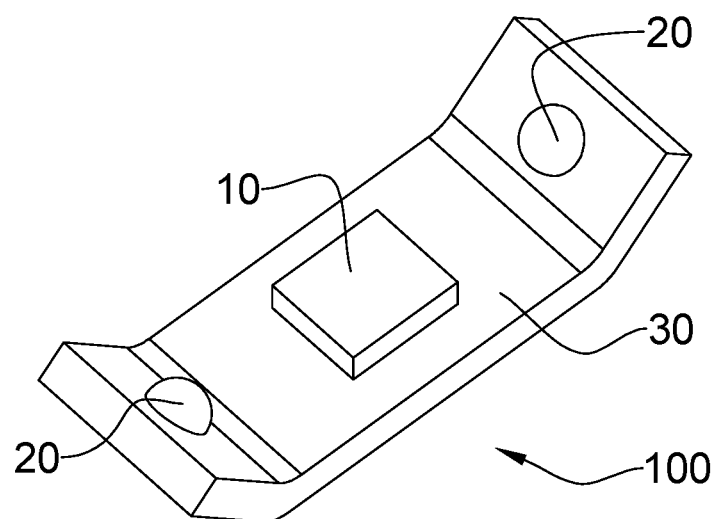

As shown in FIG. 4A and FIG. 4B of the drawings, different amount of the fill light component 20 is provided in different embodiment of the present invention and the position of each of the fill light component 20 can be adjusted. For example, the amount of the fill light component 20 can be one and the fill light component 20 is provided on the corresponding position of the iris camera module 10 to provide supplementary light source when the iris camera module 10 collects the users iris characteristics, so that the quality of the user iris characteristics images is relatively higher; the amount of the fill light component 20 can be two and the two fill light component 20 are symmetrically provided on the corresponding position of the iris camera module 10 to provide supplementary light source when the iris camera module 10 collects the user iris characteristics. In another embodiment of the present invention, the amount of the fill light component 20 can also be more, and each of the fill light component 20 is surround provided in the iris camera module 10, the present invention is not limited in this aspect.

It is worth mentioning that the amount and position of the fill light component 20 described above is exemplary and preferable only and not intended to be limiting.

In other words, in order to improve the reliability of the iris camera module 10 in the user iris characteristics collection, the fill light component 20 provides supplementary light source from at least one orientation of the iris camera module 10, so that when the iris camera module 10 is used to collect the user iris characteristics, the user reflective spot is reduced or the generated user reflective spot is located outside of the iris such as the sclera region.

It is worth mentioning that when the iris camera module 10 collects the user iris characteristics, the shooting method is infrared light black and white photography, as the user is in general environment which has not enough infrared light to support this shooting process, so that high quality of user iris characteristics image is acquired by the fill light component 20 providing additional light source.

Thus, the light source provided by the fill light component 20 is LED infrared light source to meet the shooting needs of the iris camera module 10. The fill light component 20 supplements infrared lights for user binoculus region when the iris camera module 10 collects the user iris characteristics. Wherein the iris camera module 10 is preferably an infrared camera module, so that when the iris camera module 10 collects the user iris characteristics, the interference of the external visible light is avoided as much as possible. Furthermore, the use of the fill light component 20 will not make user binoculus region to feel discomfort, so that when the iris camera module 10 shoots the user binoculus region to acquire images, a uniform brightness is formed in user's iris region. Moreover, not only the accuracy of the user iris characteristics acquisition is improved by the infrared light, but also the efficiency and reliability of the iris recognition device 100 processing user authentication are enhanced.

In this preferred embodiment of the present invention, the fill light component 20 comprises a light emitting element 21, wherein the light emitting element 21 preferably is an infrared LED light-emitting element to ensure that under the condition of the fill light component 20 providing enough additional infrared light for the user iris characteristics collection of the iris camera module 10, the energy consumption of the iris recognition device 100 is reduced and damage caused to the user's eyes is avoided.

Figure 5:
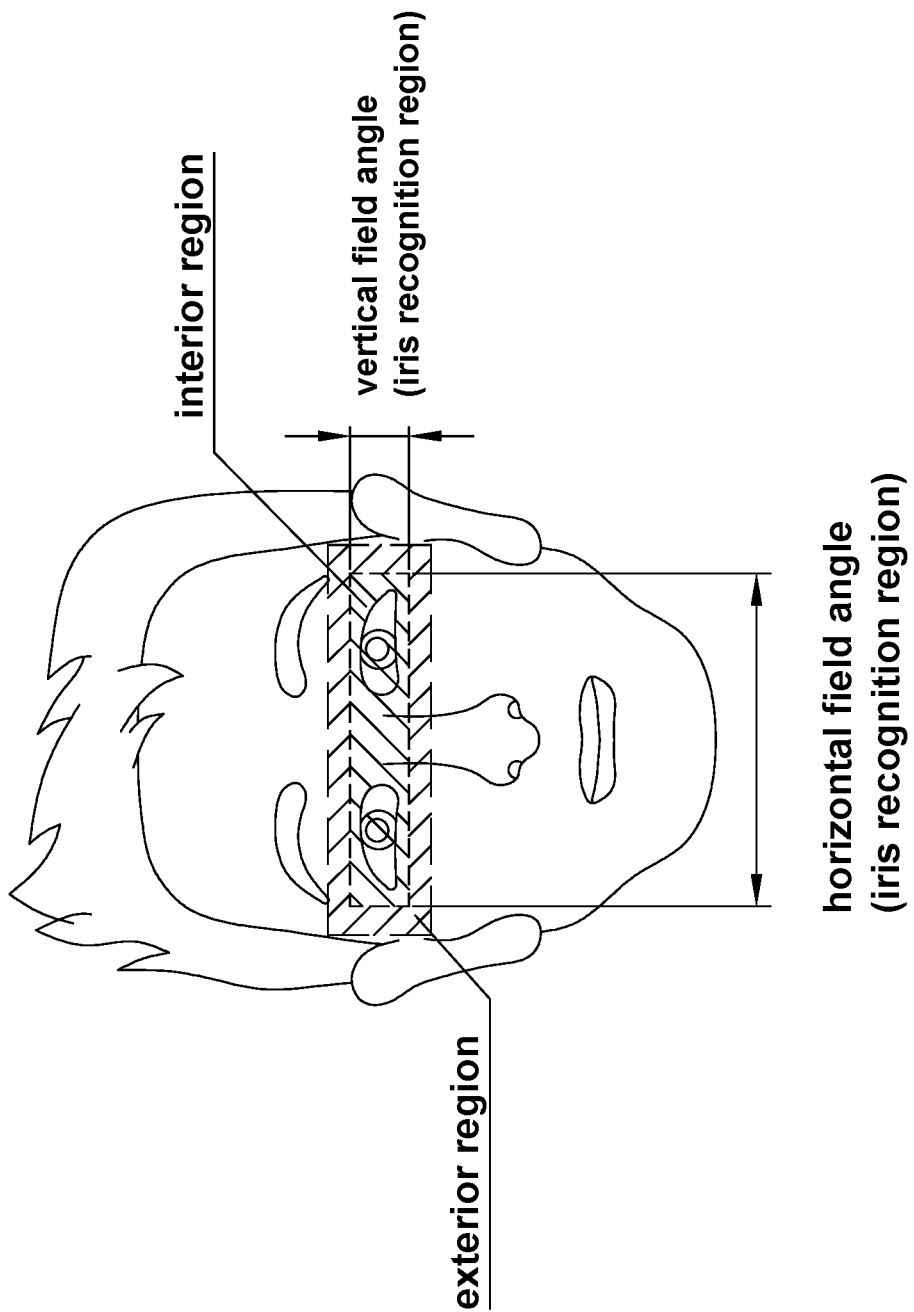
FIG. 5 is a schematic view of the iris camera module and the fill light component in range of a user face coverage area according to above preferred embodiment of the present invention.

As shown in FIG. 5 of the drawings, during the user iris characteristics collecting process by the iris recognition device 100, the iris camera module 10 covering the face region of the user is defined as an interior region, so that the when the iris camera module 10 collects the user iris characteristics, the focal point is substantially in the user's iris region and preferably the focal point is located in the pupil region; accordingly, the fill light component 20 covering outside of the user's face region is defined as an exterior region, so that the user face region covered by the fill light component 20 always comprises the user face region covered by the iris camera module 10 and at least one eye of the user is located in the interior region. In such a manner that the fill light component 20 provides additional infrared light source for the iris camera module 10 in any cases.

It is understandable that the light emitting element 21 of the fill light component 20 has a light emitting angle which is set to be less than 90 degrees, so that the supplemental infrared light source provided by the fill light component 20 is effectively utilized. It is worth mentioning that the light emitting angle of the light emitting element 21 of the fill light component 20 is set to be less than 45 degree, so that under the condition of ensuring that enough supplementary infrared light is provided for the iris camera module 10 by the fill light component 20, the energy depletion of the iris recognition device 100 is reduced.

Figure 6:
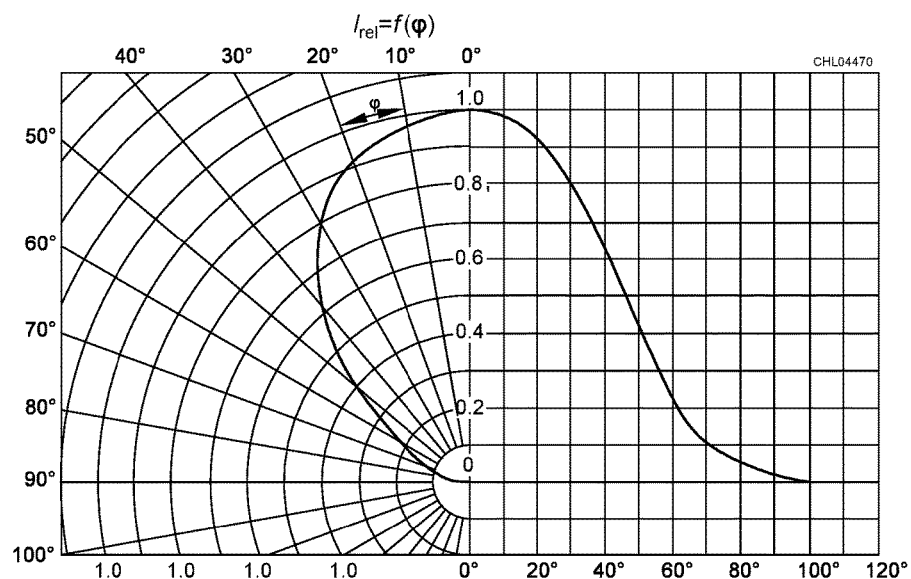
FIG. 6 is a schematic view of the fill light component according to the above preferred embodiment of the present invention, illustrating a relationship between a light emitting angle and an emission intensity of the fill light assembly.

Those skilled in the art will understand that the light emission intensity of the light emitting element 21 of the fill light component 20 is changed with the light emitting angle. As shown in FIG. 6 of the drawings, with the increasing of the light emitting angle of the light emitting element 21, the light emission intensity of the light emitting element 21 becomes smaller, and the light emission intensity of the light emitting element 21 and the light emitting angle has a function change. It is understandable that, according to test results of the light emission intensity of the light emitting element 21 and the light emitting angle, when the light emitting angle of the light emitting element 21 is at an angle between 0 degree and 45 degree, the luminous intensity of the light emitting element 21 changes gently; when the light emitting angle of the light emitting element 21 is at an angle between 45 degree and 90 degree, the light emission intensity of the light emitting element 21 has a rapid change.

As shown in FIG. 6 of the drawings, under an ideal condition, when the light emitting angle of the light emitting element 21 is 0 degree, the light emitting element 21 has the maximum light emission intensity and the depletion energy of the light emitting element 21 is the least. In a specific application of the invention, the iris camera module 10 and the fill light component 20 has a predetermined distance. In order to make the fill light component 20 and the iris camera module 10 to simultaneously act on a same object such as the user iris region, the fill light component 20 and the iris camera module 10 has an angle. According to the test result of the iris recognition device 100, when the light emitting angle of the light emitting element 21 is less than 45 degree, the depletion energy of the light emitting element 21 is the least, and each of the fill light component 20 and the iris camera module 10 has an optimal configuration state.

Figure 7:
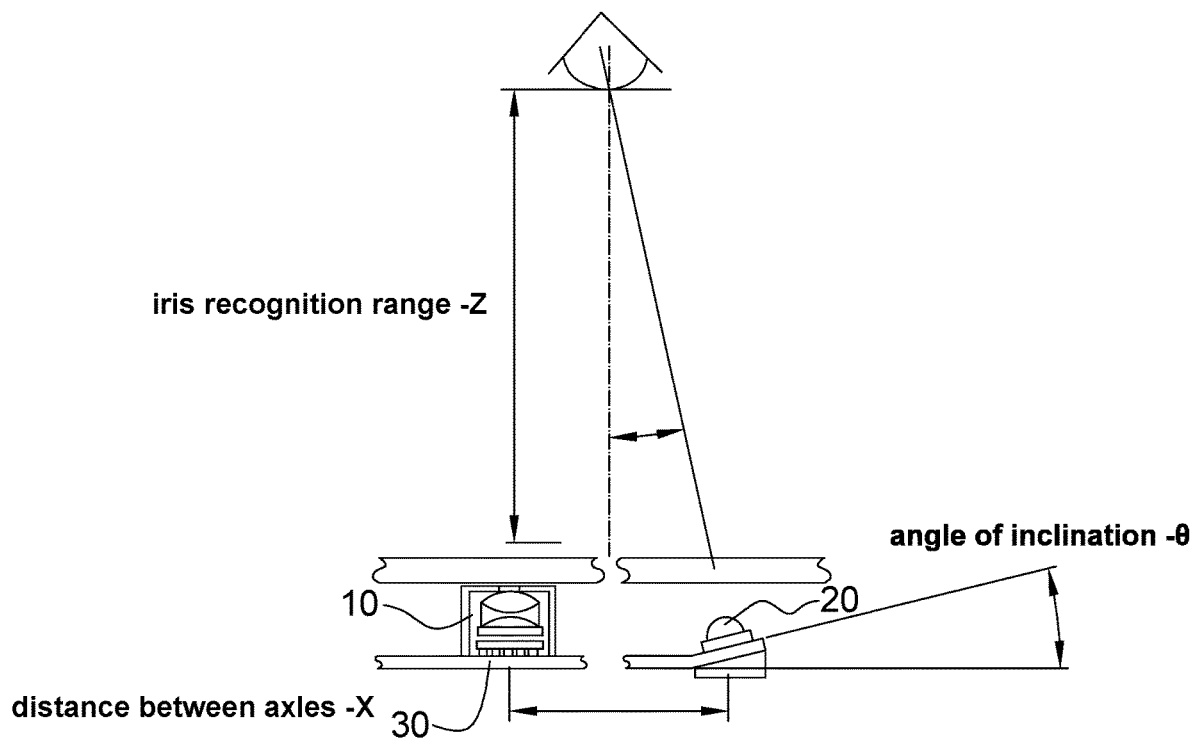
FIG. 7 is a schematic view of a deviation angle and offset distance of the iris camera module and the fill light component according to the above preferred embodiment of the present invention.
Figure 8A:
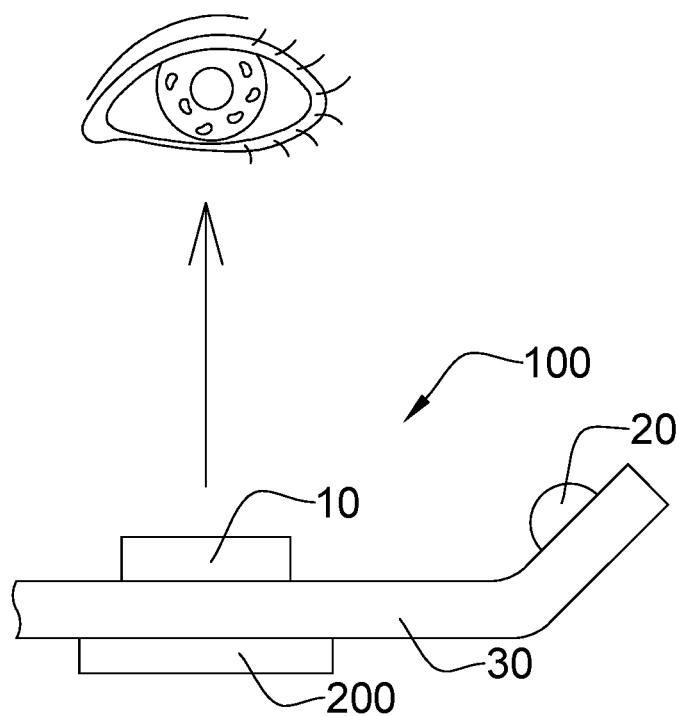
FIG. 8A, FIG. 8B, FIG. 8C and FIG. 8D are schematic views of an application process according to the above preferred embodiment of the present invention.
Figure 8B:
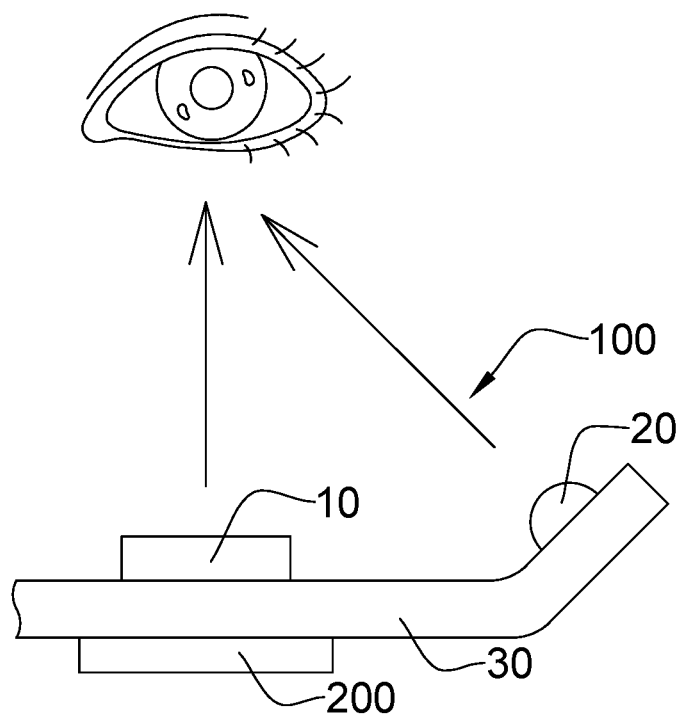
Figure 8C:
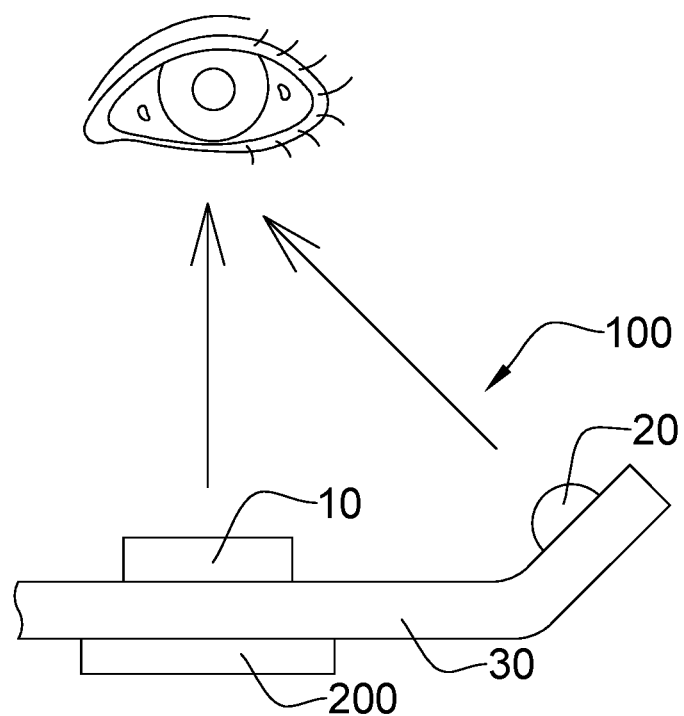
Figure 8D:
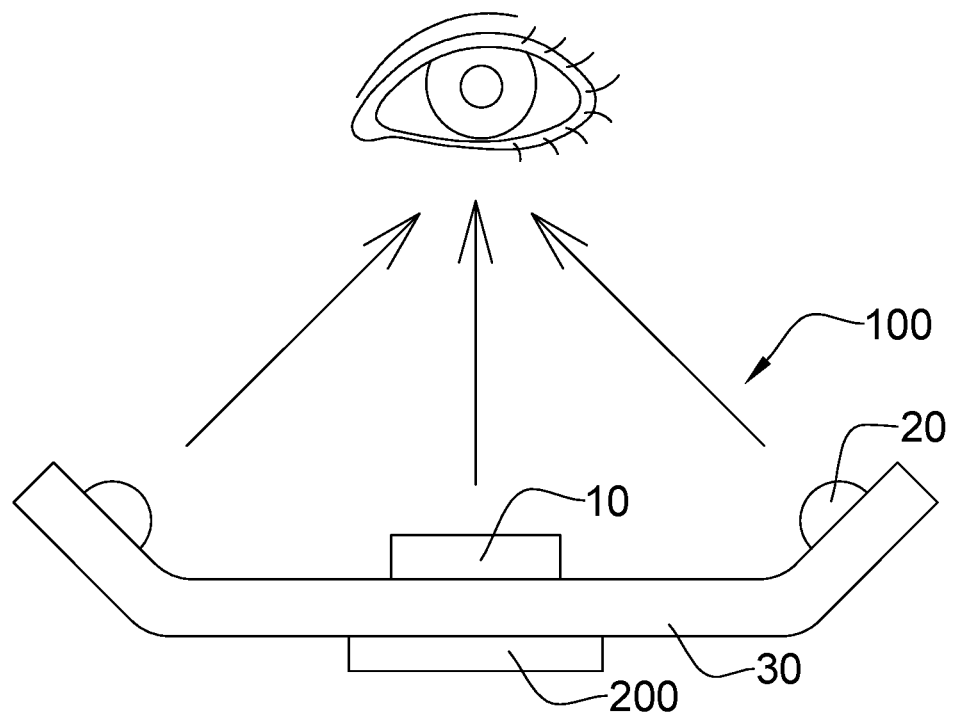

As shown in FIG. 7 of the drawings, a distance between the iris camera module 10 and the user iris is defined as z, an axle distance of the iris camera module 10 and the fill light component 20 is defined as x, an inclination angle of the fill light component 20 is defined as θ, and a formulas relationship of the z, x and θ is $\tan\theta = z/x$. Based on the formulas $\tan\theta = z/x$, a deviation value of the iris camera module 10 and the fill light component 20 is determined. Those skilled in art will understand that when z is in a determinate state, x and θ have a changing rule of the tangent function. The value of x can be determined by adjusting the value of θ or the value of θ can be determined by adjusting the value of x. In this way, the deviation value of the iris camera module 10 and the fill light component 20 can be determined.

It is worth mentioning that, when the angle θ is reasonable, the reflective spots formed on the user iris by the light emitting element 21 is reduced. Alternatively, the reflective spots is located outside of the user iris such as sclera region to avoid the generated reflective spot having interference on the image quality when the iris camera module 10 shoots the user iris characteristics. As shown in FIG. 8A, FIG. 8B, FIG. 8C and FIG. 8D of the drawings, the effects of collected user iris characteristics by the iris recognition device 100 under different states are illustrated. Experiments show that supplement of the infrared light as well as the light emitting angle and the light emission intensity of the fill light component 20 enable that the reflective spots cannot interfere the user iris characteristics collection of the iris camera module 10. Therefore, in some embodiment of the present invention, the angle θ is preferably less than 45 degree. In other words, an angle between the fill light component 20 and the iris camera module 10 is preferably less than 45 degree.

Those skilled in art will understand that when the light emission intensity of the fill light component 20 cannot meet the brightness of the requirement of the iris camera module 10 collecting user iris characteristics, on one hand the brightness of the light emitting element 21 is increased and on the other hand the iris recognition device 100 can be provided with two or more than two fill light component 20.

Figure 9A:
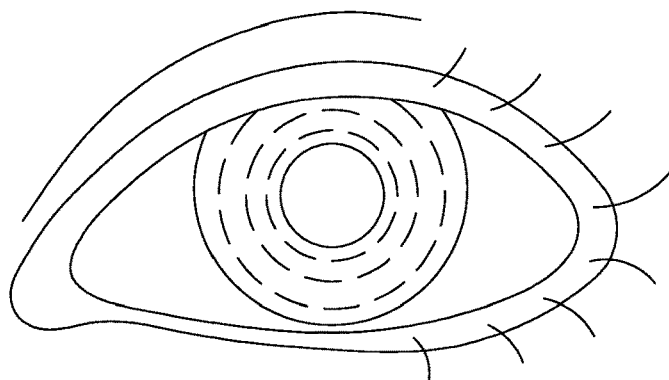
FIG. 9A and FIG. 9B are schematic views of brightness variations of a user iris region under different light source conditions.
Figure 9B:
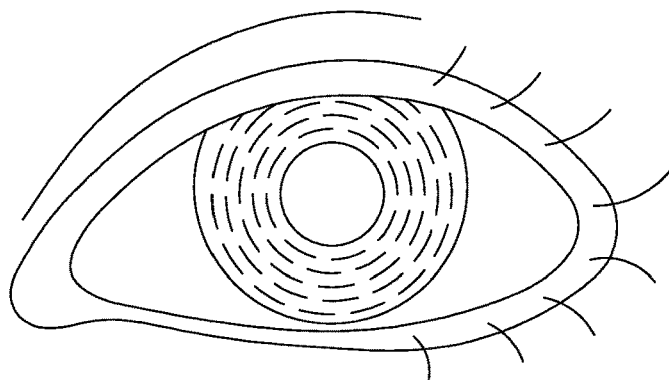

As shown in FIG. 9A and FIG. 9B of the drawings, the brightness variation of the user iris region under different light resources is illustrated.

As shown in FIG. 9A of the drawings, under a natural light condition, when the iris camera module 10 collects the user iris characteristics, the brightness of the user iris region is substantially gradient. In this case, image quality of the user iris characteristics collected by the iris camera module 10 is poor and cannot meet user authentication requirements, thereby resulting in inefficient of the traditional iris recognition technology and being difficult to guarantee accuracy.

As shown in FIG. 9B of the drawing, after the fill light component 20 provides additional light resource for the user iris region, and when the iris camera module 10 collects the user iris characteristics, the brightness of the user iris region is more evenly, so that it is helpful to improve the quality of the user iris characteristics collected by the iris camera module 10 and the reliability of the iris recognition device 100 during using process is improved.

It is worth mentioning that the image quality of the user iris characteristics iris collected by the iris camera module 10 has an important influence on the computing speed and the logic complexity of the iris recognition device 100, and has an impact on the recognition range of the iris recognition device 100. People skilled in the art will understand that when image quality of the user iris characteristics iris collected by the iris camera module 10 is high, the complexity of the logic design of the iris recognition device 100 can be reduced, so that the consumed time of the iris recognition device 100 on user authentication is shortened.

In the preferred embodiment of the present invention, the iris recognition device 100 can achieve long-distance user iris recognition, by the miniaturization of the pixel size of the image sensor of the iris camera module 10 and the quantifiable selector mode of the crosswise pixel quantity, and combining with the design value of the lens hfov to extend the recognition distance of the iris recognition device 100, the iris recognition device 100 can be achieved the long-distance user to iris recognition by these rational design.

Specifically, the image sensor of the iris camera module 10 provides a small diameter pixel and when the iris camera module 10 collects the user iris characteristics, the number of pixels in the binoculus region is at least 10 pixels/mm and the total pixel resolution of the binoculus region is at least 1920×800 in order to meet the minimum requirements of iris recognition algorithms. Furthermore, when the iris camera module 10 collects the user iris characteristics, the resolving power of the binoculus region is at least 450 LW/PH (0.8 F).

Figure 10:
FIG. 10 is a flow diagram of a fill light method in the iris recognition applications according to a preferred embodiment of the present invention.

Accordingly, as shown in FIG. 10 of the drawings, a fill light method of an iris recognition application of the present invention is illustrated, wherein the fill light method comprises the following steps.

(a) Provide an iris camera module 10 and the user's pupil is substantially focal point, and collect user iris characteristics by capturing uniform brightness from the focal point to all around.

Figure 11A:
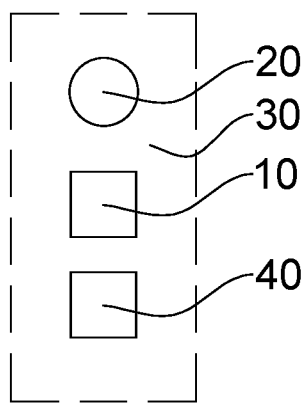
FIG. 11A, FIG. 11B and FIG. 11C are schematic views of an iris recognition device according to a preferred embodiment of the present invention.
Figure 11B:
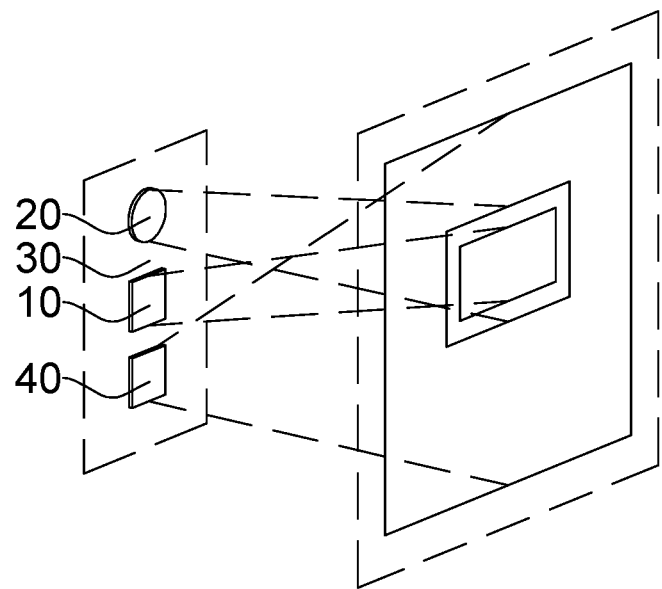
Figure 11C:
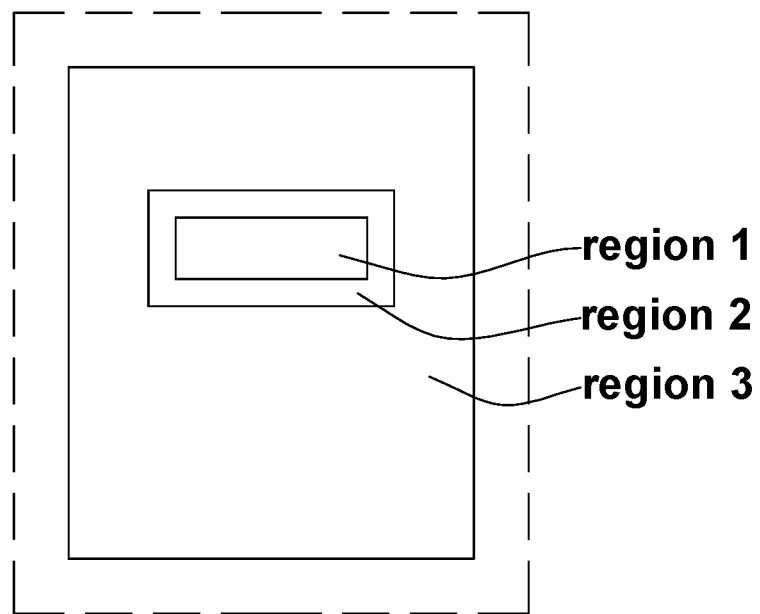
Figure 12:
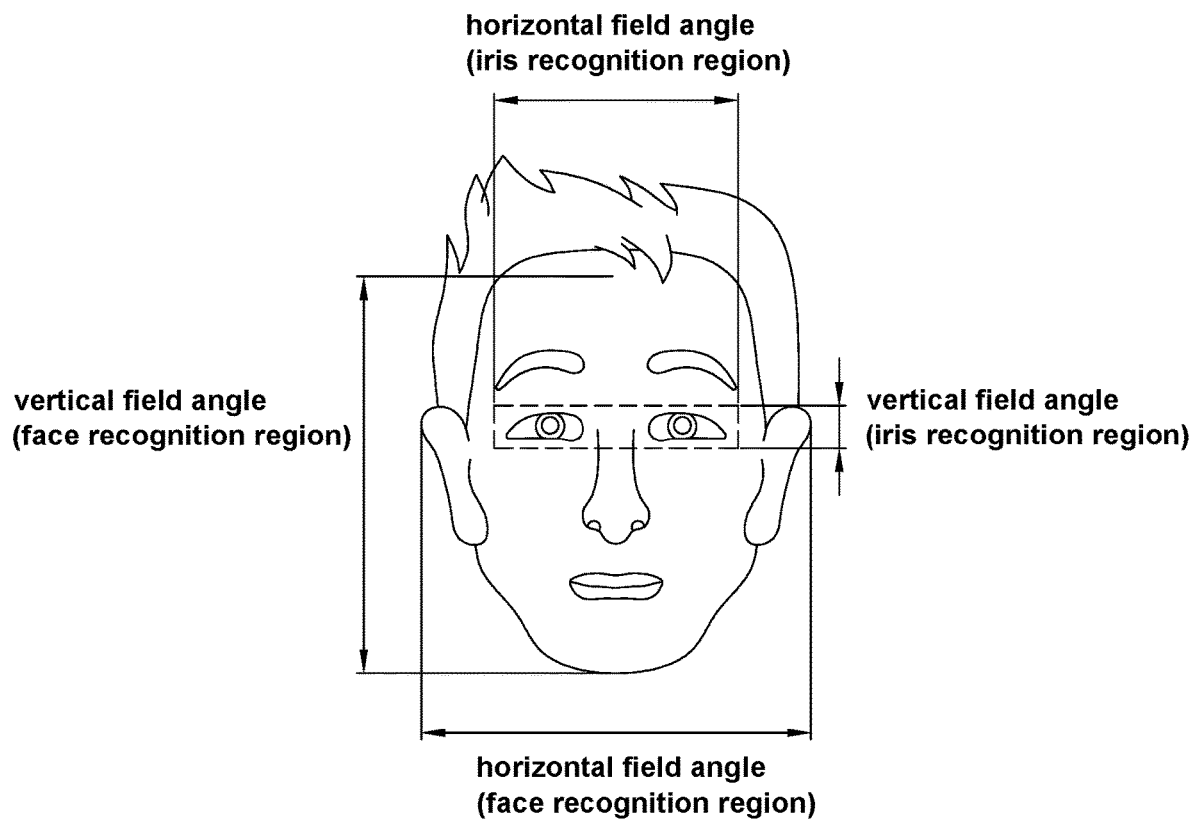
FIG. 12 is a schematic view of a field angle relationship of the iris recognition device of the present invention.

As shown in FIG. 11A to FIG. 12 of the drawings, the iris recognition device 100 is provided with a human face camera module 40, wherein the human face camera module 40 is mounted on the printed circuit board 30 such that the iris recognition device 100 simultaneously collects the user facial and iris characteristics, so that user authentication accuracy of the iris recognition device 100 is improved by increasing information of user characteristics captured by the iris recognition device 100.

As shown in FIG. 11A of the drawings, the iris camera module 10, the human face camera module 40 and the fill light component 20 are integrated on the iris recognition device 100, wherein the iris camera module 10 can collect one eye user iris characteristics or binoculus user iris characteristics. The fill light component 20 provides additional fill light resource for the collected iris region. The human face camera module 40 collects user facial characteristics and in the follow-up, the user facial and iris characteristics are transferred to the background processing component 200 for processing.

It is worth mentioning that the iris camera module 10 has a higher pixel resolution which is up to at least 1920×800 to have a higher quality of the generated image when the user iris characteristics is collected. Correspondingly, the human face camera module 40 can have a lower pixel in order to ensure that the cost of the iris recognition device 100 is reduced based on ensuring the actual value of the use of the iris recognition device 100.

It is worth mentioning that, when the iris recognition device 100 collects the user facial and iris characteristics, the iris camera module 10 and the human face camera module 40 can simultaneously collect the user's iris and facial characteristics. Alternatively, the iris camera module 10 and the human face camera module 40 can respectively collect the user's iris and facial characteristics, and then to be processed by the background processing component 200 in the subsequent.

As shown in FIG. 11B and FIG. 11C of the drawings, when the iris recognition device 100 collects the user facial and iris characteristics, the region of the iris camera module 10 covering the user face is defined as a region 1, and the region of the fill light component 20 covering the user face is defined as region 2. Accordingly, the region of the human face camera module 40 covering the user face is defined as a region 3. Wherein the user eyes are located on the region 1, and the relationship of the region 1, region 2 and region 3 is: area of the region 3 comprises the area of the region 2 and the area of the region 2 comprises the area of the region 1.

Thus, in some embodiment of the present invention, the human face camera module 40 can also collect user iris characteristics and then in the process of processing the user biometric characteristics, the iris characteristics collected by the human face camera module 40 is modified by the iris characteristics collected by the iris camera module 10, thereby identifying user's identity.

It is worth mentioning that, by adjusting the position of the iris camera module 10, the fill light component 20 and the human face camera module 40, the positions and inclusion relationships of the above disclosed regions can be meet or changed.

As shown in FIG. 12 of the drawings, the horizontal field angle of the iris camera module 10 is defined as the length direction of the user binoculus and the vertical field angle of the iris camera module 10 is defined as the width direction of the user binoculus. Accordingly, the horizontal field angle of the human face camera module 40 is defined as the length direction of the user face and the vertical field angle of the human face camera module 40 is defined as the width direction of the user face. When providing the angle between the fill light component 20 and the iris camera module 10, in order to ensure that the generated light of the light emitting element 21 of the fill light component 20 can cover the region which the iris camera module 10 covers, the light emitting angle of the light emitting element 21 of the fill light component 20 is respectively greater than the horizontal field angle and the vertical field angle of the iris camera module 10. In this way, it can make the coverage range of the fill light component 20 to be greater than the coverage range of the iris camera module 10 in the same projection range.

In addition, the horizontal field angle of the human face camera module 40 is greater than iris camera module 10 thereof, and accordingly, the vertical field angle of the human face camera module 40 is greater than the iris camera module 10 thereof. Thus, it can make the actuating range of the human face camera module 40 to cover the actuating range of the iris camera module 10.

Figure 13:
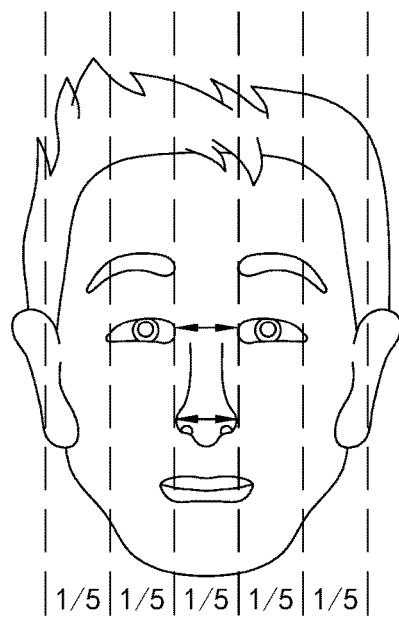
FIG. 13 and FIG. 14 are schematic views of a proportion of a binoculus region in a face region of the present invention.
Figure 14:
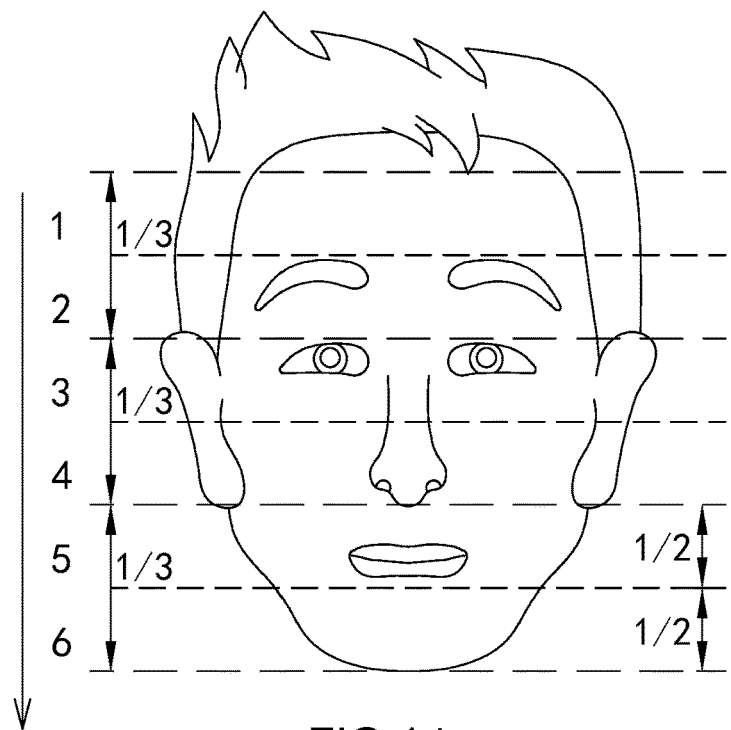
Figure 15:
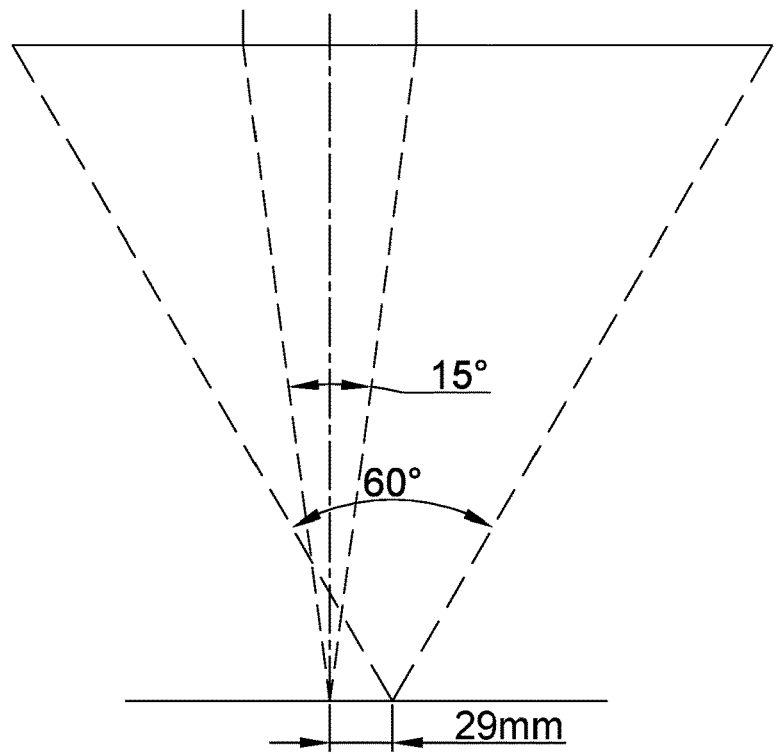
FIG. 15 is a schematic view of a relationship with a human face camera module and the above iris camera module of the present invention.

As shown in FIG. 13 and FIG. 14 of the drawings, viewing from the horizontal direction, the width distance of the human eyes region approximately occupies ⅗ of the width distance of the user face region; accordingly, viewing from the longitudinal direction, the longitudinal distance of the human eyes region roughly occupied ⅙ of the longitudinal distance of the user face region, and the human eyes region is located on ⅗ of the user face region (with reference to the direction as shown in FIG. 14 of the drawings). Those skilled in the art will understand that the width and longitudinal distance of the human eyes region, and the location of the human eyes region on the user face region have important implications on the position of the iris camera module 10 and the human face camera module 40. Specifically, as shown in FIG. 15 of the drawings, in some embodiments of the present invention, when the iris camera module 10 of the iris recognition device 100 and the human face camera module 40 are longitudinally arranged, a distance from the iris recognition device 100 to user face is 30 cm-40 cm (it is worth mentioning that, in a preferred embodiment of the present invention, compared to the traditional iris recognition technology, 30 cm-40 cm is the effective recognition distance of the iris recognition device 100).

Within a distance range of 30 cm-40 cm, the horizontal field angle of the iris camera module 10 is approximately iris camera module 10 to printed circuit board 30 degree, the vertical filed angle of the iris camera module 10 is approximately 15 degree; accordingly, the horizontal field angle of the human face camera module 40 is approximately sound acquisition component 60 degree, the vertical filed angle of the human face camera module 40 is approximately 38 degree. In order to make the recognition region of the human face camera module 40 covers user face region and the recognition region of the iris camera module 10 covers the user binoculus region at the same time, a relative distance of the iris camera module 10 and the human face camera module 40 is approximately 29 mm.

In other embodiments of the present invention, when the iris camera module 10 of the iris recognition device 100 and the human face camera module 40 are horizontally arranged, a relative distance of the iris camera module 10 and the human face camera module 40 is obtained by respectively setting suitable horizontal and vertical filed angle of the iris camera module 10 and the human face camera module 40.

Those skilled in the art will understand that, when the distance from the iris recognition device 100 to the user face is changed, on one hand, it can be achieved by adjusting the horizontal and vertical filed angle of the iris camera module 10 and the human face camera module 40; on the other hand, the it can be achieved by adjusting a relative distance of the iris camera module 10 and the human face camera module 40.

Figure 16:
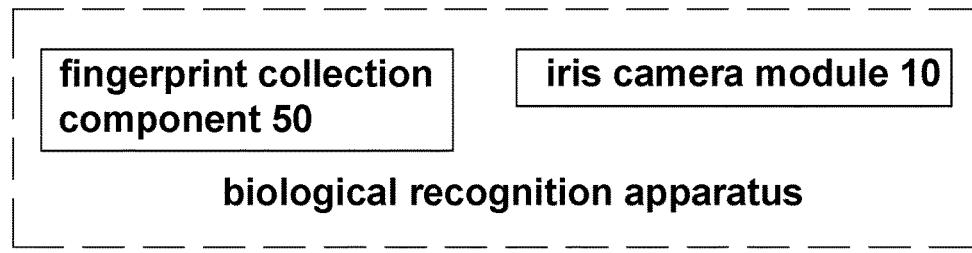
FIG. 16 is a block diagram of an iris recognition device according to an alternative mode of the present invention.

As shown in FIG. 16 of the drawings, in other embodiments of the present invention, the iris recognition device 100 is provided with a fingerprint collection component 50 for collecting user fingerprint characteristics, wherein the fingerprint collection component 50 is coupled to the printed circuit board 30, thereby forming a biometric recognition device.

In this embodiment, the fingerprint collection component 50 collects the user fingerprint characteristics so as to assist the user iris characteristics collected by the iris camera module 10 for user authentication, thereby improving reliability of the iris recognition device 100.

Figure 17:
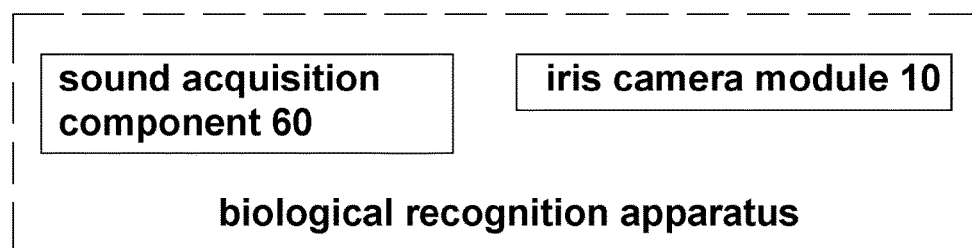
FIG. 17 is a block diagram of an iris recognition device according to another alternative mode of the present invention.

As shown in FIG. 17 of the drawings, in other embodiment of the present invention, the iris recognition device 100 further comprises a sound acquisition component 60 for collecting user voice characteristics, wherein the sound acquisition component 60 is coupled to the printed circuit board 30.

In this embodiment, the sound acquisition component 60 collects the user voice characteristics so as to assist the user iris characteristics collected by the iris camera module 10 for user authentication, thereby improving reliability of the iris recognition device 100.

Figure 18:
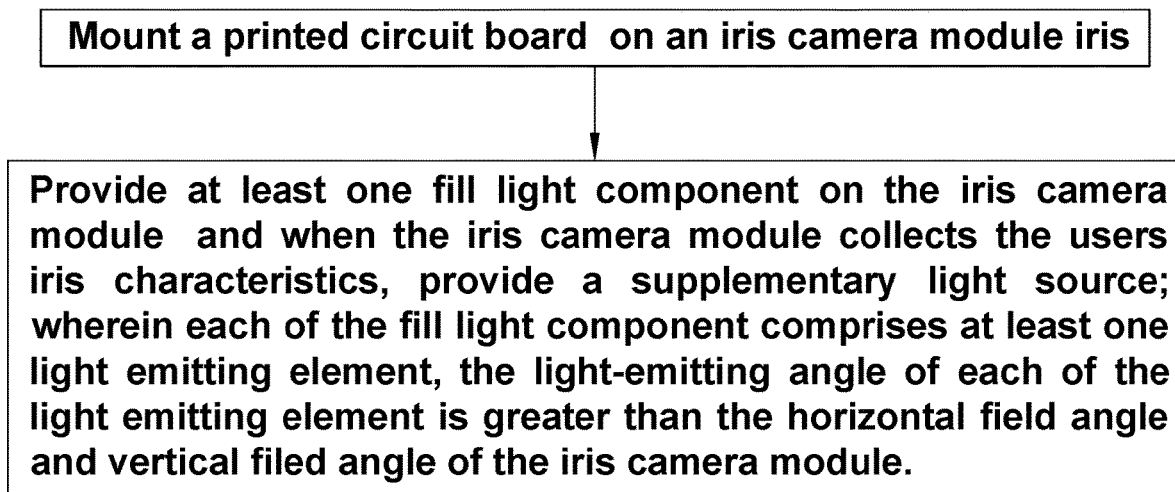
FIG. 18 is a manufacturing process diagram of the above iris recognition device of the present invention.

Accordingly, as shown in FIG. 18 of the drawings, a manufacturing method of an iris recognition device 100 of the present invention is illustrated, wherein the manufacturing method comprises the following steps.

(A) Mount a printed circuit board 30 on an iris camera module 10.

(B) Provide at least one fill light component 20 on the iris camera module 10, and when the iris camera module 10 collects the users iris characteristics, provide a supplementary light source; wherein each of the fill light component 20 comprises at least one light emitting element 21, the light-emitting angle of each of the light emitting element 21 is greater than the horizontal field angle and vertical filed angle of the iris camera module 10.

Figure 19:
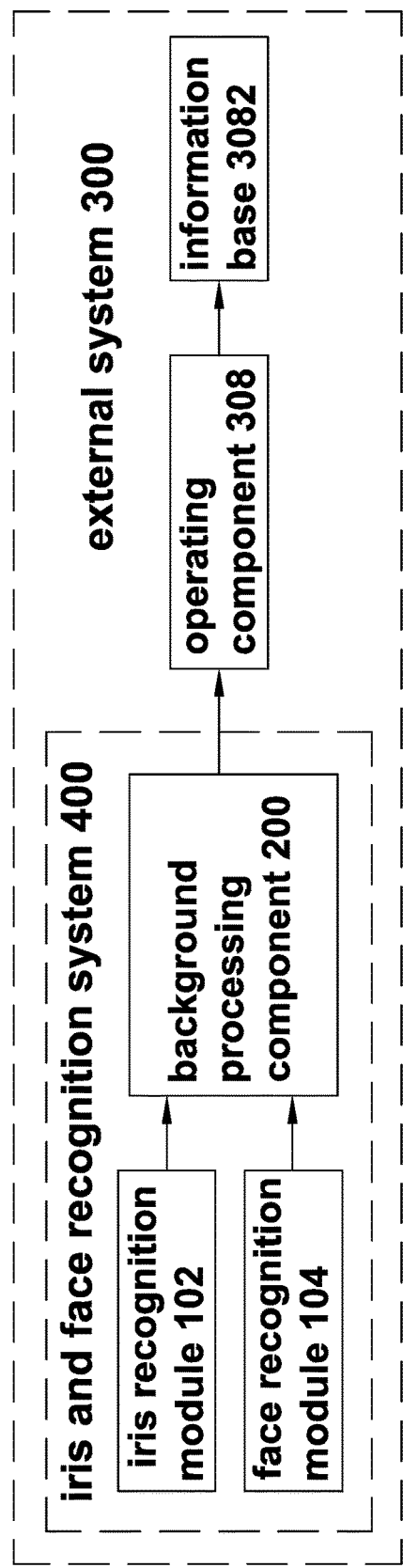
FIG. 19 is a block diagram of an iris and face recognition system according to a preferred embodiment of the present invention.
Figure 20:
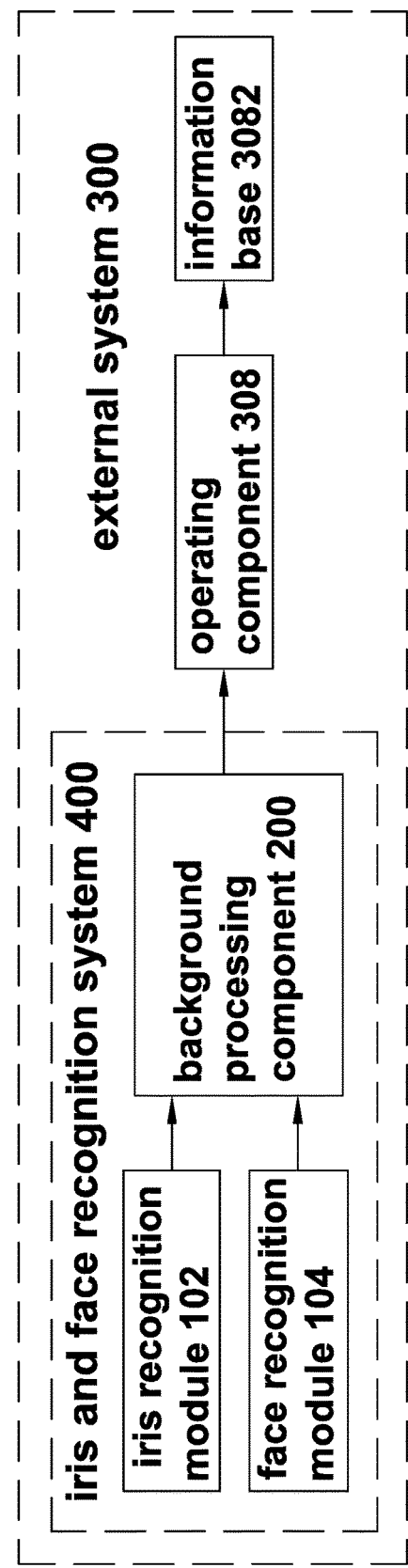
FIG. 20 is a block diagram of an iris and face recognition system according to another preferred embodiment of the present invention.

It is worth mentioning that, according to another aspect of the present invention, the present invention also provides an iris and face recognition system 400, wherein the iris and face recognition system 400 applies the iris recognition device 100 of the present invention. Specifically, as shown in FIG. 19 and FIG. 20 of the drawings, the iris and face recognition system 400 according to different embodiment are illustrated. Wherein the iris and face recognition system 400 comprises an iris recognition module 102, a face recognition module 104 and the background processing component 200. Wherein the iris recognition module 102 and the face recognition module 104 are respectively to capture the iris and the facial characteristics of a user 500, and thereafter, the iris and the facial characteristics of the user 500 are respectively generated an image data flow 202 to transmit to the background processing component 200 for subsequent processing.

Figure 21:
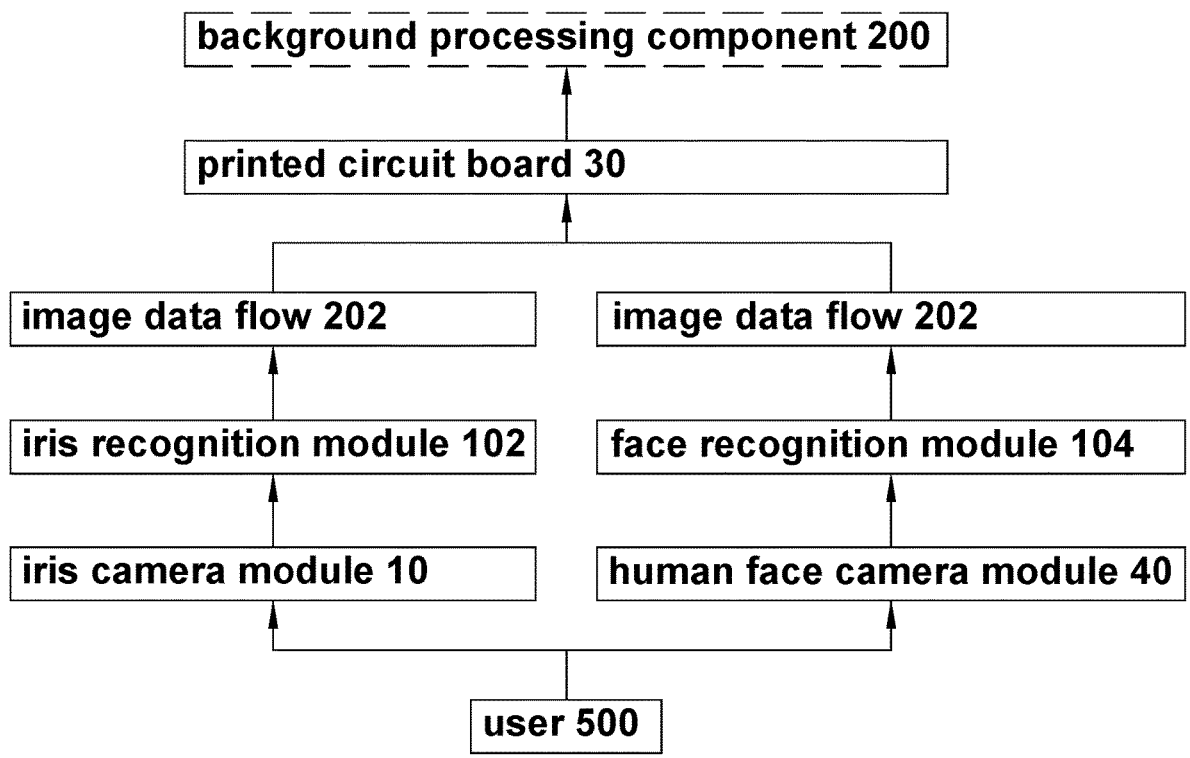
FIG. 21 is a schematic view of an iris and face recognition system according to a preferred embodiment of the present invention.

As shown in FIG. 21 of the drawings, in some embodiments of the present invention, the iris and face recognition system 400 further comprises the printed circuit board 30, wherein the iris recognition module 102, the face recognition module 104 and the background processing component 200 are respectively mounted on the printed circuit board 30 such that the iris recognition module 102 and the face recognition module 104 are communicatively connected with the background processing component 200. Furthermore, such a manner can ensure that the iris and face recognition system 400 captures the iris and facial characteristics of the user 500 and then the generated image data flow 202 is effectively transferred to the background processing component 200.

Figure 22:
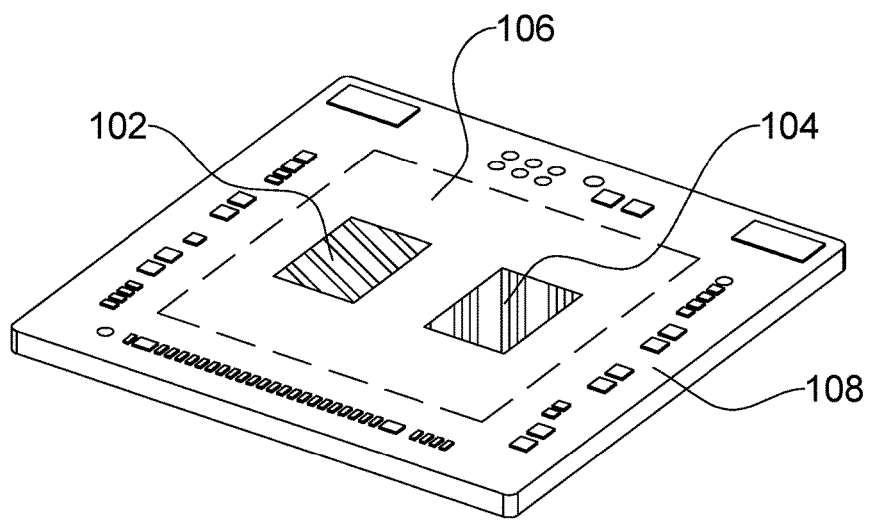
FIG. 22 is a schematic view of an iris and face recognition system according to another preferred embodiment of the present invention.

Referring to FIG. 22 of the drawings according to other embodiment of the present invention, the iris recognition module 102 and the face recognition module 104 are respectively mounted on the printed circuit board 30. The background processing component 200 is disposed or provided to an external system 300. The iris and face recognition system 400 connects with the external system 300 by an access port and the external system 300 can also be wirelessly connected to the iris and face recognition system 400. In other words, the iris recognition module 102 and the face recognition module 104 are respectively and communicatively connected to the background processing component 200.

It is worth mentioning that the iris recognition module 102 and the face recognition module 104 can be selectively connected and communicatively connected to the background processing component 200 by a wired or wireless connection. As a preferred embodiment, the iris recognition module 102 and the face recognition module 104 are communicatively connected to the background processing component 200 via Wi-Fi, Li-Fi, internet, communication networks, and Bluetooth and so on.

As shown in FIG. 19 of the drawings, the iris and face recognition system 400 is integrated on external system 300, and the iris and face recognition system 400 and external system 300 are communicatively connected via one or more cable transmission lines for wired connection or via Bluetooth, Wi-Fi and other communications for wireless connection, so that the user iris and facial characteristics of the user 500 which are collected by the iris and face recognition system 400 can be effectively transmitted to the external system 300.

Combined with an object of the present invention, as shown in FIG. 20 of the drawings on one embodiment, the iris and face recognition system 400 is also be applied in the traditional external system 300, so that by connecting the iris and face recognition system 400 to the traditional external system 300, the mounting of the iris and face recognition system 400 and the external system 300 is achieved.

It is worth mentioning that, the iris and face recognition system 400 and the external system 300 can also be communicatively coupled via a wired or wireless connection so as to easy to use.

In some embodiment of the present invention, the external system 300 can be implemented as an apparatus 302 and/or an electronic device 304 and/or an application program 306, etc., and the iris and face recognition system 400 is communicatively connected with the apparatus 302, the electronic device 304 and the application program 306.

It is worth mentioning that the external system 300 comprises but not restricted to access control devices, safety devices, mobile communication devices, handheld electronic devices, personal digital assistants, tablet PCs, laptops, servers, and etc. Those skilled in the art should be understood that the external system 300 also comprise a combination of two or more than two thereof. It should also be understandable that the external system 300 is only as an example to elaborate and expose the contents of the present invention to aid those skilled in the art to better understand the present invention. The external system 300 further comprises contents more than the drawings and embodiments described, or the external system 300 also have other forms and implements.

Figure 23:
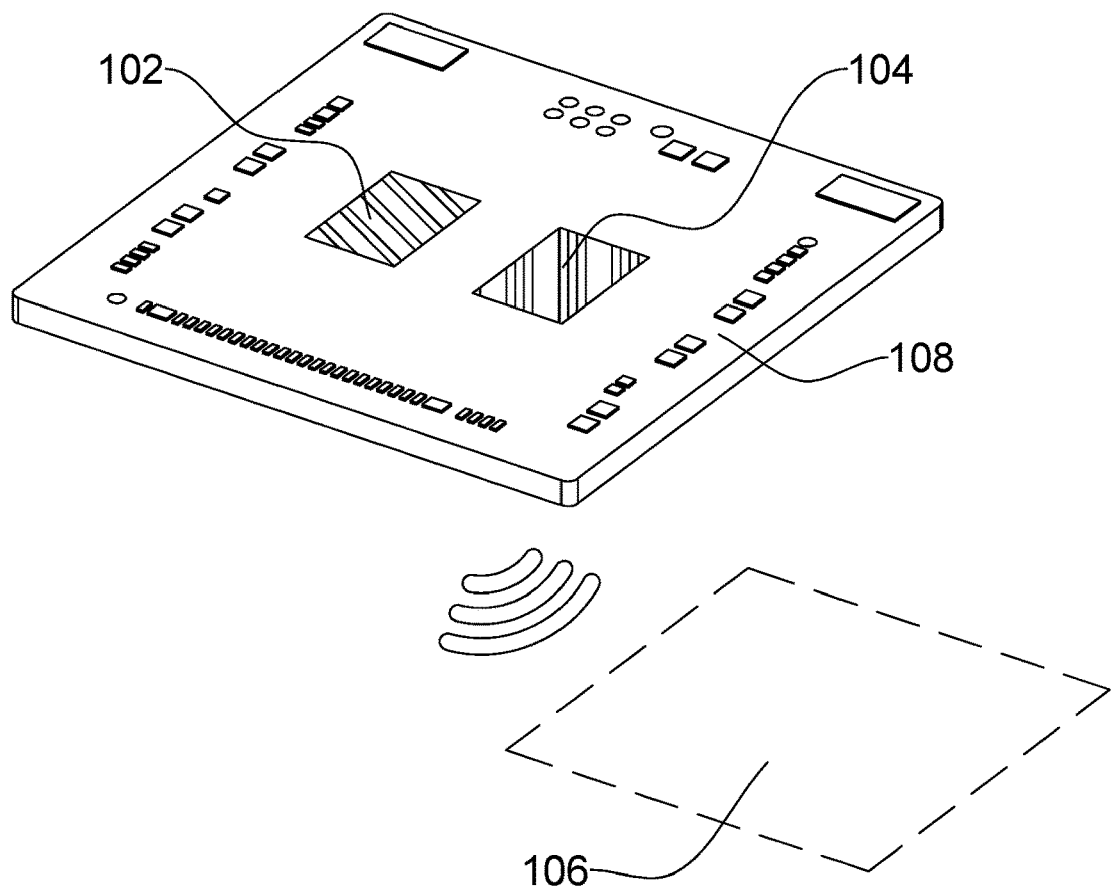
FIG. 23 is a schematic view of the iris and face recognition system according to a preferred embodiment.

As shown in FIG. 23 of the drawings, the iris recognition module 102 further comprises the iris camera module 10, wherein the iris camera module 10 shoots the iris region of the user 500 to collect the iris characteristics of the user 500 and generates the image data flow 202 in the subsequent. In order to make the iris recognition module 102 to have a higher shooting quality, the iris recognition module 102 is provided a number of elements having filling light function to cooperate with the iris camera module 10.

It is worth mentioning that the quality of the iris characteristics captured by the iris recognition module 102 has an important impact on the subsequent operation speed and the logic complexity of the iris and face recognition system 400, and has an impact on the recognition range and ability of the iris recognition module 102. Those skilled in the art will understand that, the higher the quality of the iris characteristics of the user 500 captured by the iris recognition module 102 is, the lower the logic complexity of the iris and face recognition system 400 is, and the shorter the consumed time of the iris and face recognition system 400 identifying the user 500 is.

In the preferred embodiment of the present invention, the image data flow 202 enables a long-distance user iris recognition, by the miniaturization of the pixel size of the image sensor and the quantifiable selector mode of the crosswise pixel quantity, and combining with the design value of the len to extend the recognition distance of the iris recognition module 102, the iris recognition module 102 can be achieved the long-distance user iris recognition by these rational design.

Accordingly, the face recognition module 104 further comprises the human face camera module 40, wherein the human face camera module 40 collects the face characteristics of the user 500 and generates the image data flow 202 in the subsequent. In some embodiments of the present invention, in order to make the iris and face recognition system 400 to have a higher image quality based on the iris and face recognition system 400 having a lower cost, the iris camera module 10 provided by the iris recognition module 102 has a higher pixel to collect the iris characteristics of the user 500. In some embodiments, the iris camera module 10 only needs to capture the iris characteristics of one eye of the user 500, while in other embodiments, the iris camera module 10 can capture binoculus iris characteristics of the user 500 and has a high quality. Accordingly, the human face camera module 40 provided by the face recognition module 104 can have a lower pixel.

It is worth mentioning that, when the iris and face recognition system 400 captures the user iris and facial characteristics of the user 500, the iris recognition module 102 and the face recognition module 104 can acquire an image at the same time or acquire the image respectively, and then the background processing component 200 has an integrity process on the characteristics captured by the iris recognition module 102 and the face recognition module 104 to generate relevant identity information of the user 500.

In some embodiments of the present invention, the face recognition module 104 can capture the facial characteristics of the user 500, and generates the image data flow 202; the iris recognition module 102 can capture the iris characteristics of the user 500 and generates the image data flow 202, then, the two types of the image data flow 202 are separately transmitted to the background processing component 200 for calculating and to generate the identity information of the user 500.

In other embodiments of the present invention, the face recognition module 104 can respectively capture the facial characteristics and iris characteristics of the user 500, and generates the image data flow 202. The iris recognition module 102 can capture the iris characteristics of the user 500 and generates the image data flow 202, and then, the two types of the image data flow 202 are separately transmitted to the background processing component 200 for calculating, wherein during the background processing component 200 processing the image data flow 202, the iris characteristics recognized by the face recognition module 104 is modified by the iris characteristics recognized by the iris recognition module 102, thereby generating the identity information of the user 500.

Figure 24A:
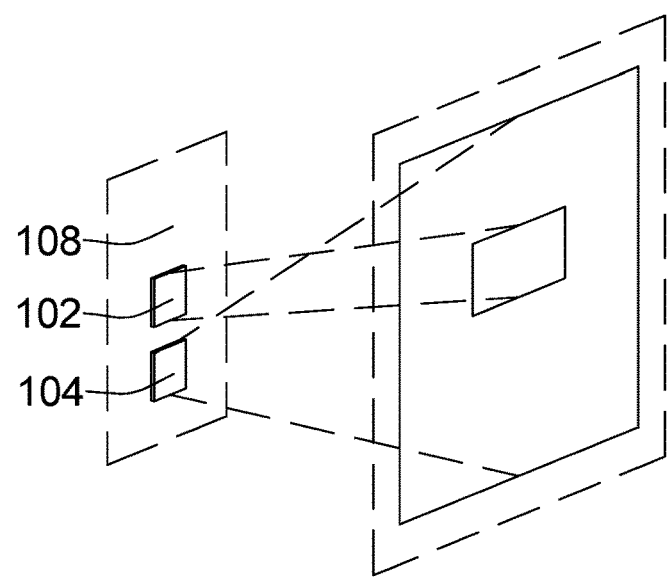
FIG. 24A and FIG. 24B are application state schematic views of the iris and face recognition system of the present invention.
Figure 24B:
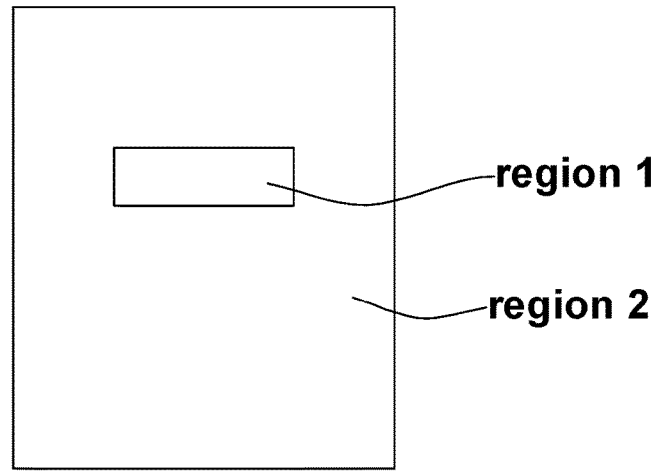

As shown in FIG. 12 of the drawings, the horizontal field angle of the face recognition module 104 is defined as is defined as the length direction of the user face and the vertical field angle of the face recognition module 104 is defined as the width direction of the user face. As shown in FIG. 24A and FIG. 24B of the drawings, when the iris and face recognition system 400 captures the facial and iris characteristics of the user 500, the region of the iris recognition module 102 covering the face of the user 500 is defined as a region 1, and the region of the face recognition module 104 covering the face of the user 500 is defined as region 2. Accordingly, the region of the human face camera module 40 covering the user face is defined as a region 3. Wherein, the region 1 is comprised by the region 2 so that the facial characteristics of the user 500 recognized by the face recognition module 104 comprises the iris characteristics of the user 500 recognized by the iris recognition module 102.

It is worth mentioning that, by adjusting the positions of the iris recognition module 102 and the face recognition module 104, the positions and inclusion relationships of the above disclosed regions covering the user 500 can be meet or changed.

Additionally, in some embodiments, the positional relationship and shooting range of the iris recognition module 102 and the face recognition module 104 can be automatically adjusted according to different needs, and the exposure of the iris recognition module 102 and the face recognition module 104 can also be automatically controlled, so that the iris and face recognition system 400 meets the needs of the user 500 in different environments.

It is worth mentioning that, when the users iris and facial characteristics captured by the iris recognition module 102 and the face recognition module 104 are generated the image data flow 202, the image data flow 202 is transmitted to the background processing component 200 for follow-up processing via one or more communication lines or other wired connections or via Bluetooth, Wi-Fi and other wireless connections. Preferably, the transmission mode is USB data Endpoint, and its advantage is reflected that the USB terminal is able to simultaneously control and process the image data flow 202 which is captured by the iris recognition module 102 and the face recognition module 104, thereby increasing recognition rate of the iris and face recognition system 400.

The background processing component 200 can simultaneously process the images captured by the iris recognition module 102 and the face recognition module 104, and also enables conversion between black and white and color images so as to improve the recognition speed of the iris and face recognition system 400 recognizing the identity information of the user 500.

It is worth mentioning that the iris and face recognition system 400 can also be used as implantable device configured on the traditional external system 300, and the iris and face recognition system 400 can cooperated with the operating system of the external system 300 to form the implantable recognition system, thereby effectively ensuring the information security of user 500.

As shown in FIG. 19 and FIG. 20 of the drawings, the external system 300 further comprises an operating component 308, wherein the background processing component 200 is communicatively connected to the operating component 308. The operating component 308 further comprises an information base 3082, wherein the identity information of the user 500 generated by the background processing component 200 is invoked by the operating component 308, and the operating component 308 also invokes the identity information of the user 500 which is stored in the information base 3082. Furthermore, the operating component 308 compares the regenerated user identity information of the user 500 with the identity information of the user 500 which is stored in the information base 3082, thereby identifying the user 500.

Specifically, when the user 500 requires the external system 300, firstly, the external system 300 drives the iris and face recognition system 400 to shoot the iris and facial characteristics of the user 500, and respectively generates the image data flow 202 carrying the iris and facial characteristics of the user 500 in the follow-up and further transmits the image data flow 202 to background processing component 200; secondly, the operating component 308 can respectively invoke the identity information of the user 500 of the background processing component 200 to compare with the identity information of the user 500 which is stored in the information base 3082; if the comparison is matched, the user 500 continues to operate the external system 300, if the comparison fails then the external system 300 is maintained in the original state.

Accordingly, the present invention provides a manufacturing method for the iris and face recognition system 400, wherein the method comprises the following steps.

(A) Mount an iris recognition module 102 and a face recognition module 104 respectively on a printed circuit board 30.

(B) Communicatively connect a background processing component 200 to the printed circuit board 30.

It is worth mentioning that, the iris recognition module 102 and the face recognition module 104 are respectively mounted on the printed circuit board 30. In other words, the iris recognition module 102 and the face recognition module 104 are respectively coupled with the printed circuit board 30, and when the background processing component 200 is communicatively connected to the printed circuit board 30, the communicatively connections of the iris recognition module 102 with the background processing component 200 and the face recognition module 104 with the background processing component 200 are achieved.

According to one embodiment of the present invention, the step (b) further comprises the step of:

mounting the background processing component 200 on the printed circuit board 30; or selectively and communicatively connecting the background processing component 200 and with the printed circuit board 30 via a wired or a wireless connection.

In other words, the background processing component 200 is mounted on the printed circuit board 30 such that the iris recognition module 102, the face recognition module 104 and the background processing component 200 are integrated together to facilitate to use; alternatively, the printed circuit board 30 and the background processing component 200 are selectively and communicatively connected via a wired or a wireless connection so as to ensure the reliability of the iris and face recognition system 400 during using.

It is worth mentioning that, according to one aspect of the present invention, the present invention also provides a constructing method of the facial characteristics, wherein the method comprises the following steps.

(A) Capture the facial characteristics of a user 500 by a face recognition module 104 and generate an image data flow 202 and transmit the image data flow 202 to a background processing component 200.

(B) Capture the iris characteristics of the user 500 by a iris recognition module 102 and generate an image data flow 202 and transmit the image data flow 202 to the background processing component 200.

(C) The background processing component 200 converts the image data flow 202 to generate the identity information of the user 500, and transmits to an operating component 308 for encoding process so as to construct the facial characteristics of the user 500.

It is worth mentioning that, the step (B) is finished before or is finished with the step (A). Thus, capture the iris characteristics of the user 500 at first, then capture the facial characteristics of the user 500, or simultaneously capture the iris characteristics and the facial characteristics of the user 500.

According to another aspect of the present invention, the present invention also provides a constructing method of the facial characteristics, wherein the method comprises the following steps.

(i) Capture the iris and facial characteristics of a user 500 by a face recognition module 104 and generate an image data flow 202 and transmit the image data flow 202 to a background processing component 200.

(ii) Capture the iris characteristics of the user 500 by a iris recognition module 102 and generate an image data flow 202 and transmit the image data flow 202 to the background processing component 200.

(iii) The background processing component 200 modifies the iris characteristics of the user 500 captured by the face recognition module 104 using the iris characteristics of the user 500 captured by the iris recognition module 102, and generate the identity information of the user 500, and the generated identity information of the user 500 is transmits to an operating component 308 for encoding process so as to construct the facial characteristics of the user 500.

Accordingly, in one embodiment of the present invention, the step (ii) can also be done before the step (i) or be simultaneously done with the step (ii); thus, capture the iris characteristics of the user 500 at first, and then captures the facial characteristics and iris characteristics of the user 500, or alternatively capture the iris characteristics and the facial characteristics of the user 500 at the same time.

Figure 25:
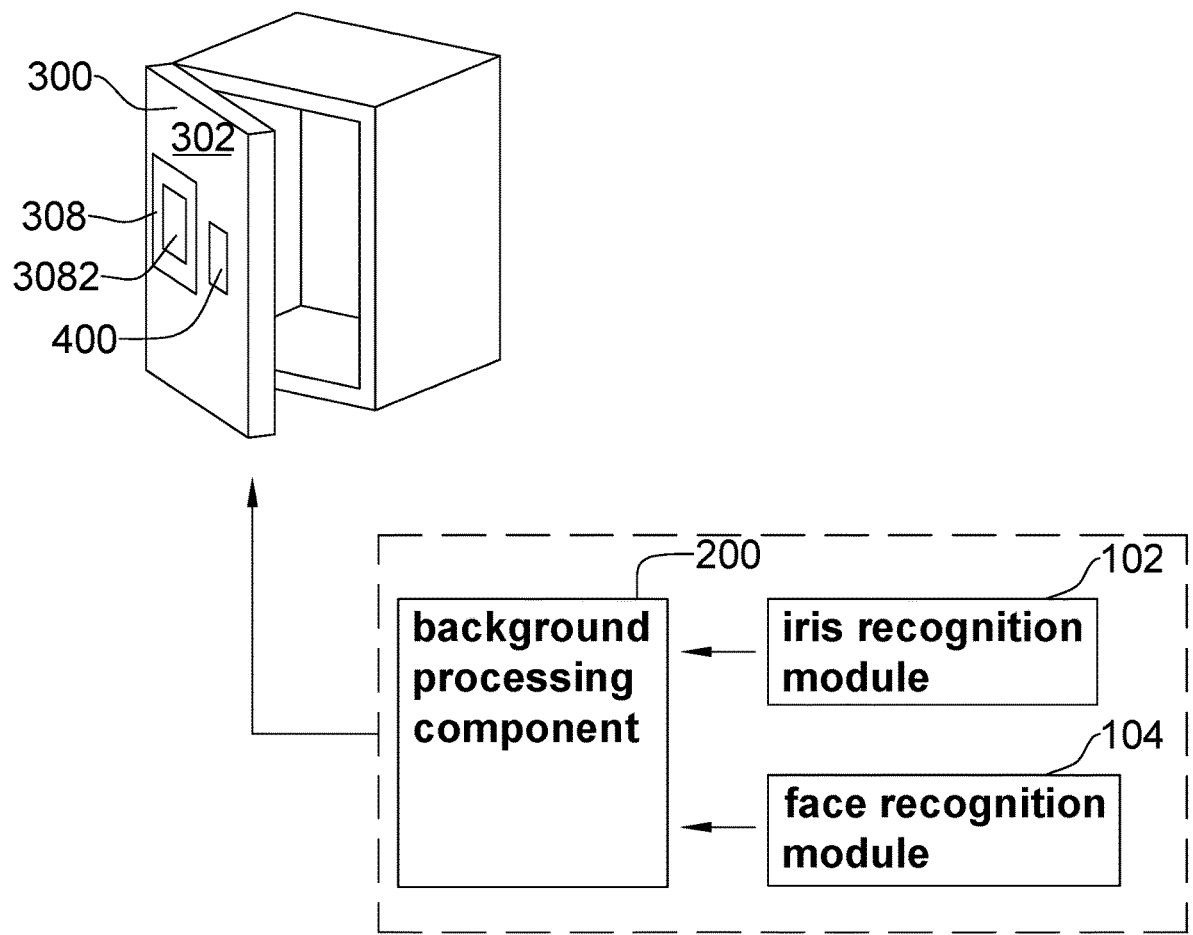
FIG. 25 is a schematic view of a first application of the iris and face recognition system of the present invention.
Figure 26:
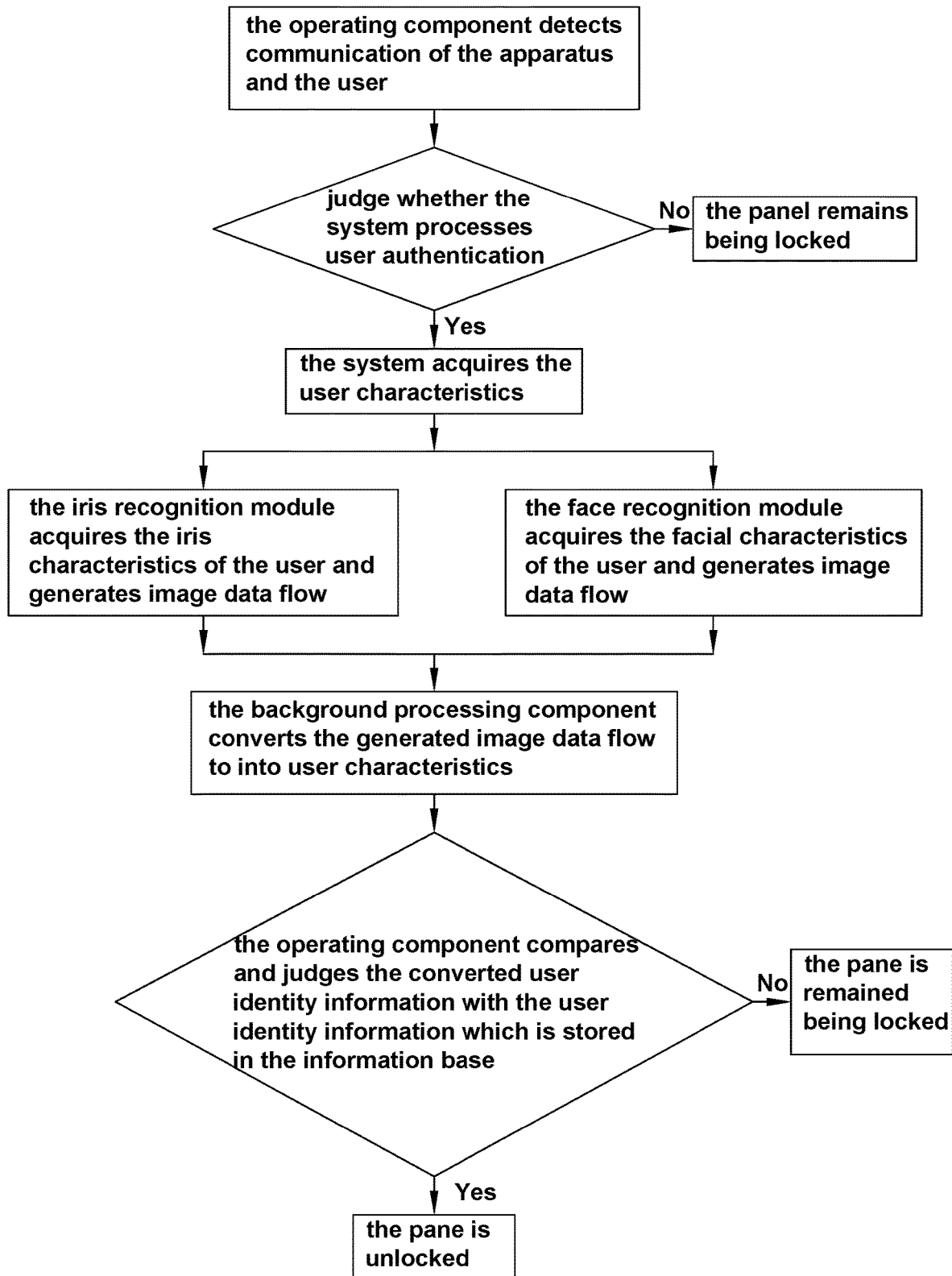
FIG. 26 is a schematic view of instructions which are executed by operating components of the first application of the iris and face recognition system of the present invention.

As shown in FIG. 26 and FIG. 25 of the drawing, the external system 300 which is implemented as an apparatus 302 is illustrated, wherein the apparatus 302 comprises an operating component 308. The operating component 308 further comprises an information base 3082 and the identity information of a user 500 is pre-stored the information base 3082 for being invoking by the operating component 308 in the sequence. Those skilled in the art will understand that the iris and face recognition system 400 is provided on the apparatus 302. The iris and facial characteristics of the user 500 captured by the iris and face recognition system 400 can generate the identity information of the user 500. The operating component 308 compares the generated user identity information of the user 500 with the identity information of the user 500 which is restored in the information base 3082, thereby identifying the user 500.

Specifically, the apparatus 302 further comprises a panel 3022 which is closed in the apparatus 302, wherein the iris and face recognition system 400 can be implemented as provided on the panel 3022, by the cooperating of the operating component 308 and the iris and face recognition system 400, the switching of opening and closing of the panel 3022 is controlled.

As shown in FIG. 26 of the drawings, during the switching of controlling the opening and closing of the panel 3022 of the apparatus 302, the operating component 308 detects communication of the user 500 and the apparatus 302 and determines whether the iris and face recognition system 400 processes user authentication.

When the operating component 308 determines that the iris and face recognition system 400 does not process the authentication of the user 500, the operating component 308 controls the panel 3022 of the operating component 308 to remain being locked.

When the operating component 308 determines that the iris and face recognition system 400 needs to process the authentication of the user 500, the operating component 308 controls the iris and face recognition system 400 to acquire the iris and facial characteristics of the user 500.

The iris recognition module 102 and the face recognition module 104 acquire the iris and facial characteristics of the user 500, and the generated image data flow 202 is transmitted to the background processing component 200. The background processing component 200 converts the image data flow 202 into the identity information of the user 500, and further transmits to the operating component 308.

The operating component 308 compares the transmitted identity information of the user 500 with the identity information of the user 500 which is stored in the information base 3082.

When the operating component 308 determines that the transmitted identity information of the user 500 and the identity information of the user 500 which is stored in the information base 3082 do not match, the operating component 308 controls the panel 3022 of the operating component 308 to remain being locked.

When the operating component 308 determines that the transmitted identity information of the user 500 and the identity information of the user 500 which is stored in the information base 3082 are matched, the operating component 308 controls the panel 3022 of the operating component 308 to be unlocked.

Accordingly, as shown in FIG. 27 of the drawings, the present invention also provides an application method of the apparatus 302, wherein the method comprises the following steps.

(c) Capture the iris and facial characteristics of a user 500 by a iris and face recognition system 400 which is provided in an apparatus 302, and generate the identification information of the user 500.

(d) Match the generated identification information of the user 500 with the identification information of the user 500 which is stored in an information base 3082 of an operating component 308.

(e) When the operating component 308 determines that the match is successful, the operating component 308 controls the panel 3022 of the operating component 308 to be unlocked.

According to one aspect of the present invention, before the step (c), the method further comprises the step of restoring the identity information of the user 500 in the information base 3082.

It is worth mentioning that, in this step, the iris and facial characteristics of the user 500 are respectively captured by the iris and face recognition system 400 and is converted to the identity information of the user 500 by the operating component 308 and is restored in the information base 3082, so that in the subsequent use of the apparatus 302, the operating component 308 can easily and quickly invoke the identity information of the user 500, thereby shortening the authentication time of the user 500 by the iris and face recognition system 400.

It is also worth mentioning that after the completion of the last authentication process, the operating component 308 and the iris and face recognition system 400 can be returned to original states in order to facilitate the next authentication.

Figure 29:
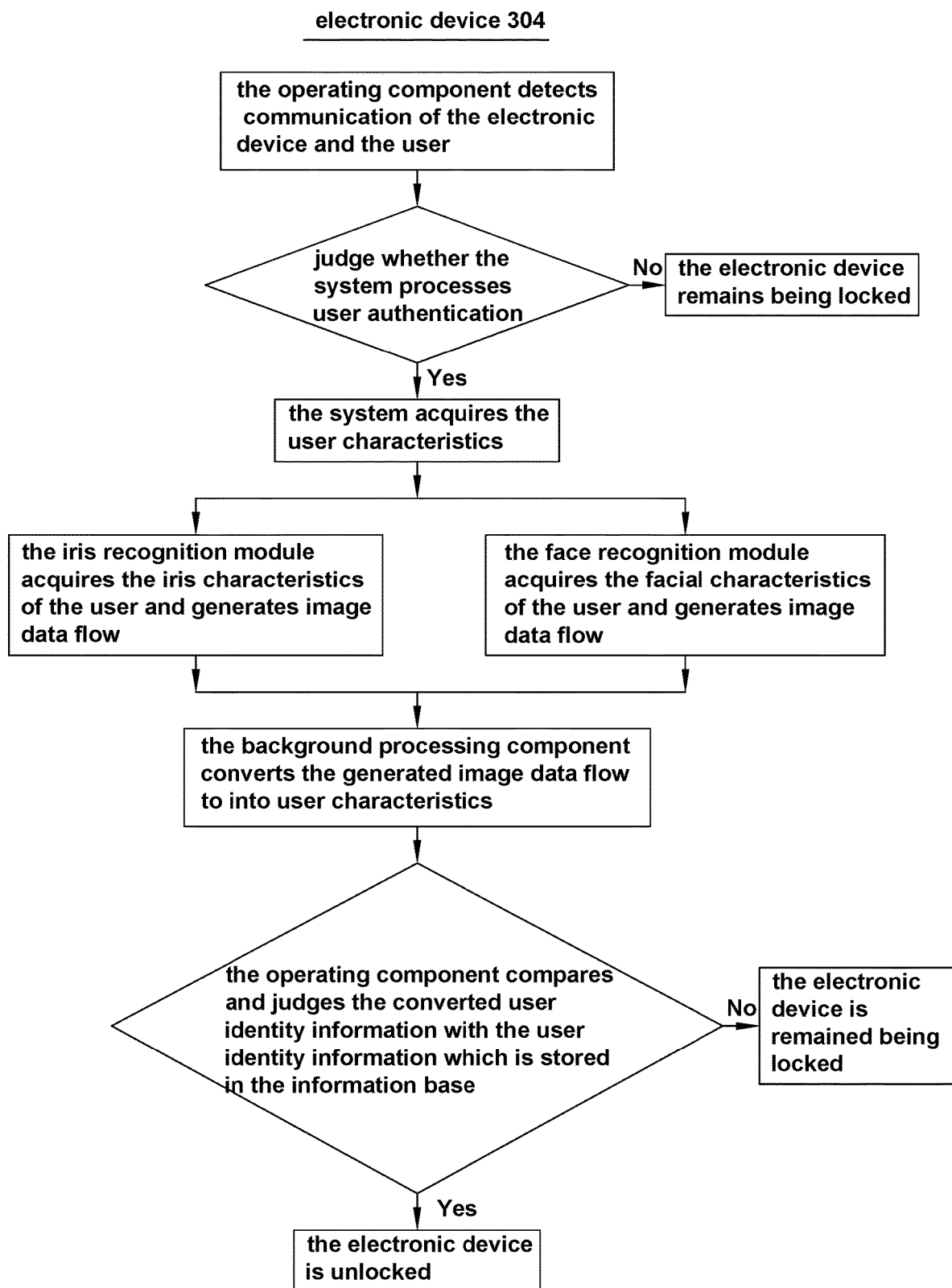
FIG. 29 is a first schematic view of instructions which are executed by operating components of the second application of the iris and face recognition system of the present invention.
Figure 30:
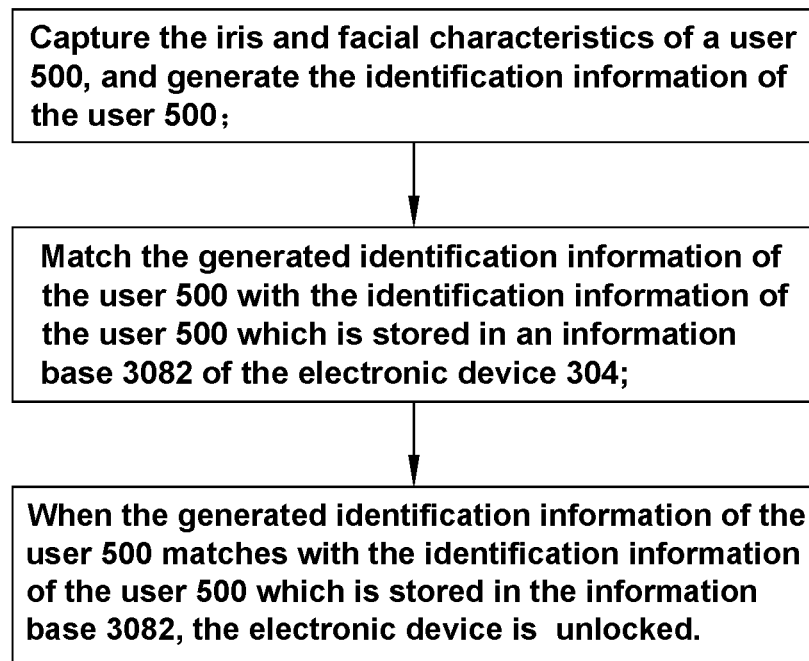
FIG. 30 is a second schematic view of instructions which are executed by operating components of the second application of the iris and face recognition system of the present invention.

Referring to FIG. 28 to FIG. 30 of the drawings, a second application method of the present invention is illustrated. In this embodiment of the present invention, the external system 300 is implemented as the electronic device 304, wherein the electronic device electronic device 304 comprises an operating component 308 preset with operating system. The operating component 308 further comprises an information base 3082 and the identity information of a user 500 is pre-stored the information base 3082 for being invoking by the operating component 308 in the sequence. The operating component 308 matches the generated user identity information of the user 500 with the identity information of the user 500 which is restored in the information base 3082.

It is worth mentioning that the restored operational components of the operating component 308 of the electronic device 304 comprises but nor restricted to WINDOWS, IOS, ANDROID, LINUX, UBUNTU and so on. It is worth mentioning that, in order to ensure the using security of the electronic device 304, the user 500 typically adds authentication methods such as digital passwords to the electronic device 304. In other words, before the user 500 uses the electronic device 304 each time, the electronic device 304 is required to verify the identity information of the user 500.

As shown in FIG. 29 of the drawings, the process of authenticating the identity information of the user 500 using the electronic device 304 comprises the following steps.

The operating component 308 detects communication of the electronic device 304 and the user 500, and determine whether the iris and face recognition system 400 processes user authentication.

When the operating component 308 determines that the iris and face recognition system 400 does not need to process the authentication of the user 500, the electronic device remains being locked.

When the operating component 308 determines that the iris and face recognition system 400 needs to process the authentication of the user 500, the operating component 308 controls the iris and face recognition system 400 to acquire the user iris and facial characteristics.

The iris recognition module 102 and the face recognition module 104 acquire the iris and facial characteristics of the user 500 at the same time and generate an image data flow 202, the image data flow 202 is transmitted to the background processing component 200, the background processing component 200 converts the image data flow 202 to generate the identity information of the user 500 and the identity information of the user 500 is transmitted to the operating component 308.

The operating component 308 compares the generated identity information of the user 500 with the identity information of the user 500 which is stored in the information base 3082.

When the operating component 308 determines that the generated identity information of the user 500 and the identity information of the user 500 which is stored in the information base 3082 are not matched, the operating component 308 controls the electronic device 304 to be remained being locked.

When the operating component 308 determines that the generated identity information of the user 500 and the identity information of the user 500 which is stored in the information base 3082 are matched, the operating component 308 controls the electronic device 304 to be unlocked.

It is worth mentioning that, when the electronic device 304 is in the locked state, the operating component 308 also prevents other operations between the user 500 and the electronic device 304 which are not relative to the user authentication.

It is also worth mentioning that, when the operating component 308 determines that the iris and face recognition system 400 needs to process the user authentication, reminder events are generated on the electronic device 304, such as a visual cue or sound tips to assist the user to operate the next step.

It is appreciated that when the electronic device 304 has the initial setup, in the information base 3082 of the operating component 308, the information of the iris and facial characteristics of the user 500 are input so as to generate the restored identity information of the user 500 in the information base 3082.

Moreover, when the operating component 308 determines that the electronic device 304 is restored to the initial setup, the identity information of the user 500 stored in the information base 3082 is cleared, and when the electronic device 304 reminds to setup, the information of the iris and facial characteristics of the user 500 are input again so as to generate the restored identity information of the user 500 in the information base 3082.

Accordingly, as shown in FIG. 30 of the drawings, according to one aspect of the present invention, an unlocking method for the electronic device 304 is provided, for unlocking the electronic device 304, wherein the method comprises the following steps:

(f) Capture the iris and facial characteristics of a user 500, and generate the identification information of the user 500.

(g) Match the generated identification information of the user 500 with the identification information of the user 500 which is stored in an information base 3082 of the electronic device 304.

(h) When the generated identification information of the user 500 matches with the identification information of the user 500 which is stored in the information base 3082, the electronic device 304 is unlocked.

According to one aspect of the present invention, the step (f) further comprises the following steps:

Capture the iris and facial characteristics of the user 500 by an iris and face recognition system 400 which is communicatively connected to the electronic device 304, wherein the iris and face recognition system 400 comprises:

an iris recognition module 102 for capturing the iris characteristics of the user 500 and generating a image data flow 202;

a face recognition module 104 for capturing the facial characteristics of the user 500 and generating a image data flow 202; and a background processing component 200 which is communicatively connected to the iris recognition module 102 and the face recognition module 104 so as to convert the image data flow 202 to generate the identity information of the user 500.

According to another aspect of the present invention, the step (f) further comprises the step of capturing the iris and facial characteristics of the user 500 by an iris and face recognition system 400 which is communicatively connected to the electronic device 304, wherein the iris and face recognition system 400 comprises:

an iris recognition module 102 for capturing the iris characteristics of the user 500 and generating a image data flow 202;

a face recognition module 104 for capturing the iris and facial characteristics of the user 500 and generating a image data flow 202; and a background processing component 200 which is communicatively connected to the iris recognition module 102 and the face recognition module 104 so as to convert the image data flow 202 to generate the identity information of the user 500.

Figure 31:
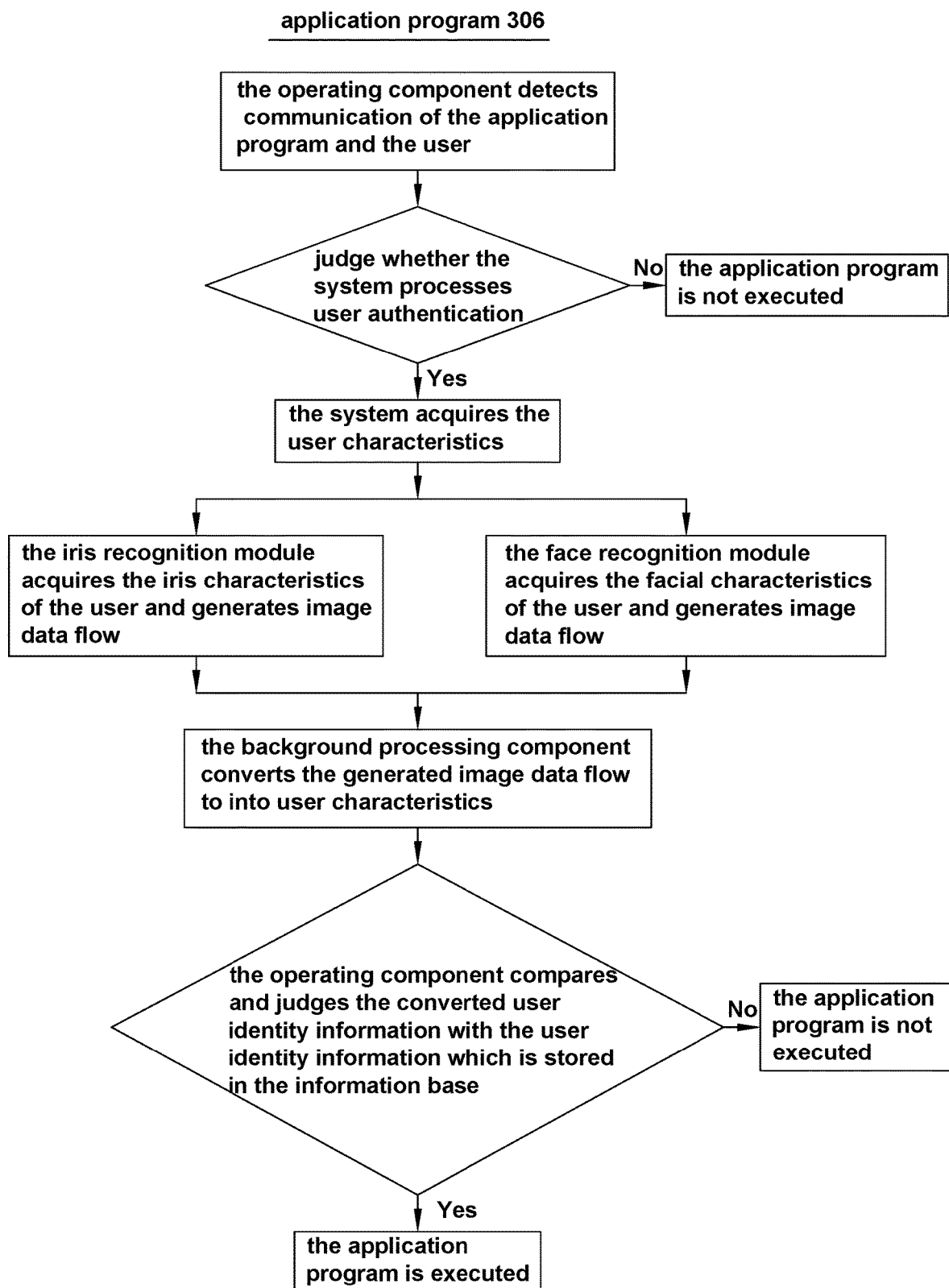
FIG. 31 is a first schematic view of instructions which are executed by operating components of a third application of the iris and face recognition system of the present invention.

Those skilled in the art will understand that, the operating component 308 and the iris and face recognition system 400 can also process the authentication of the user 500 during operating specific application in the electronic device 304. As shown in FIG. 31 of the drawings, the electronic device 304 comprises one or more application program 3042. After the application program 3042 is downloaded and is installed, the user 500 can add user authentication software to the application program 3042. At this time, the iris and facial characteristics of the user 500 need to be input into the operating component 308. Alternatively, the iris and facial characteristics of the user 500 are invoked from the information base 3082 as the stored user information of the application program 3042.

Figure 32:
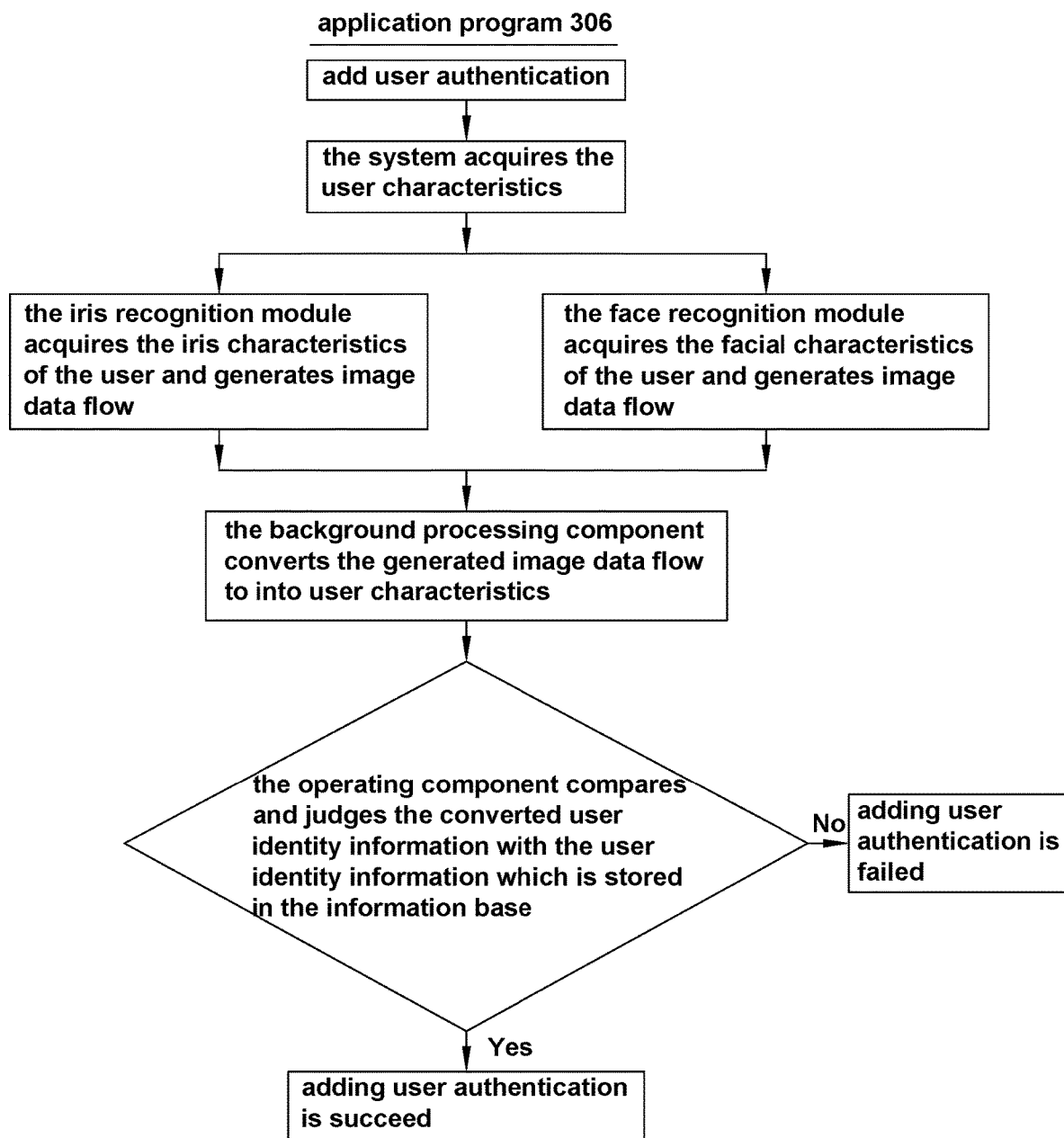
FIG. 32 is a second schematic view of instructions which are executed by operating components of the third application of the iris and face recognition system of the present invention.

Accordingly, during the process of adding user authentication software to the application program 3042, the operating component 308 is needed to execute the instructions as shown in FIG. 32 of the drawings.

Acquire the iris and facial characteristics of the user 500 by the iris recognition module 102 and the face recognition module 104 at the same time, and generate the image data flow 202, which is transmitted to the background processing component 200, wherein the background processing component 200 converts the image data flow 202 into the identity information of the user 500, and the identity information of the user 500 is further transmitted to the operating component 308.

The operating component 308 receives the identity information of the user 500, and the operating component 308 determines the generated identity information of the user 500 and the identity information of the user 500 which is stored in the information base 3082.

When the operating component 308 determines that the generated identity information of the user 500 and the identity information of the user 500 which is stored in the information base 3082 are not matched, adding user authentication to the operating component 308 is failed.

When the operating component 308 determines that the generated identity information of the user 500 and the identity information of the user 500 which is stored in the information base 3082 are matched, adding user authentication to the operating component 308 is finished.

It is worth mentioning that, the application program 3042 setting user authentication software and the unlocking software of the application program 3042 are that the generated identity information of the user 500 and the identity information of the user 500 which is stored in the information base 3082 are matched. In this way, a non-user setting the user authentication software on the application program 3042 of the electronic device 304 is avoided.

It is understandable that, after the setting of the user authentication software on the application program 3042 is complete, reminder events are generated on the electronic device 304, such as a visual cue or sound tips to assist users with the next steps.

As shown in FIG. 31 of the drawings, when executing the application program 3042, the operating component 308 requires to verify identity information of the user 500, the process is as follows.

The operating component 308 detects communication of the application program 3042 and the user 500, and determine whether the iris and face recognition system 400 processes user authentication.

When the operating component 308 determines that the iris and face recognition system 400 does not need to process the authentication of the user 500, the operating component 308 controls the electronic device 304 to return to other application program 3042.

When the operating component 308 determines that the iris and face recognition system 400 needs to process the authentication of the user 500, the operating component 308 controls the iris and face recognition system 400 to acquire the user iris and facial characteristics.

The iris recognition module 102 and the face recognition module 104 acquire the iris and facial characteristics of the user 500 at the same time and generate an image data flow 202, the image data flow 202 is transmitted to the background processing component 200, the background processing component 200 converts the image data flow 202 to generate the identity information of the user 500 and the identity information of the user 500 is transmitted to the operating component 308.

The operating component 308 compares the generated identity information of the user 500 with the identity information of the user 500 which is stored in the information base 3082.

When the operating component 308 determines that the generated identity information of the user 500 and the identity information of the user 500 which is stored in the information base 3082 are not matched, the application program 3042 is not executed.

When the operating component 308 determines that the generated identity information of the user 500 and the identity information of the user 500 which is stored in the information base 3082 are matched, the application program 3042 is executed. So that the setting of the user authentication software of the application program 3042 and the executing process of the application program 3042 are completed.

Accordingly, the present invention provides an application method of the iris and face recognition system 400 for user 500 implementing a user 500 communicating with an external system 300, wherein the external system 300 comprises an operating component 308, and the operating component 308 further comprises an information base 3082, wherein the method comprises the following steps.

(I) Capture the iris and facial characteristics of the user 500 by an iris and face recognition system 400, and generate the identification information of the user 500.

(II) Match the generated identification information of the user 500 with the identification information of the user 500 which is stored in the information base 3082 by the operating component 308.

(III) When the match is succeeded, the user 500 communicates with the external system 300.

According to one aspect of the present invention, before the step (I), the method further comprises the following steps:

The operating component 308 detects communication of the external system 300 and the user 500.

Drive the iris and face recognition system 400 to capture iris and facial characteristics of the user 500, and generate the identification information of the user 500.

According to one aspect of the present invention, when the information base 3082 restores the identification information of the user 500, the iris and face recognition system 400 captures the iris and facial characteristics of the user 500 and generates identity information of the user 500 as to restore in the information base 3082.

Figure 33:
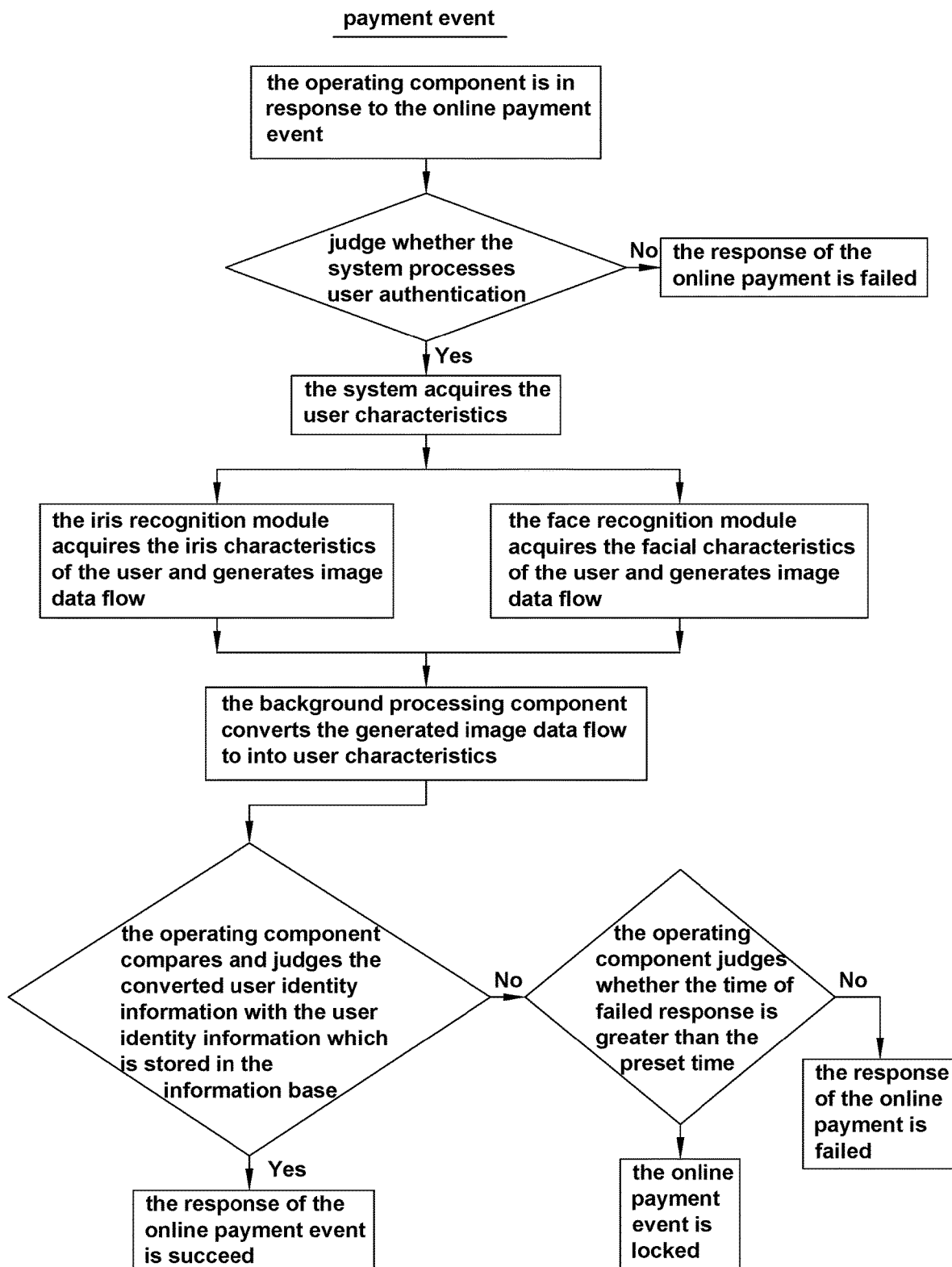
FIG. 33 is a schematic view of instructions which are executed by operating components of a fourth application of the iris and face recognition system of the present invention.
Figure 34:
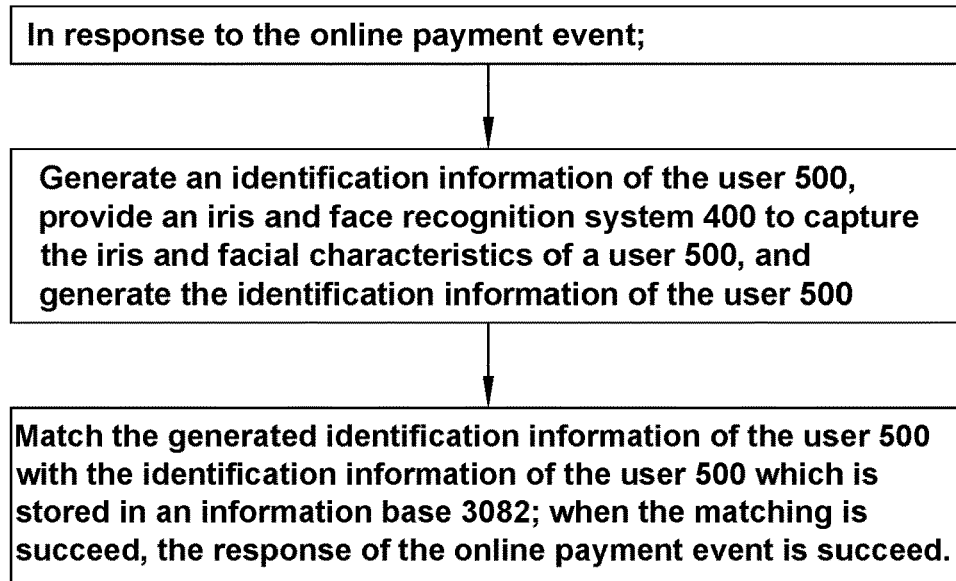
FIG. 34 is a flow diagram of the fourth application of the iris and face recognition system of the present invention.
Figure 35:
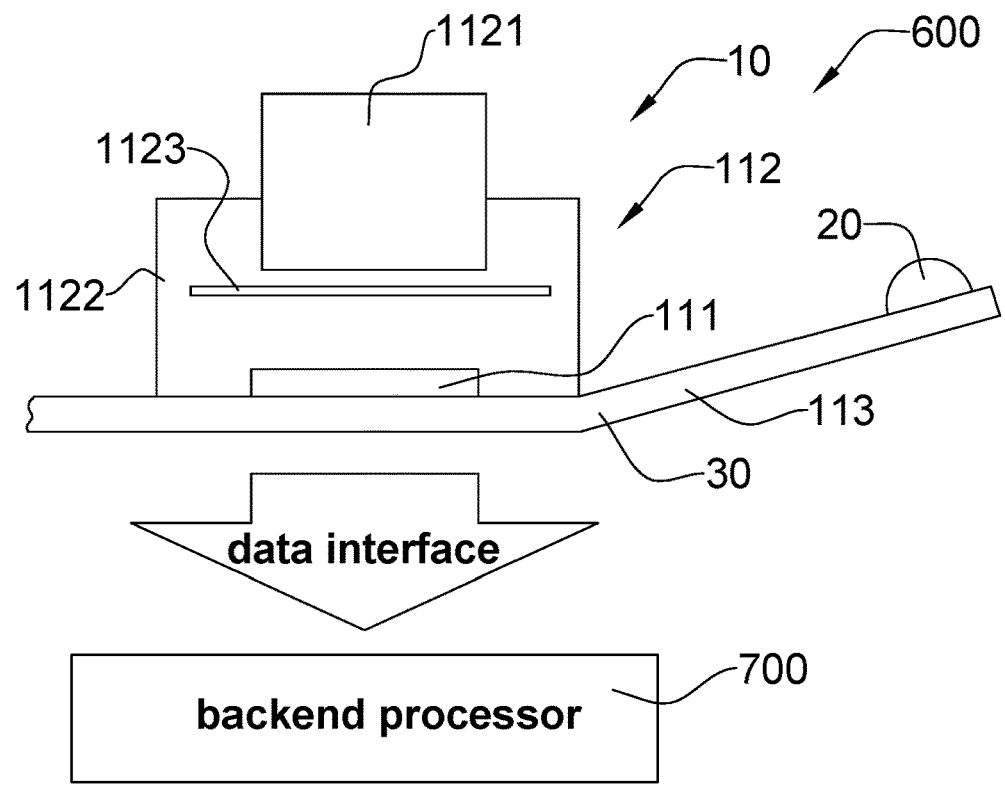
FIG. 35 is a schematic view of a binoculus iris images data acquisition module according to a preferred embodiment of the present invention.

Referring to FIG. 33 of the drawings, an online payment method based on the iris and face recognition system 400 according to the above preferred embodiment is illustrated. In the online payment, the iris and face recognition system 400 verifies the identity information of the user 500 so as to ensure the security of user information.

Specifically, in the online payment process, the user authentication process of the user 500 of the operating component 308 comprises the following steps:

Respond to an online payment event.

The operating component 308 accepts the response to the online payment event, and the operating component 308 determines whether the iris and face recognition system 400 processes the user authentication.

When the operating component 308 determines that the iris and face recognition system 400 does not need to process the authentication of the user 500, the response of the online payment is failed.

When the operating component 308 determines that the iris and face recognition system 400 needs to process the authentication of the user 500, the operating component 308 controls the iris and face recognition system 400 to acquire the user iris and facial characteristics.

The iris recognition module 102 and the face recognition module 104 acquire the iris and facial characteristics of the user 500 at the same time and generate an image data flow 202, the image data flow 202 is transmitted to the background processing component 200, the background processing component 200 converts the image data flow 202 to generate the identity information of the user 500 and the identity information of the user 500 is transmitted to the operating component 308.

The operating component 308 compares the generated identity information of the user 500 with the identity information of the user 500 which is stored in the information base 3082.

When the operating component 308 determines that the generated identity information of the user 500 and the identity information of the user 500 which is stored in the information base 3082 are not matched, the response of the online payment is failed.

When the operating component 308 determines that the generated identity information of the user 500 and the identity information of the user 500 which is stored in the information base 3082 are matched, the response of the online payment is succeed. So that during the process of in response to the online payment event, the authentication of the user 500 is completed.

It is worth mentioning that, when the operating component 308 repeatedly determines that the generated identity information of the user 500 and the identity information of the user 500 which is stored in the information base 3082 are not matched, the online payment event is locked. Those skilled in the art will understand that after the online payment event is locked, the online payment event is unlocked by other programs, such as restoring the initial setup, authentication by the online customer service or other equivalent methods. In this way, user information security is effectively ensured.

Accordingly, as shown in FIG. 17 of the drawings, the present invention also provides an online payment method based on the iris and face recognition system 400, wherein the method comprises the following steps.

(α) Respond to the online payment event.

(β) Generate the identity information of a user 500, and provide an iris and face recognition system 400 to capture the iris and facial characteristics of the user 500 and generate the identity information of the user 500.

(γ) Match the generated identity information of the user 500 with the identity information of the user 500 which is stored in an information base 3082, wherein when the match is succeed, the response of the online payment event is succeed.

It is worth mentioning that, according to another aspect of the present invention, the present invention also provides a binoculus iris images data acquisition module 600, which is communicatively with a back end processor 700, wherein the binoculus iris images data acquisition module 600 is for collecting the user binoculus iris characteristics. The binoculus iris images data acquisition module 600 comprises the iris camera module 10, the fill light component 20 and other components.

In this preferred embodiment of the present invention, the fill light component 20 is provided in the iris camera module 10, wherein the fill light component 20 provides fill light source for user binoculus region when the iris camera module 10 collects the user binoculus iris characteristics, and a uniform brightness is formed in the user iris region by the fill light component 20 such that the user iris characteristics image collected by the iris camera module 10 is more clear.

During the process of the iris camera module 10 collecting the user iris characteristics, a user's pupil is substantially as the focal point by the iris camera module 10, and the characteristics image of the user binoculus iris region is accurately obtained by capturing the user binoculus image.

As a preferred embodiment of the present invention, the iris camera module 10 comprises an image sensor chip 111, a lens assembly 112 and a printed circuit board assembly 113, wherein the image sensor chip 111 is mounted on the printed circuit board assembly 113, the lens assembly 112 is covered on an upper portion of the image sensor chip 111. In other words, the imaging of the binoculus region is in the photosensitive region of the 11 by the lens assembly 112, in follow-up, the image sensor chip 111 is capable of converting the optical signals carrying the user iris characteristics into electrical signals, and after analog-digital conversion and the image processing, a clear user binoculus iris characteristics image is obtained, and then the imaged is transmitted to the back end processor 700 for user authentication.

During the use of the iris camera module 10, the image sensor chip 111 provides the number of pixels, and the number of pixels of the binoculus region meets at least the eyes iris camera module 10 pixels/mm, the total number of pixels of the binoculus region is at least 1920×800 in order to meet the minimum requirements for iris recognition algorithms, thereby ensuring the iris recognition device 100 collecting clear images carrying user iris characteristics.

The lens assembly 112 is for imaging an object to be photographed on the photosensitive area of the image sensor chip 111, wherein when collecting iris characteristics of the user, the lens assembly 112 uses the user's pupil region as a generally focal point, and the shooting range covers the binoculus region, and the resolving power of the binoculus region is at least 450 LW/PH (0.8 F).

It is worth mentioning that the printed circuit board assembly 113 comprises a printed circuit board 30, wherein the printed circuit board 30 can be selected from Flex boards or PCB boards so as to ensure that the binoculus iris images data acquisition module 600 has a stability and reliability during using.

It is worth mentioning that the back end processor 700 can be provided on the apparatus or the electronic device, wherein the apparatus or the electronic device also comprises a portable device or a portable electronic device. The binoculus iris images data acquisition module 600 and the apparatus or the electronic device are communicatively connected via one or more communication lines such as parallel interfaces, MIPI interfaces, LVDS interfaces and other transmission interfaces, so that the user iris characteristics image captured by the binoculus iris images data acquisition module 600 is eventually transmitted to the apparatus or the electronic device.

It is also worth mentioning that the apparatus or the electronic device comprises but not limited to access control devices, safety devices, mobile communication devices, handheld electronic devices, personal digital assistants, tablet PCs, laptops, servers, etc.; those skilled in the art should be understood that the apparatus or the electronic device also comprise a combination of two or more than two thereof. It should also be understandable that the apparatus or the electronic device is only as an example to elaborate and expose the contents of the present invention to aid those skilled in the art to better understand the present invention. The apparatus or the electronic device further comprises contents more than the drawings and embodiments described, or the apparatus or the electronic device also have other forms and implements.

The fill light component 20 is provided and disposed in the iris camera module 10, in particular, the fill light component 20 and the iris camera module 10 are integrated to the binoculus iris images data acquisition module 600 for the acquisition of the user iris characteristics, and in the follow-up for user authentication so as to easy to use.

It is worth mentioning that the fill light component 20 is preferably an infrared light emitting element, so that the light generated from the fill light component 20 is LED infrared lights, in such a manner that the fill light component 20 supplements the infrared light for the user binoculus region during the iris characteristics collecting process of the iris camera module 10, so that the user iris region has an uniform brightness as to improve the accuracy of the user iris characteristics collected by the binoculus iris images data acquisition module 600. Moreover, when the fill light component 20 provides additional light source for the iris camera module 10, the light does not cause irritation to the user's eyes. In other words, the using of the binoculus iris images data acquisition module 600 does not affect the physical and mental health of users.

It is also worth mentioning that the fill light component 20 is preferably an infrared LED light emitting element to ensure that the energy consumption of the fill light component 20 is reduced under the condition of the fill light component 20 being able to provide enough additional infrared light for the binoculus iris images data acquisition module 600.

In some embodiments of the present invention, the iris camera module 10 is preferably an infrared camera module, so that when the iris camera module 10 collects the user binoculus iris characteristics, the adverse effects of visible light to the image quality is reduced and a better image effect is obtained.

Specifically, the lens assembly 112 of the iris camera module 10 further comprises a lens 1121, a lens holder 1122, an infrared carrier penetration filter 1123 and other components. The lens holder 1122 is mounted on the printed circuit board assembly 113. The lens 1121 and the infrared carrier penetration filter 1123 are supported by the lens holder 1122. Wherein when the iris camera module 10 shoots the objects, the reflective light of the object successively passes through the lens 1121 and the infrared carrier penetration filter 1123, and then images in the image sensor chip 111, so that an electrical signal is converted in the image sensor chip 111.

It is worth mentioning that the infrared carrier penetration filter 1123 filters out the visible light which through the lens 1121 and only allows infrared lights to cross through. In other words, the lights passing through the lens 1121 and received by the image sensor chip 111 is infrared light which carries the user iris characteristics, so that the interference of the visible light to the user iris image collected by the iris camera module 10 is avoided as much as possible.

As shown in FIG. 5 of the drawings, the horizontal field angle of the iris camera module 10 is defined as the length direction of the user binoculus and the vertical field angle of the iris camera module 10 is defined as the width direction of the user binoculus. When choosing and providing the angle between the fill light component 20 and the iris camera module 10, in order to ensure that the generated light of the fill light component 20 can cover the region which the iris camera module 10 covers, the light emitting angle of the fill light component 20 is respectively greater than the horizontal field angle and the vertical field angle of the iris camera module 10. In this way, it can make the coverage range of the fill light component 20 to be greater than the coverage range of the iris camera module 10 in the same projection range.

In detail, during the process of collecting the user iris characteristics of the binoculus iris images data acquisition module 600, the iris camera module 10 covering the face region of the user is defined as an interior region, so that when the iris camera module 10 collects the user iris characteristics, the focal point can be located inside or close to the user iris region. More preferably, the focal point is located in the user's pupil region.

It is worth mentioning that the area of the interior region is relative to the horizontal and the vertical field angle of the iris camera module 10.

Accordingly, the fill light component 20 covering outside of the user's face region is defined as an exterior region. As the light emission angle of the fill light component 20 is respectively greater than the horizontal and the vertical field angle of the iris camera module 10, so that the user face region covered by the fill light component 20 is always comprises the user face region covered by the iris camera module 10 and at least one eye of the user is located in the interior region. In such a manner that the fill light component 20 provides additional infrared light source for the iris camera module 10 in any cases.

It is understandable that the light emitting element 21 of the fill light component 20 has a light emitting angle which is set to be less than 90 degrees, so that the supplemental infrared light source provided by the fill light component 20 is effectively utilized. It is worth mentioning that when the light emitting angle of the fill light component 20 is set to be 0-45 degree after repeated detection, the fill light component 20 and the iris camera module 10 has a better configuration effort. Moreover, under the condition of ensuring that enough supplementary infrared light is provided for the binoculus iris images data acquisition module 600 by the fill light component 20, the energy depletion of the fill light component 20 is reduced.

As shown in FIG. 7 of the drawings, a distance between the iris camera module 10 and the user iris is defined as z, an axle distance of the iris camera module 10 and the fill light component 20 is defined as x. A preset angle of the fill light component 20 is defined as θ. The value of x can be determined by adjusting the value of θ. In this way, the deviation value of the iris camera module 10 and the fill light component 20 can be determined, so that the user binoculus region covered by the fill light component 20 of the completed binoculus iris images data acquisition module 600 is always comprises the user binoculus region covered by the iris camera module 10, thereby ensuring a stability and reliability during using of the binoculus iris images data acquisition module 600.

It is worth mentioning that, when the angle θ is reasonable, the reflective spots formed on the user iris is reduced or is far away from the user iris region when the iris camera module 10 collects the user binoculus iris characteristics. For example, under the effect of the fill light component 20, the reflective spots is generated in the user sclera region or other positions, so that the generated reflective spot having interference on the image quality is reduced when the iris camera module 10 collects the user binoculus iris characteristics.

Figure 36:
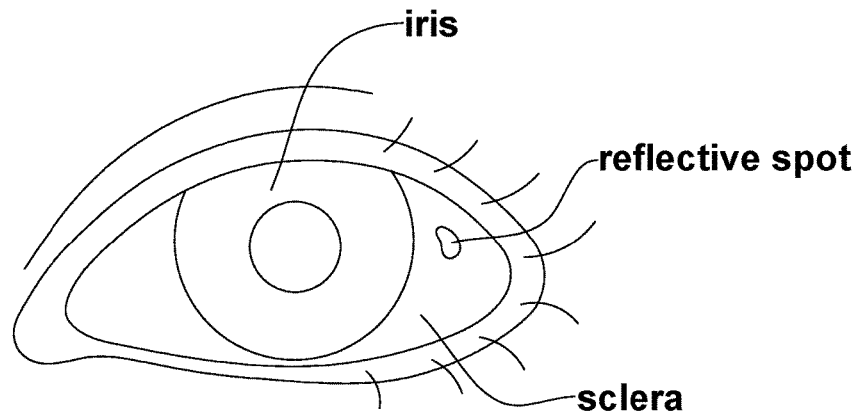
FIG. 36 illustrates a generated location of a reflective spot according to the above preferred embodiment of the present invention.

As shown in FIG. 36 of the drawings, the reflective spot does not affect the image quality of the user binoculus iris characteristics collected by the iris camera module 10, so that the iris camera module 10 can be more accurately to capture the user iris characteristics. Thus, in some embodiments of the present invention, the reasonable angle θ range is 0 degree to 45 degree.

Those skilled in the art will understand that when the light emission intensity of the fill light component 20 cannot meet the brightness of the requirement of the iris camera module 10 collecting user iris characteristics, on one hand the brightness of the fill light component 20 is increased and on the other hand the iris recognition device 100 can be provided with two or more than two fill light component 20.

It is worth mentioning that, under the condition of providing a plurality of the fill light component 20, each of the fill light component 20 is uniformly arranged around the iris camera module 10, and while the angle and deviation value of each of the fill light component 20 and the iris camera module 10 are adjusted, so that the binoculus iris images data acquisition module 600 has a higher accuracy on iris recognition and user authentication.

It is also worth mentioning that the image quality of the user iris characteristics iris collected by the iris camera module 10 has an important influence on the computing speed and the logic complexity of the iris recognition device 100, and has an impact on the recognition range of the iris recognition device 100. Those skilled in the art will understand that when image quality of the user iris characteristics iris collected by the iris camera module 10 is high, the complexity of the logic design of the iris recognition device 100 can be reduced, so that the consumed time of the iris recognition device 100 on user authentication is shortened.

Those skilled in the art will understand that the iris camera module 10 can be achieved the long-distance user to iris recognition by rational design. In the preferred embodiment of the present invention, the iris camera module 10 enables a long-distance user iris recognition, by the miniaturization of the pixel size of the image sensor and the quantifiable selector mode of the crosswise pixel quantity, and combining with the design value of the lens hfov to extend the recognition distance of the iris camera module 10, thereby improving the practical value of the binoculus iris images data acquisition module 600.

It is worth mentioning that, compared to traditional iris recognition technology, the binoculus iris images data acquisition module 600 can not only be used to collect the user binoculus iris characteristics, but also to collect user monocular iris characteristics, and in the actual application process, the binoculus iris images data acquisition module 600 shows a good performance.

Figure 37:
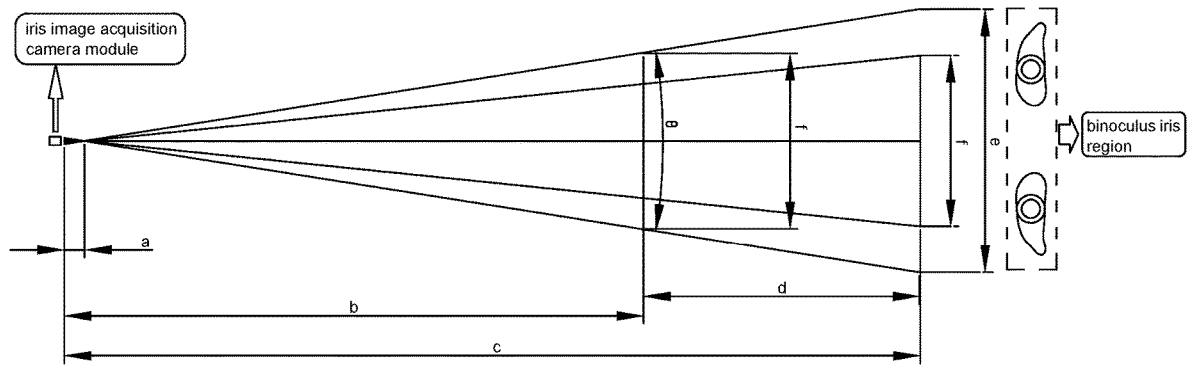
FIG. 37 is a schematic view of a parameters distribution of the present invention.
Figure 38:
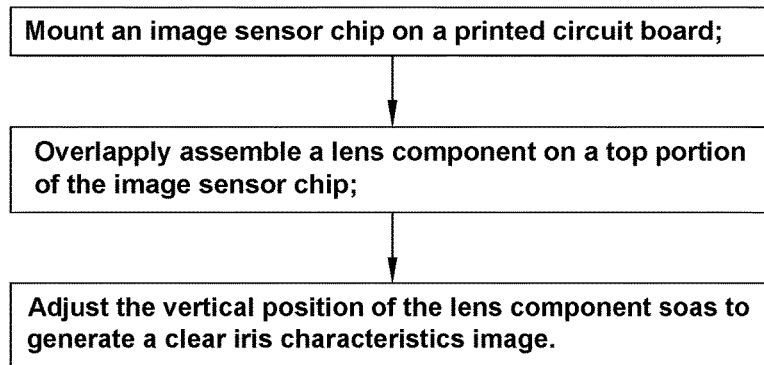
FIG. 38 is a manufacturing process flow diagram of the iris camera module according to the above preferred embodiment of the present invention.

In the preferred embodiment of the present invention, as shown in FIG. 37 of the drawings, the length of the user binoculus iris region is f, the focal length of the iris camera module 10 is a, the horizontal field angle is β, the closest binoculus iris recognition distance is b, which just covers the user binoculus region. The farthest distance of preset binoculus iris recognition is c, the shooting depth of the iris camera module 10 is d, and the maximum shooting range in the farthest distance is e.

In this preferred embodiment of the present invention, preferably the pixels diameter of the image sensor chip 111 is D, the number of the horizontal maximum output pixels is X, the number of the vertical maximum output pixels is Y; the farthest distance of preset binoculus iris recognition is c, according to the minimum requirement of the iris recognition algorithms to the pixels which is N pixel/mm, the minimum requirement needs to be meet in the farthest distance c. In other words, in the range of f, the number of pixels needs not less than f*N, and the corresponding image size of the image sensor chip 111 is f*N*D. According to the principle of similar triangles, the proportional relation is as follows: (f*N*D)/f=a/(c−a); under the condition of the known N, D, c, the focal length a of the iris camera module 10 is a=c*D*N/(D*N+1) after being calculated.

The number of the horizontal maximum output pixels X of the image sensor chip 111 based on the principle of similar triangles is: X*D/e=a/(c−a); and the horizontal maximum shooting range in the farthest distance e after being calculated is: e=X*D*(c−a)/a.

Meanwhile, according to the principle of similar triangles: (b−a)/a=f/(X*D); the closest distance of the user binoculus iris recognition b after being calculated is: b=[f/(X*D)+1]*a.

Meanwhile, according to the principle of the triangle function: tan (β/2)=(e/2)/(c−a), the horizontal field angle β of the iris camera module 10 after being calculated is: β=2*arc tan [(e/2)/(c−a).

In the preferred embodiment of the present invention, based on the calculated relationship, the relative dimensions of the binoculus iris images data acquisition module 600 are obtained. Those skilled in the art will understand that when changing the farthest distance c, or changing the image sensor chip 111 with different pixels diameter D, or changing the minimum requirements of the different iris camera module 10 for the number of pixels N, other parameters such as the focal length a of the iris camera module 10, the maximum shooting range in the farthest distance e, the closest binoculus iris recognition distance b, and the horizontal field angle β of the iris camera module 10 are all needed to be recalculated according to the above calculating relations.

It is worth mentioning that, under the condition of all of the above parameters being determined, the lens assembly 112 and the lens 1121 are preferably chosen according to the above described parameters to meet the resolving power requirement, and to match with the image sensor chip 111 to assemble the iris camera module 10 disclosed above.

It is also worth mentioning that under the condition of achieving the above requirements, according to this preferred embodiment of the present invention, the iris camera module 10 can has an ultra-small size in subsequent made iris camera module such as the smallest length, breadth and thickness dimensions are up to 5.5 mm×5.5 mm×3.91 mm; and is in favor of being integrated into electronic devices such as mobile phones, tablet computers and so on for iris recognition and user identity authentication.

Furthermore, the iris camera module 10 comprises a camera optics lens assembly to process the light entering the iris camera module 10. More specifically, as shown in FIG. 39, FIG. 33, FIG. 49, FIG. 54 and FIG. 59 of the drawings, the camera optics lens assembly in different embodiment is illustrated. Wherein the camera optics lens assembly is adapted to manufacture an iris camera module for collecting user iris characteristics. Accordingly, the camera optics lens assembly comprises a first lens 1000, a second lens 2000, a third lens 3000 and other components.

Figure 39:
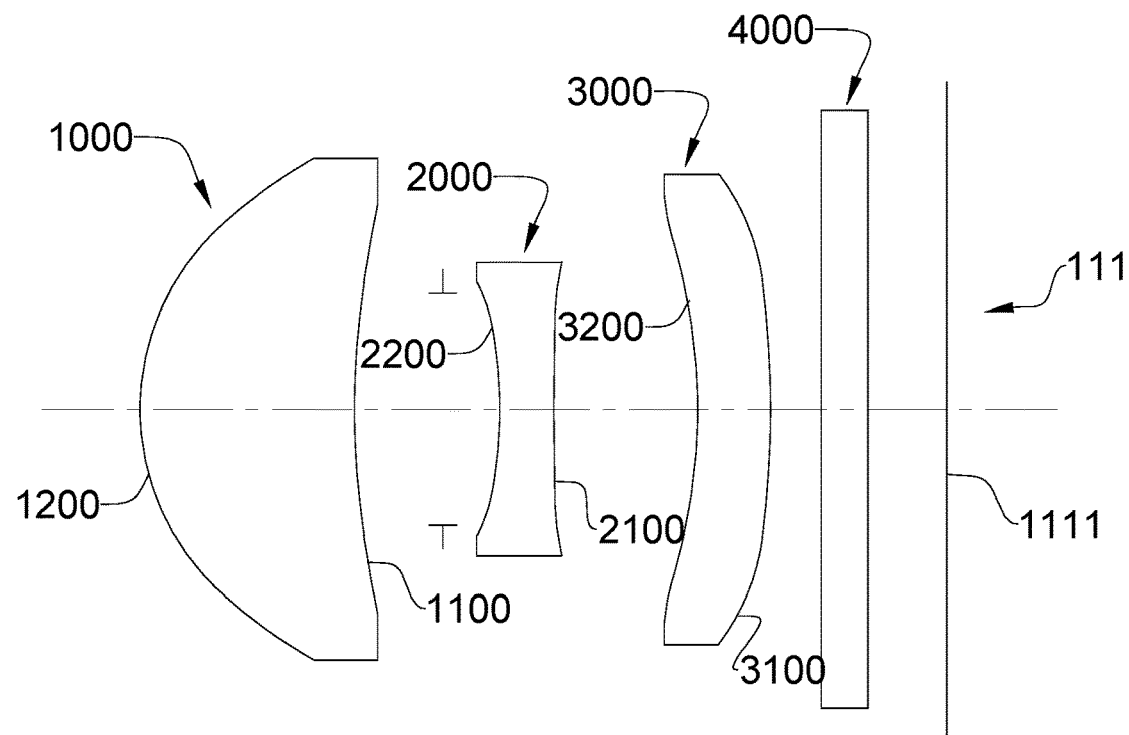
FIG. 39 is a main schematic view of a camera optics lens assembly according to a preferred embodiment of the present invention.
Figure 40:
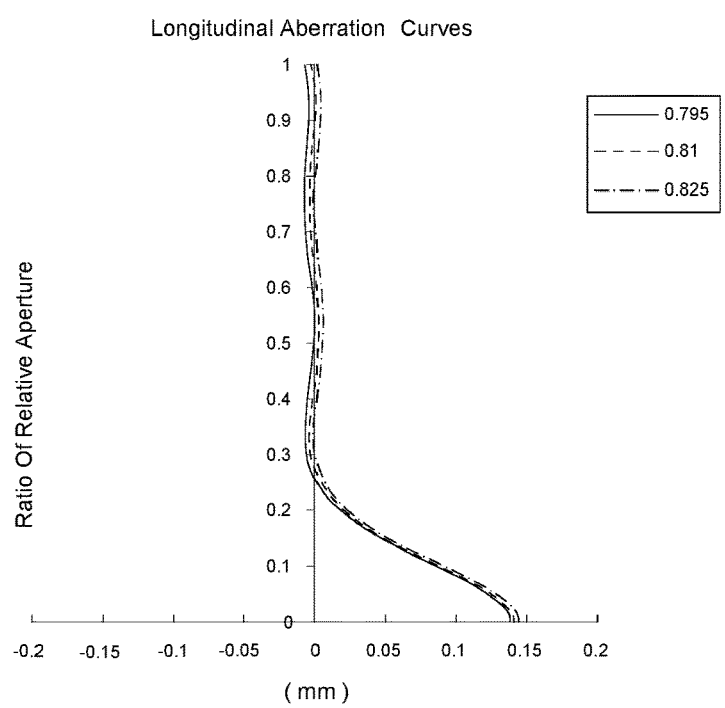
FIG. 40 is an aberration curves schematic view of a camera optics lens assembly according to the above preferred embodiment of the present invention.

The first lens 1000, the second lens 2000 and the third lens 3000 are sequentially arranged from the object side of the camera optics lens assembly to the image side of the camera optics lens assembly (as shown in FIG. 39 of the drawings from left to right) to form the camera optics lens assembly, and simultaneously to form an optical axis through the middle of the first lens 1000, the second lens 2000 and the third lens 3000, the camera optics lens assembly further comprises an aperture slot, which is located between a shot object and the second lens 2000. And in the follow-up, the camera optics lens assembly is used to cooperate with an image sensor chip 111 to form the iris camera module, wherein the image sensor chip 111 has an imaging surface 1111 toward the camera optics lens assembly for optical-electrical conversion in the image sensor chip 111.

It is worth mentioning that the aperture slot can be a diaphragm, a field aperture slot, etc., which is selectively disposed at the position between the shot object and the first lens 1000 or is disposed at the position between the first lens 1000 and the second lens 2000 for improving image quality of the shot object imaging on the imaging surface 1111.

The first lens 1000 is a lens having a positive focal power to provide a positive refractive power, and the total optical length can be shortened so as to reduce the volume of the manufactured iris camera module. Wherein the first lens 1000 has a first lens imaging side surface 1100 and a first lens object side surface 1200. The first lens imaging side surface 1100 towards the imaging surface 1111 and the first lens object side surface 1200 towards the shot object. The first lens object side surface 1200 is convex surface. Furthermore, in some embodiments of the present invention, the first lens imaging side surface 1100 is concave surface.

It is worth mentioning that the convex curvature of the first lens object side surface 1200 can affect the value of the field angle of the camera optics lens assembly. In other words, the field angle of the camera optics lens assembly can be increased by adjusting the convex curvature of the first lens object side surface 1200. Moreover, in this embodiment of the invention, the first lens object side surface 1200 is designed to be unsmooth, in particular, the periphery of the first lens object side surface 1200 forms a convex curvature which is different with the middle of the first lens object side surface 1200 thereof so as to modify the distorting discrepancy resulting from the increasing of the field angle of the camera optics lens assembly, thereby avoiding image distortion of the user iris characteristics collected by the camera optics lens assembly.

Furthermore, the convex design of the first lens object side surface 1200 further enhances the positive refractive power of the first lens 1000 in order to further reduce overall length of the camera optics lens assembly based on ensuring that the camera optics lens assembly having a larger field angle, so that the size of the camera optics lens assembly is smaller so as to be integrated in the follow-on devices such as the electronic devices.

The second lens 2000 is a lens having a negative focal power to provide a negative refractive power, and to modify the discrepancy resulting from the excessive positive refractive power of the first lens 1000. The second lens 2000 has a second lens imaging side surface 2100 and a second lens object side surface 2200. The second lens imaging side surface 2100 towards the imaging surface 1111 and the second lens object side surface 2200 towards the first lens imaging side surface 1100. The second lens object side surface 2200 is a concave surface so as to modify the Petzval sum of the camera optical lens assembly, so that the middle and the periphery of the second lens 2000 both have a good imaging performance to ensure that the iris cameral module manufactured by the camera optics lens assembly has a reliability and stability during using process.

It is worth mentioning that in some embodiments of the present invention, according to the lens curvature radius, the second lens imaging side surface 2100 is a convex surface. While based on the vector height of the lens, the second lens imaging side surface 2100 can be a convex or concave surface, so that the camera optics lens assembly has different operational performances.

The third lens 3000 is a lens having a negative focal power to provide a negative refractive power, wherein the third lens 3000 has a third lens imaging side surface 3100 and a third lens object side surface 3200. The third lens imaging side surface 3100 towards the imaging surface 1111 and the third lens object side surface 3200 towards the second lens imaging side surface 2100. The third lens object side surface 3200 is a concave surface.

It is worth mentioning that in some embodiments of the present invention, the third lens imaging side surface 3100 is a convex surface.

In this embodiment of the present invention, at least one side of the first lens imaging side surface 1100, the first lens object side surface 1200, the second lens imaging side surface 2100, the second lens object side surface 2200, the third lens imaging side surface 3100 and the third lens object side surface 3200 is aspherical so to meet the needs of the camera optics lens assembly manufacturing the iris camera module.

It is worth mentioning that in some embodiments of the present invention, every sides of the first lens 1000, the second lens 2000 and the third lens 3000 can be aspherical such that the camera optics lens assembly is configured with parameters by designing the first lens 1000, the second lens 2000 and the third lens 3000 into different shapes, thereby eliminating imaging aberration as much as possible.

Moreover, the material of the first lens 1000, the second lens 2000 and the third lens 3000 can be selectively from plastic or glass. For example, when the first lens 1000, the second lens 2000 and the external system 300 are made of plastic material, the camera optics lens assembly has a lower manufacture cost and the manufacturing difficulty is reduced to further improve the product yields; when the first lens 1000, the second lens 2000 and the external system 300 are made of glass material, the configuration freedom of the refractive power of the camera optics lens assembly can be increased so that when the camera optics lens assembly is manufactured into the iris camera module, the image quality of the collected user iris characteristics is improved.

After the camera optics lens assembly is configured, the spatial position is stable. In other words, the spatial positions of the first lens 1000, the second lens 2000 and the third lens 3000 become stabilized, and the first lens 1000, the second lens 2000 and the third lens 3000 have a certain gap in order to prevent the collision among themselves during the assembly of the camera optics lens assembly and so as to improve the information content of the collected user iris characteristics by the iris camera module by enhancing the sharpness of the user iris characteristics image collected by the iris camera module manufactured from the camera optics lens assembly.

In the present invention, the distance from the first lens object side surface 1200 of the first lens 1000 to the imaging surface 1111 on the optical axis is TTL; the focal length of the camera optics lens assembly is f, the focal length of the first lens 1000 is f1; the effective radius of the first lens object side surface 1200 of the first lens 1000 is SD11, the effective radius of the third lens imaging side surface 3100 of the third lens 3000 is SD32; the center thickness of the first lens 1000 is CT1 (a distance from the first lens imaging side surface 1100 to the first lens object side surface 1200 on the optical axis), the center thickness of the second lens 2000 is CT2 (a distance from the second lens imaging side surface 2100 to the second lens object side surface 2200 on the optical axis); the aperture value of the camera optics lens assembly is Fno.

Those skilled in the art should understand that in different embodiment, the camera optics lens assembly is satisfied at least one of the following conditions.

condition 1: TTL/f<0.9;
condition 2: 0.6<f1/f<1.0;
condition 3: 0.6<SD11/SD32<1.5;
condition 4: 0.2<CT1/f<0.5;
condition 5: 0<CT2/f<0.1; and
condition 6: Fno<2.6.

It is worth mentioning that, in the description of the following embodiments, the contents and technical proposals of the present invention are further disclosed.

First Embodiment

Combined with one or more objects of the present invention, as shown in FIG. 39 to FIG. 43 of the drawings, in a first preferred embodiment of the present invention, a first lens 1000, a second lens 2000 and a third lens 3000 of the camera optics lens assembly are subsequently arranged from the object side to the image side (as shown in FIG. 39 of the drawings from left to right), the camera optics lens assembly is provided with an image sensor chip 111, wherein a side surface of the image sensor chip 111 which towards the camera optics lens assembly is defined as an imaging surface 1111.

It is worth mentioning that an infrared filter 4000 is provided between the camera optics lens assembly and the human face camera module 40, in particular, the infrared filter 4000 is provided between the third lens 3000 and the human face camera module 40 to produce the iris camera module and to make the iris camera module to form the infrared iris camera module, so that when the iris camera module collects the user iris characteristics, the infrared filter 4000 can filter other visible light in addition to infrared light to avoid the visible light affecting on the imaging surface 1111 which has interference on the user iris characteristics image quality, thereby improving the image quality of the iris camera module.

In this embodiment, the first lens 1000 is a lens having a positive focal power to provide a positive refractive power, the second lens 2000 is a lens having a negative focal power to provide a negative refractive power, and the third lens 3000 is a lens having a negative focal power to provide a negative refractive power. Wherein the first lens object side surface 1200 is a convex surface, the second lens object side surface 2200 is a concave surface and the third lens object side surface 3200 is a concave surface. Furthermore, the second lens imaging side surface 2100 is a convex surface and the third lens imaging side surface 3100 is a convex surface.

The aperture slot is provided between the shot object and the second lens 2000, under the condition of the camera optics lens assembly being satisfied the above condition 1 to condition 6, in the first preferred embodiment of the present invention, the detailed parameters of the camera optics lens assembly is fully illustrated and disclosed, in which the aperture value Fno in the first preferred embodiment of the present invention is preferably 2.2 in Table 1-1.

TABLE 1-1

First Embodiment

| Surface Type | Curvature Radius | Thickness | Refractive Index/ Abbe. # | Effective Aperture | Conic coefficient |
|---|---|---|---|---|---|
| Plano | Inf | 225 | | 140.8737 | |
| Asphere | 1.0892 | 0.9723 | 1.535/55.78 | 2.2470 | −0.3316 |
| Asphere | 3.3009 | 0.4046 | | 1.7955 | 9.8031 |
| Plano | Inf | 0.2583 | | 1.0539 | |
| Asphere | −1.9241 | 0.2500 | 1.535/55.78 | 1.1589 | −404.2931 |
| Asphere | −18.3838 | 0.6492 | | 1.3350 | −10.5395 |
| Asphere | −2.5036 | 0.3355 | 1.535/55.78 | 1.8600 | −62.5760 |
| Asphere | −5.5890 | 0.2291 | | 2.1400 | −90.8264 |
| Plano | Inf | 0.2100 | 1.517/64.17 | 2.3245 | |
| Plano | Inf | 0.3610 | | 2.4013 | |
| Plano | Inf | | | 2.5652 | |

In addition, the asphere higher term detailed parameters information of the aspheric lens is fully illustrated and disclosed in Table 1-2 can be fully explained and disclosed.

TABLE 1-2

| First Embodiment | | | | | | |
|---|---|---|---|---|---|---|
| A4 | A6 | A8 | A10 | A12 | A14 | A16 |
| −3.708E−02 | 2.599E−01 | −7.075E−01 | 1.197E+00 | −1.224E+00 | 7.249E−01 | −1.927E−01 |
| −4.333E−02 | 4.058E−01 | −2.753E+00 | 8.617E+00 | −1.468E+01 | 1.243E+01 | −4.147E+00 |
| −1.958E+00 | 1.543E+01 | −8.883E+01 | 3.147E+02 | −6.847E+02 | 8.293E+02 | −4.413E+02 |
| 2.321E−01 | −9.966E−02 | −1.088E−02 | 5.991E+00 | −3.274E+01 | 7.061E+01 | −5.619E+01 |
| −3.531E−01 | 8.483E−01 | −2.249E+00 | 5.655E+00 | −8.972E+00 | 7.408E+00 | −2.399E+00 |
| −6.164E−02 | −3.325E−01 | 7.250E−01 | −8.843E−01 | 6.604E−01 | −3.467E−01 | 1.036E−01 |

In the first embodiment, the distance from the first lens object side surface 1200 to the imaging surface 1111 on the optical axis is TTL and is implemented as TTL=3.67.

In the first embodiment, the focal length of the camera optics lens assembly is f and is implemented as f=4.294; and TTL/f=0.855, which is accord with the range of the condition 1 (TTL/f<0.9).

In the first embodiment, the focal length of the first lens 1000 is f1 and is implemented as f1=2.671; and the f1/f=0.622, which is accord with the range of the condition 2 (0.6<f1/f<1.0).

In the first embodiment, the focal length of the second lens 2000 is f2 and is implemented as f2=−4.098.

In the first embodiment, the focal length of the third lens 3000 is f3 and is implemented as f3=−8.920.

In the first embodiment, the effective radius of the first lens object side surface 1200 is SD11 and the effective radius of the third lens imaging side surface 3100 is SD32, which is implemented as SD11/SD32=1.05 and which is accord with the range of the condition 3 (0.6<SD11/SD32<1.5).

In the first embodiment, the center thickness of the first lens 1000 is CT1 (a distance from the first lens imaging side surface 1100 to the first lens object side surface 1200 on the optical axis), which is implemented as CT1/f=0.226, and which is accord with the range of the condition 4 (0.2<CT1/f<0.5).

In the first embodiment, the center thickness of the second lens 2000 is CT2 (a distance from the second lens imaging side surface 2100 to the second lens object side surface 2200 on the optical axis), which is implemented as CT2/f=0.058, and which is accord with the range of the condition 5 (0<CT2/f<0.1).

As shown in FIG. human face camera module 40 of the drawings, the aberration curves schematic view of the camera optics lens assembly when the aperture value is 2.2 is illustrated.

Figure 41:
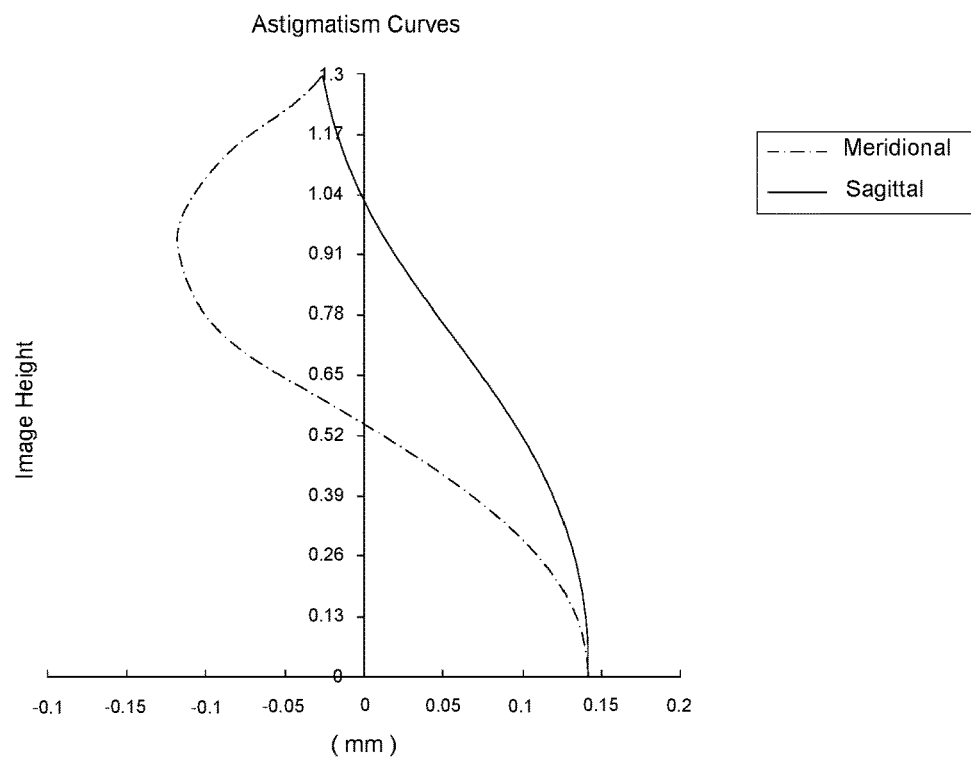
FIG. 41 is an astigmatism curves schematic view of a camera optics lens assembly according to the above preferred embodiment of the present invention.

As shown in FIG. 41 of the drawings, the astigmatism curves schematic view of the camera optics lens assembly when the aperture value is 2.2 is illustrated.

Figure 42:
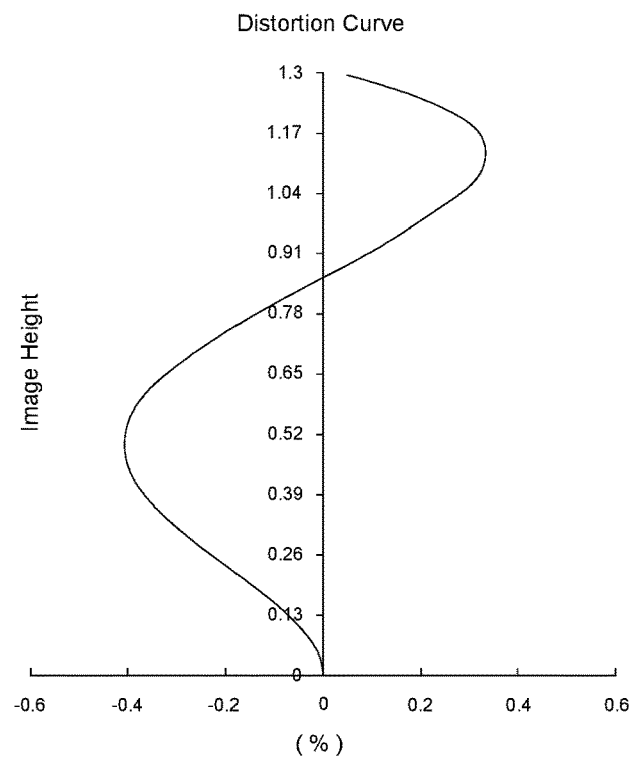
FIG. 42 is a distortion curve schematic view of a camera optics lens assembly according to the above preferred embodiment of the present invention.

As shown in FIG. 42 of the drawings, the distortion curve schematic view of the camera optics lens assembly when the aperture value is 2.2 is illustrated.

Figure 43:
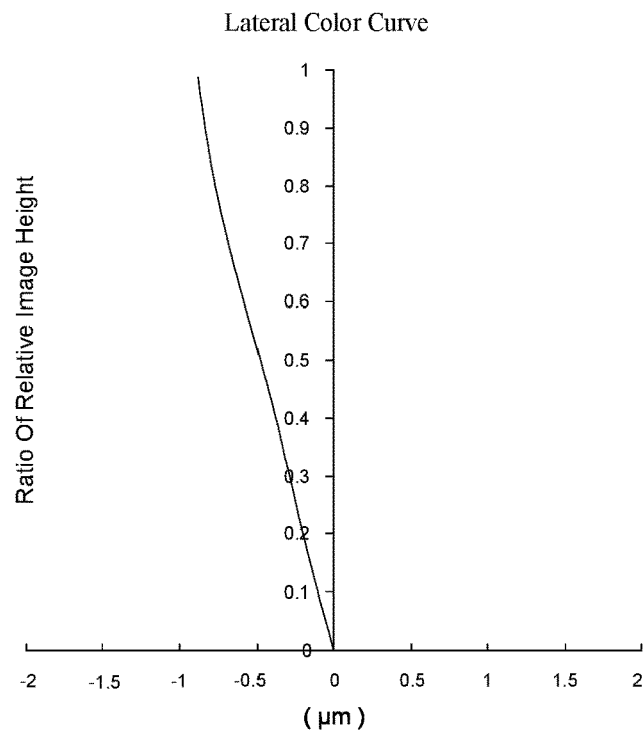
FIG. 43 is a lateral color curve schematic view of a camera optics lens assembly according to the above preferred embodiment of the present invention.

As shown in FIG. 43 of the drawings, the lateral color curve schematic view of the camera optics lens assembly when the aperture value is 2.2 is illustrated.

Second Embodiment

Figure 44:
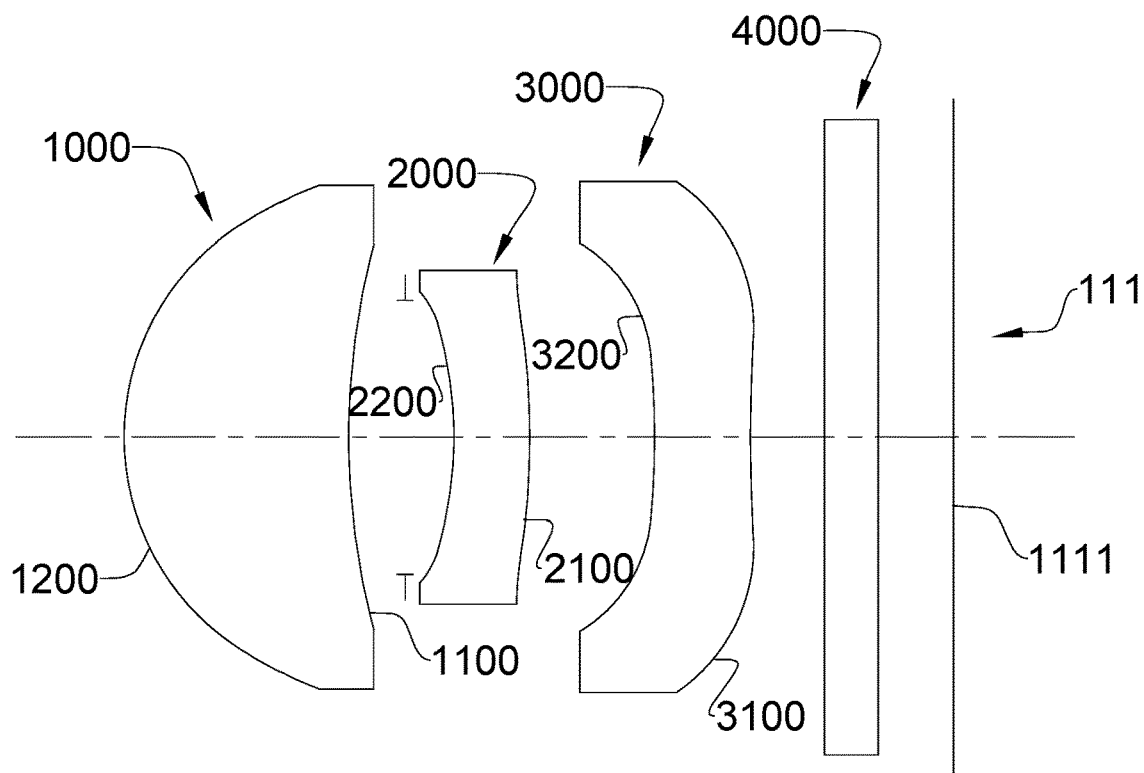
FIG. 44 is a main schematic view of a camera optics lens assembly according to another preferred embodiment of the present invention.

As shown in FIG. 44 to FIG. 48 of the drawings, in a second preferred embodiment of the present invention, a first lens 1000, a second lens 2000 and a third lens 3000 of the camera optics lens assembly are subsequently arranged from the object side to the image side (as shown in FIG. 44 of the drawings from left to right), the camera optics lens assembly is provided with an image sensor chip 111, wherein a side surface of the image sensor chip 111 which towards the camera optics lens assembly is defined as an imaging surface 1111.

In this embodiment, the first lens 1000 is a lens having a positive focal power to provide a positive refractive power, the second lens 2000 is a lens having a negative focal power to provide a negative refractive power, and the third lens 3000 is a lens having a negative focal power to provide a negative refractive power. Wherein the first lens object side surface 1200 is a convex surface, the second lens object side surface 2200 is a concave surface and the third lens object side surface 3200 is a concave surface. Furthermore, the second lens imaging side surface 2100 is a convex surface and the third lens imaging side surface 3100 is a concave surface.

The aperture slot is provided between the shot object and the second lens 2000, under the condition of the camera optics lens assembly being satisfied the above condition 1 to condition 6, in the second preferred embodiment of the present invention, the detailed parameters of the camera optics lens assembly is fully illustrated and disclosed, in which the aperture value Fno in the second preferred embodiment of the present invention is preferably 2.0 in Table 2-1.

TABLE 2-1

| Second Embodiment | | | | | |
|---|---|---|---|---|---|
| Surface Type | Curvature Radius | Thick-ness | Refractive Index/ Abbe. # | Effective Aperture | Conic co-efficient |
| Plano | Inf | 200 | | 145.7349 | |
| Asphere | 0.9488 | 0.8813 | 1.535/55.78 | 1.9731 | −0.1662 |
| Asphere | 2.9474 | 0.2242 | | 1.5207 | 1.2614 |
| Plano | Inf | 0.1899 | | 1.0726 | |
| Asphere | −1.5297 | 0.2998 | 1.535/55.78 | 1.1400 | −355.5146 |
| Asphere | −3.7184 | 0.4895 | | 1.3091 | 4.9567 |
| Asphere | −9.1785 | 0.3771 | 1.535/55.78 | 1.5232 | −1021.6379 |
| Asphere | 2.9372 | 0.2904 | | 2.0026 | −0.3936 |
| Plano | Inf | 0.2100 | 1.517/64.17 | 2.3926 | |
| Plano | Inf | 0.2980 | | 2.4897 | |
| Plano | Inf | | | 2.6450 | |

In addition, the asphere higher term detailed parameters information of the aspheric lens is fully illustrated and disclosed in Table 2-2 can be fully explained and disclosed.

TABLE 2-2

Second Embodiment

| A4 | A6 | A8 | A10 | A12 | A14 | A16 |
|---|---|---|---|---|---|---|
| −1.135E−01 | 7.950E−01 | −3.302E+00 | 7.979E+00 | −1.097E+01 | 8.089E+00 | −2.504E+00 |
| 1.140E−01 | −1.168E+00 | 8.792E+00 | −3.593E+01 | 7.875E+01 | −9.133E+01 | 4.431E+01 |
| −3.511E+00 | 3.908E+01 | −3.365E+02 | 1.888E+03 | −6.607E+03 | 1.304E+04 | −1.106E+04 |
| −3.006E−01 | 1.287E+00 | −4.227E+00 | 1.612E+01 | −4.268E+01 | 7.430E+01 | −5.344E+01 |
| −1.165E+00 | 2.880E+00 | −1.368E+01 | 4.097E+01 | −7.338E+01 | 6.628E+01 | −2.041E+01 |
| −6.903E−01 | 7.341E−01 | −1.153E+00 | 1.270E+00 | −9.620E−01 | 3.968E−01 | −5.725E−02 |

In the second embodiment, the distance from the first lens object side surface 1200 to the imaging surface 1111 on the optical axis is TTL and is implemented as TTL=3.26.

In the second embodiment, the focal length of the camera optics lens assembly is f and is implemented as f=3.687; and TTL/f=0.884, which is accord with the range of the condition 1 (TTL/f<0.9).

In the second embodiment, the focal length of the first lens 1000 is f1 and is implemented as f1=2.301; and the f1/f=0.624, which is accord with the range of the condition 2 (0.6<f1/f<1.0).

In the second embodiment, the focal length of the second lens 2000 is f2 and is implemented as f2=−5.171.

In the second embodiment, the focal length of the third lens 3000 is f3 and is implemented as f3=−4.173.

In the second embodiment, the effective radius of the first lens object side surface 1200 is SD11 and the effective radius of the third lens imaging side surface 3100 is SD32, which is implemented as SD11/SD32=0.985 and which is accord with the range of the condition 3 (0.6<SD11/SD32<1.5).

In the second embodiment, the center thickness of the first lens 1000 is CT1 (a distance from the first lens imaging side surface 1100 to the first lens object side surface 1200 on the optical axis), which is implemented as CT1/f=0.239, and which is accord with the range of the condition 4 (0.2<CT1/f<0.5).

In the second embodiment, the center thickness of the second lens 2000 is CT2 (a distance from the second lens imaging side surface 2100 to the second lens object side surface 2200 on the optical axis), which is implemented as CT2/f=0.081, and which is accord with the range of the condition 5 (0<CT2/f<0.1).

Figure 45:
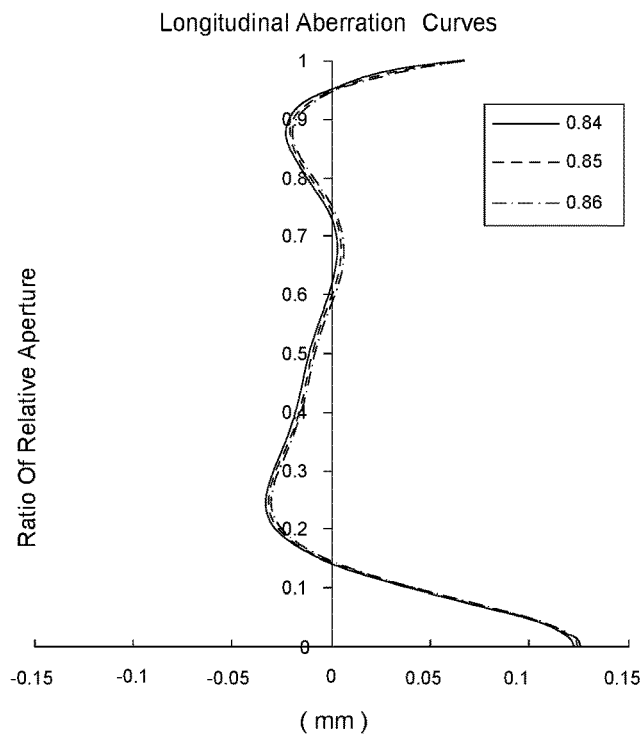
FIG. 45 is an aberration curves schematic view of a camera optics lens assembly according to the above preferred embodiment of the present invention.

As shown in FIG. 45 of the drawings, the aberration curves schematic view of the camera optics lens assembly when the aperture value is 2.0 is illustrated.

Figure 46:
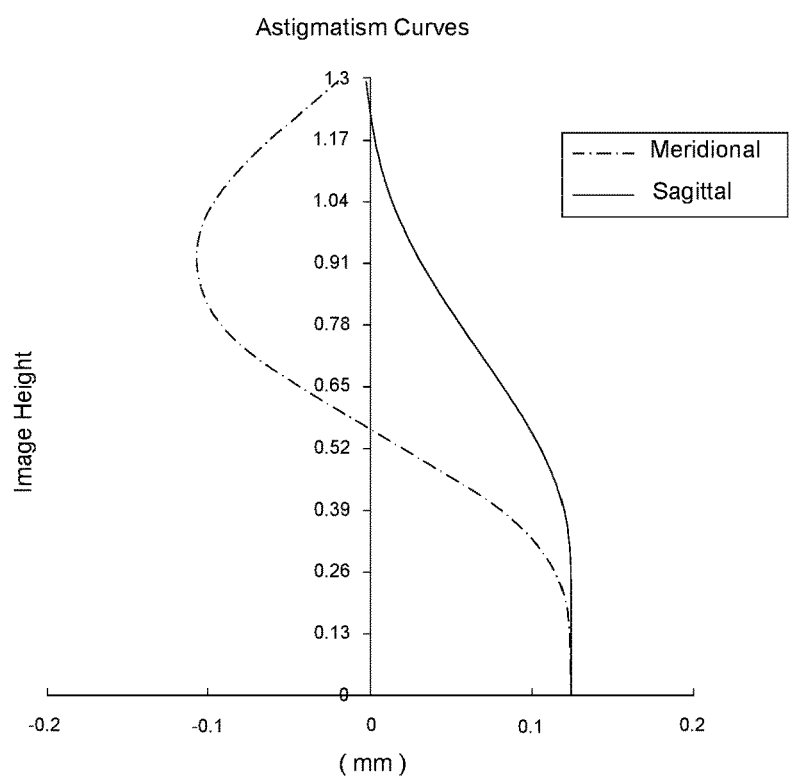
FIG. 46 is an astigmatism curves schematic view of a camera optics lens assembly according to the above preferred embodiment of the present invention.

As shown in FIG. 46 of the drawings, the astigmatism curves schematic view of the camera optics lens assembly when the aperture value is 2.0 is illustrated.

Figure 47:
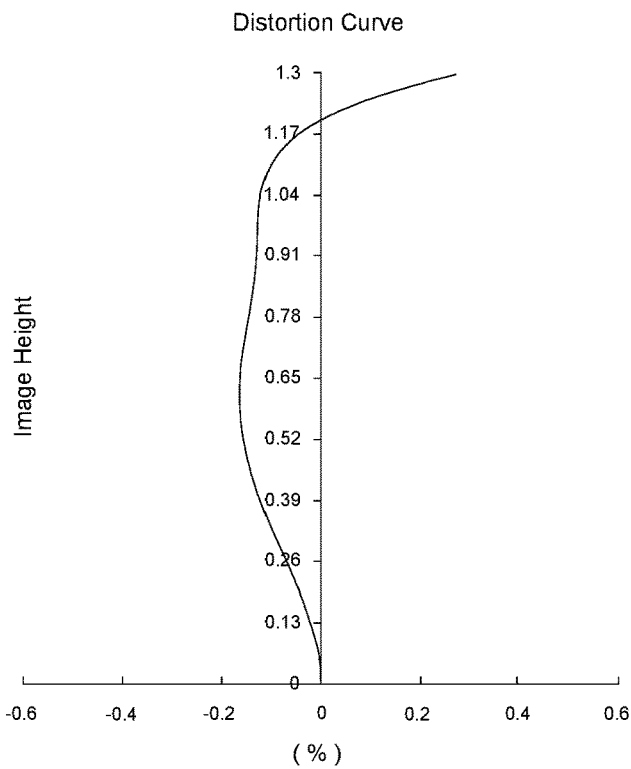
FIG. 47 is a distortion curve schematic view of a camera optics lens assembly according to the above preferred embodiment of the present invention.

As shown in FIG. 47 of the drawings, the distortion curve schematic view of the camera optics lens assembly when the aperture value is 2.0 is illustrated.

Figure 48:
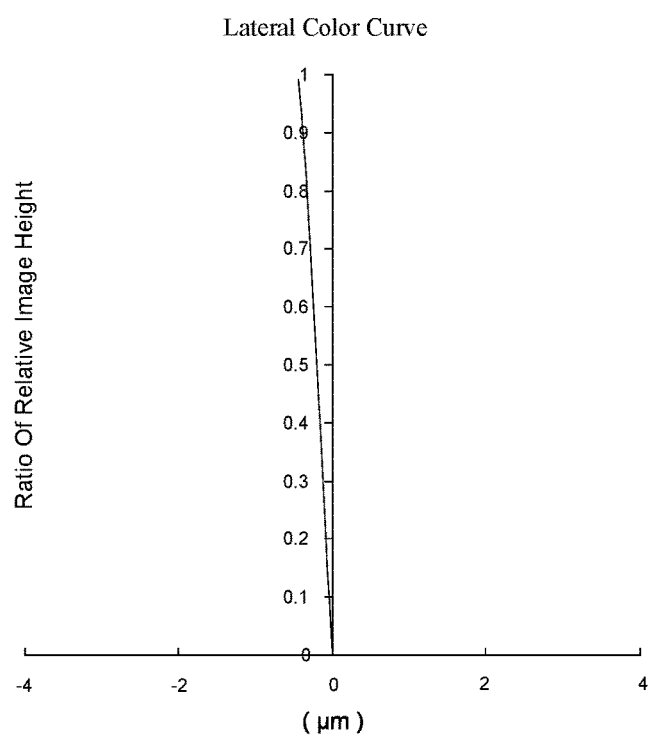
FIG. 48 is a lateral color curve schematic view of a camera optics lens assembly according to the above preferred embodiment of the present invention.

As shown in FIG. 48 of the drawings, the lateral color curve schematic view of the camera optics lens assembly when the aperture value is 2.0 is illustrated.

Third Embodiment

Figure 49:
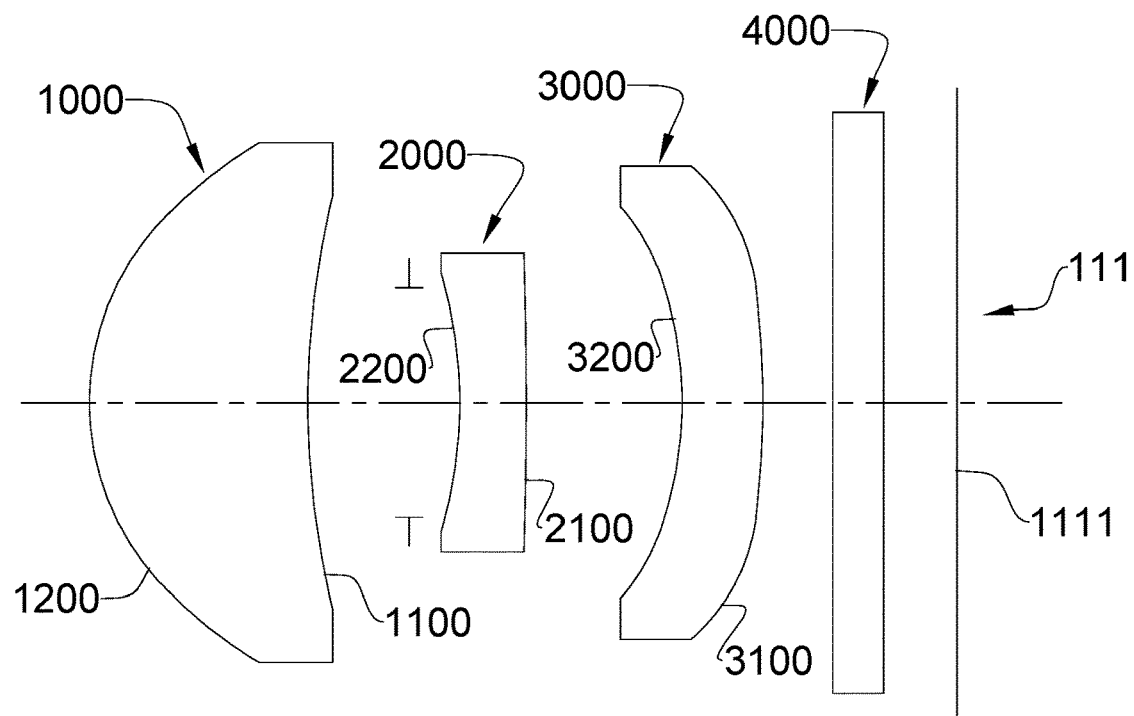
FIG. 49 is a main schematic view of a camera optics lens assembly according to another preferred embodiment of the present invention.

As shown in FIG. 49 to FIG. 53 of the drawings, in a third preferred embodiment of the present invention, a first lens 1000, a second lens 2000 and a third lens 3000 of the camera optics lens assembly are subsequently arranged from the object side to the image side (as shown in FIG. 49 of the drawings from left to right), the camera optics lens assembly is provided with an image sensor chip 111, wherein a side surface of the image sensor chip 111 which towards the camera optics lens assembly is defined as an imaging surface 1111.

In this embodiment, the first lens 1000 is a lens having a positive focal power to provide a positive refractive power, the second lens 2000 is a lens having a negative focal power to provide a negative refractive power, and the third lens 3000 is a lens having a negative focal power to provide a negative refractive power. Wherein the first lens object side surface 1200 is a convex surface, the second lens object side surface 2200 is a concave surface and the third lens object side surface 3200 is a concave surface. Furthermore, the second lens imaging side surface 2100 is a convex surface and the third lens imaging side surface 3100 is a convex surface.

The aperture slot is provided between the shot object and the second lens 2000, under the condition of the camera optics lens assembly being satisfied the above condition 1 to condition 6, in the third preferred embodiment of the present invention, the detailed parameters of the camera optics lens assembly are fully illustrated and disclosed, in which the aperture value Fno in the third preferred embodiment of the present invention is preferably 2.4 in Table 3-1.

TABLE 3-1

Third Embodiment

| Surface Type | Curvature Radius | Thickness | Refractive Index/ Abbe. # | Effective Aperture | Conic co-efficient |
|---|---|---|---|---|---|
| Plano | Inf | 200 | | 128.1372 | |
| Asphere | 1.0688 | 0.9102 | 1.535/55.78 | 2.1566 | −0.4655 |
| Asphere | 3.0278 | 0.4249 | | 1.7322 | 9.9023 |
| Plano | Inf | 0.2107 | | 0.9501 | |
| Asphere | −2.2699 | 0.2793 | 1.535/55.78 | 1.0704 | −493.2886 |
| Asphere | −8.9197 | 0.6467 | | 1.2407 | −99.9989 |
| Asphere | −2.2275 | 0.3406 | 1.535/55.78 | 1.6233 | −89.6498 |
| Asphere | −10.6578 | 0.2907 | | 1.9637 | −200.0000 |
| Plano | Inf | 0.2100 | 1.517/64.17 | 2.3260 | |
| Plano | Inf | 0.3090 | | 2.4138 | |
| Plano | Inf | | | 2.6118 | |

In addition, the asphere higher term detailed parameters information of the aspheric lens is fully illustrated and disclosed in Table 3-2 can be fully explained and disclosed.

TABLE 3-2

| Third Embodiment | | | | | | |
|---|---|---|---|---|---|---|
| A4 | A6 | A8 | A10 | A12 | A14 | A16 |
| 8.866E−03 | 1.569E−01 | −4.943E−01 | 1.073E+00 | −1.359E+00 | 9.755E−01 | −3.046E−01 |
| −3.511E−02 | 2.496E−01 | −2.255E+00 | 7.876E+00 | −1.536E+01 | 1.495E+01 | −5.853E+00 |
| −2.145E+00 | 1.814E+01 | −1.140E+02 | 3.860E+02 | −4.335E+02 | −1.071E+03 | 2.734E+03 |
| −5.807E−02 | 7.836E−01 | −6.494E+00 | 3.667E+01 | −1.075E+02 | 1.541E+02 | −7.418E+01 |
| −1.022E+00 | 2.632E+00 | −6.011E+00 | 9.732E+00 | −1.105E+01 | 7.290E+00 | −1.805E+00 |
| −3.312E−01 | −1.801E−02 | 7.290E−01 | −1.717E+00 | 1.857E+00 | −1.055E+00 | 2.421E−01 |

In the third embodiment, the distance from the first lens object side surface 1200 to the imaging surface 1111 on the optical axis is TTL and is implemented as TTL=3.622.

In the third embodiment, the focal length of the camera optics lens assembly is f and is implemented as f=4.163; and TTL/f=0.870, which is accord with the range of the condition 1 (TTL/f<0.9).

In the third embodiment, the focal length of the first lens 1000 is f1 and is implemented as f1=2.693; and the f1/f=0.647, which is accord with the range of the condition 2 (0.6<f1/f<1.0).

In the third embodiment, the focal length of the second lens 2000 is f2 and is implemented as f2=−5.845.

In the third embodiment, the focal length of the third lens 3000 is f3 and is implemented as f3=−5.403.

In the third embodiment, the effective radius of the first lens object side surface 1200 is SD11 and the effective radius of the third lens imaging side surface 3100 is SD32, which is implemented as SD11/SD32=1.098 and which is accord with the range of the condition 3 (0.6<SD11/SD32<1.5).

In the third embodiment, the center thickness of the first lens 1000 is CT1 (a distance from the first lens imaging side surface 1100 to the first lens object side surface 1200 on the optical axis), which is implemented as CT1/f=0.219, and which is accord with the range of the condition 4 (0.2<CT1/f<0.5).

In the third embodiment, the center thickness of the second lens 2000 is CT2 (a distance from the second lens imaging side surface 2100 to the second lens object side surface 2200 on the optical axis), which is implemented as CT2/f=0.067, and which is accord with the range of the condition 5 (0<CT2/f<0.1).

Figure 50:
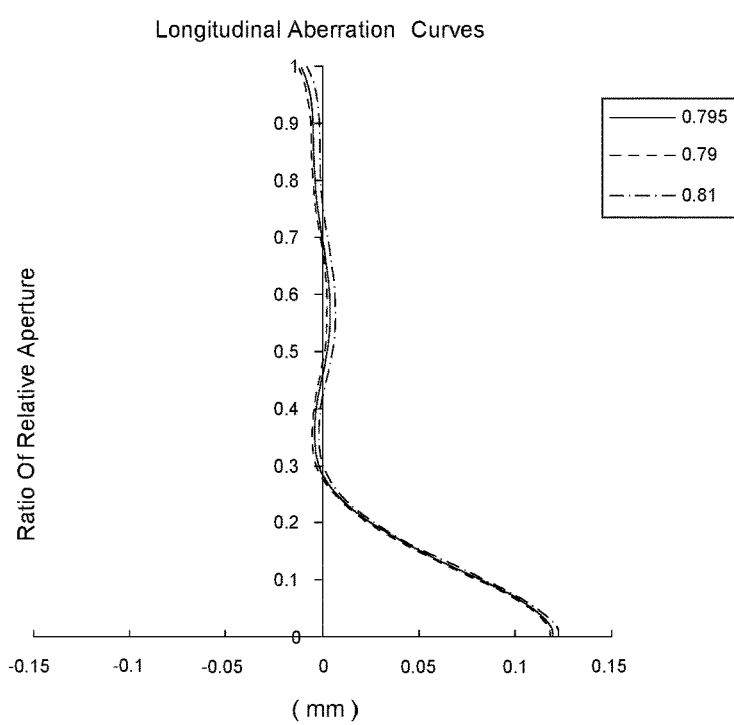
FIG. 50 is an aberration curves schematic view of a camera optics lens assembly according to the above preferred embodiment of the present invention.

As shown in FIG. 50 of the drawings, the aberration curves schematic view of the camera optics lens assembly when the aperture value is 2.4 is illustrated.

Figure 51:
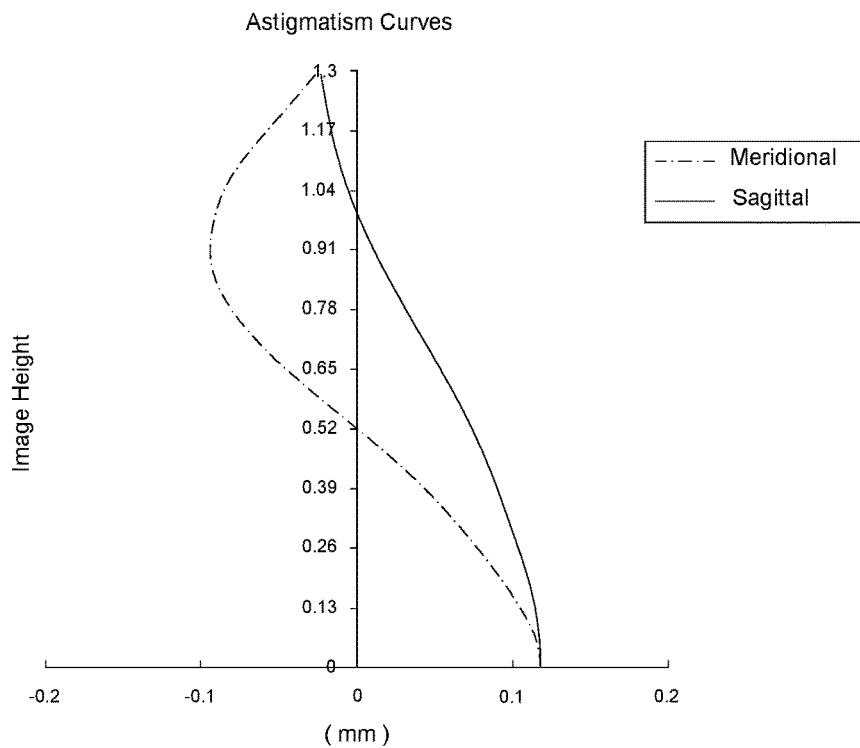
FIG. 51 is an astigmatism curves schematic view of a camera optics lens assembly according to the above preferred embodiment of the present invention.

As shown in FIG. 51 of the drawings, the astigmatism curves schematic view of the camera optics lens assembly when the aperture value is 2.4 is illustrated.

Figure 52:
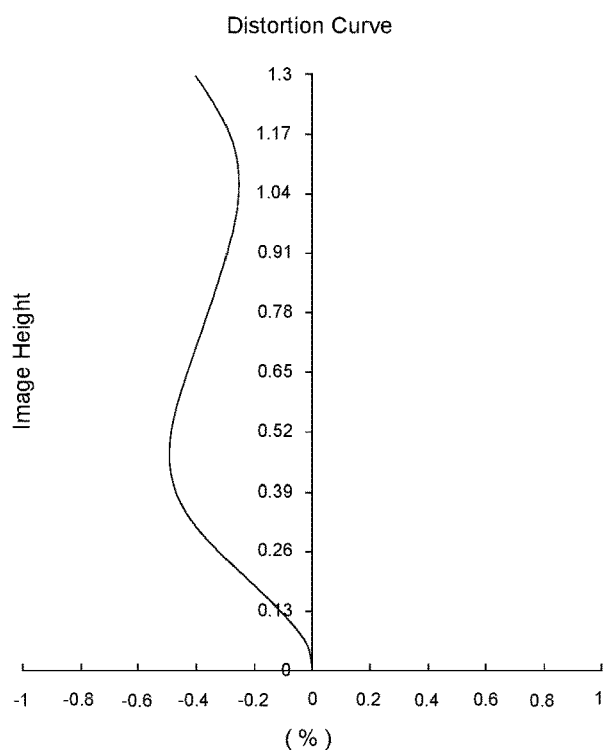
FIG. 52 is a distortion curve schematic view of a camera optics lens assembly according to the above preferred embodiment of the present invention.

As shown in FIG. 52 of the drawings, the distortion curve schematic view of the camera optics lens assembly when the aperture value is 2.4 is illustrated.

Figure 53:
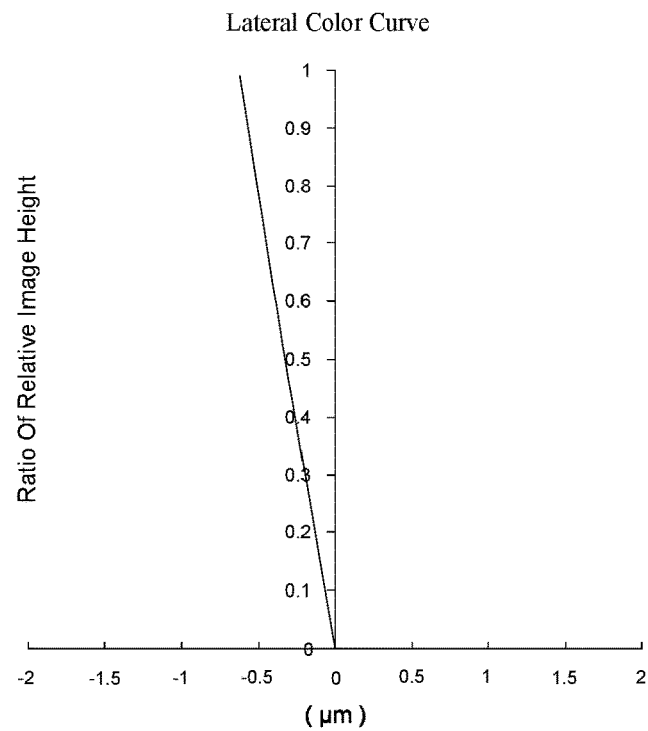
FIG. 53 is a lateral color curve schematic view of a camera optics lens assembly according to the above preferred embodiment of the present invention.

As shown in FIG. 53 of the drawings, the lateral color curve schematic view of the camera optics lens assembly when the aperture value is 2.4 is illustrated.

Fourth Embodiment

Figure 54:
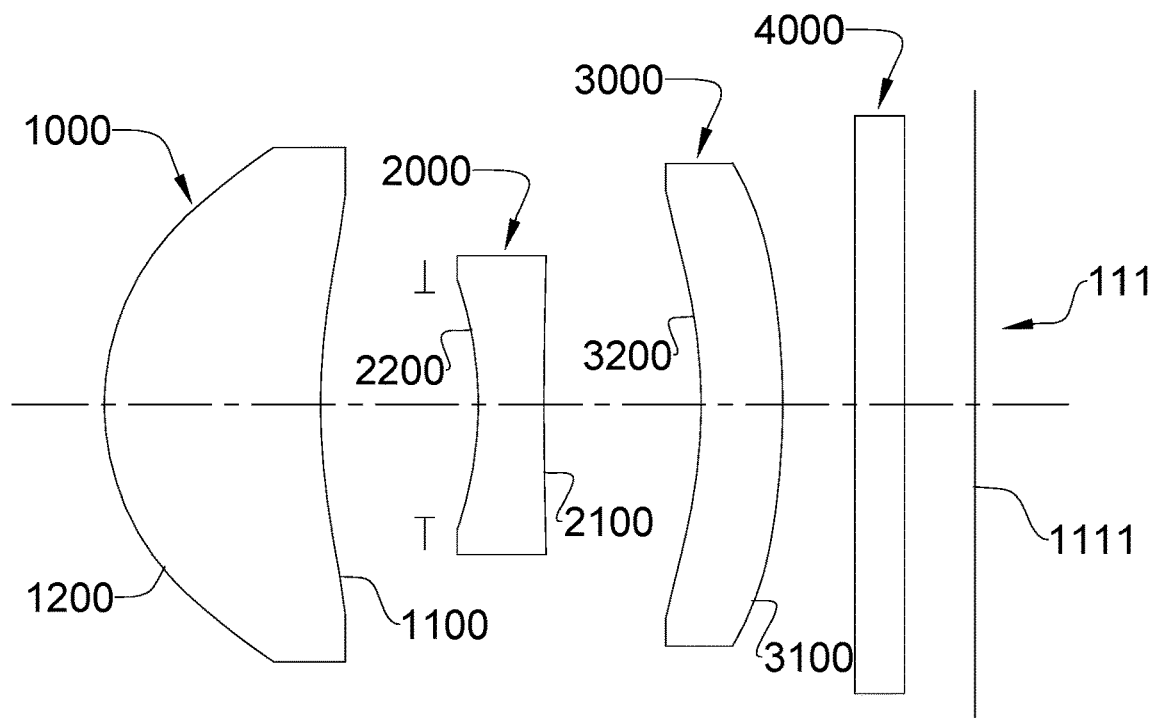
FIG. 54 is a main schematic view of a camera optics lens assembly according to another preferred embodiment of the present invention.

As shown in FIG. 54 to FIG. 58 of the drawings, in a fourth preferred embodiment of the present invention, a first lens 1000, a second lens 2000 and a third lens 3000 of the camera optics lens assembly are subsequently arranged from the object side to the image side (as shown in FIG. 54 of the drawings from left to right), the camera optics lens assembly is provided with an image sensor chip 111, wherein a side surface of the image sensor chip 111 which towards the camera optics lens assembly is defined as an imaging surface 1111.

In this embodiment, the first lens 1000 is a lens having a positive focal power to provide a positive refractive power, the second lens 2000 is a lens having a negative focal power to provide a negative refractive power, and the third lens 3000 is a lens having a negative focal power to provide a negative refractive power. Wherein the first lens object side surface 1200 is a convex surface, the second lens object side surface 2200 is a concave surface and the third lens object side surface 3200 is a concave surface. Furthermore, the second lens imaging side surface 2100 is a convex surface and the third lens imaging side surface 3100 is a convex surface.

The aperture slot is provided between the shot object and the second lens 2000, under the condition of the camera optics lens assembly being satisfied the above condition 1 to condition 6, in the fourth preferred embodiment of the present invention, the detailed parameters of the camera optics lens assembly are fully illustrated and disclosed, in which the aperture value Fno in the third preferred embodiment of the present invention is preferably 2.4 in Table 4-1.

TABLE 4-1

| Fourth Embodiment | | | | | |
|---|---|---|---|---|---|
| Surface Type | Curvature Radius | Thick-ness | Refractive Index/ Abbe. # | Effective Aperture | Conic co-efficient |
| Plano | Inf | 200 | | 124.3318 | |
| Asphere | 1.0493 | 0.9098 | 1.535/55.78 | 2.1556 | −0.4688 |
| Asphere | 2.9212 | 0.4409 | | 1.7632 | 8.8938 |
| Plano | Inf | 0.2251 | | 0.9419 | |
| Asphere | −1.8899 | 0.2783 | 1.535/55.78 | 1.0597 | −322.1078 |
| Asphere | −11.7851 | 0.6612 | | 1.2531 | −50.7667 |
| Asphere | −2.1479 | 0.3443 | 1.535/55.78 | 1.7905 | −97.6366 |
| Asphere | −4.2329 | 0.3029 | | 2.0231 | −200.0015 |
| Plano | Inf | 0.2100 | 1.517/64.17 | 2.3364 | |
| Plano | Inf | 0.2966 | | 2.4214 | |
| Plano | Inf | | | 2.6259 | |

In addition, the asphere higher term detailed parameters information of the aspheric lens are fully illustrated and disclosed in Table 4-2 can be fully explained and disclosed.

TABLE 4-2

Fourth Embodiment

| A4 | A6 | A8 | A10 | A12 | A14 | A16 |
|---|---|---|---|---|---|---|
| 1.410E−03 | 1.821E−01 | −5.077E−01 | 1.045E+00 | −1.347E+00 | 1.032E+00 | −3.505E−01 |
| −3.357E−02 | 2.403E−01 | −2.199E+00 | 7.742E+00 | −1.525E+01 | 1.481E+01 | −5.712E+00 |
| −2.521E+00 | 2.099E+01 | −1.239E+02 | 3.752E+02 | −2.938E+02 | −1.267E+03 | 2.612E+03 |
| 5.279E−02 | 7.623E−01 | −5.755E+00 | 3.194E+01 | −1.065E+02 | 1.985E+02 | −1.536E+02 |
| −7.353E−01 | 2.525E+00 | −5.950E+00 | 9.933E+00 | −1.101E+01 | 7.183E+00 | −2.022E+00 |
| −2.677E−01 | 1.222E−01 | 5.244E−01 | −1.621E+00 | 2.037E+00 | −1.292E+00 | 3.432E−01 |

In the fourth embodiment, the distance from the first lens object side surface 1200 to the imaging surface 1111 on the optical axis is TTL and is implemented as TTL=3.699.

In the fourth embodiment, the focal length of the camera optics lens assembly is f and is implemented as f=4.234; and TTL/f=0.867, which is accord with the range of the condition 1 (TTL/f<0.9).

In the fourth embodiment, the focal length of the first lens 1000 is f1 and is implemented as f1=2.652; and the f1/f=0.626, which is accord with the range of the condition 2 (0.6<f1/f<1.0).

In the fourth embodiment, the focal length of the second lens 2000 is f2 and is implemented as f2=−4.printed circuit board 30.

In the fourth embodiment, the focal length of the third lens 3000 is f3 and is implemented as f3=−8.749.

In the fourth embodiment, the effective radius of the first lens object side surface 1200 is SD11 and the effective radius of the third lens imaging side surface 3100 is SD32, which is implemented as SD11/SD32=1.065 and which is accord with the range of the condition 3 (0.6<SD11/SD32<1.5).

In the fourth embodiment, the center thickness of the first lens 1000 is CT1 (a distance from the first lens imaging side surface 1100 to the first lens object side surface 1200 on the optical axis), which is implemented as CT1/f=0.215, and which is accord with the range of the condition 4 (0.2<CT1/f<0.5).

In the fourth embodiment, the center thickness of the second lens 2000 is CT2 (a distance from the second lens imaging side surface 2100 to the second lens object side surface 2200 on the optical axis), which is implemented as CT2/f=0.066, and which is accord with the range of the condition 5 (0<CT2/f<0.1).

Figure 55:
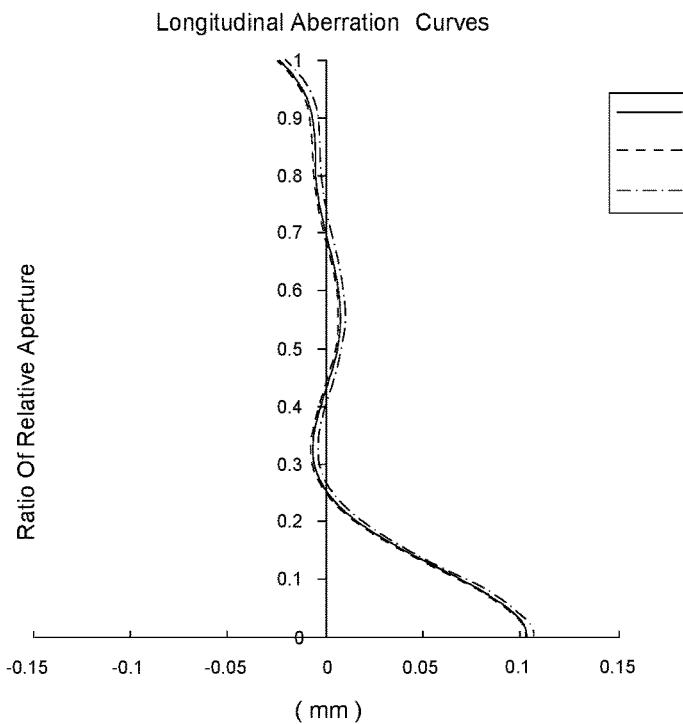
FIG. 55 is an aberration curves schematic view of a camera optics lens assembly according to the above preferred embodiment of the present invention.

As shown in FIG. 55 of the drawings, the aberration curves schematic view of the camera optics lens assembly when the aperture value is 2.4 is illustrated.

Figure 56:
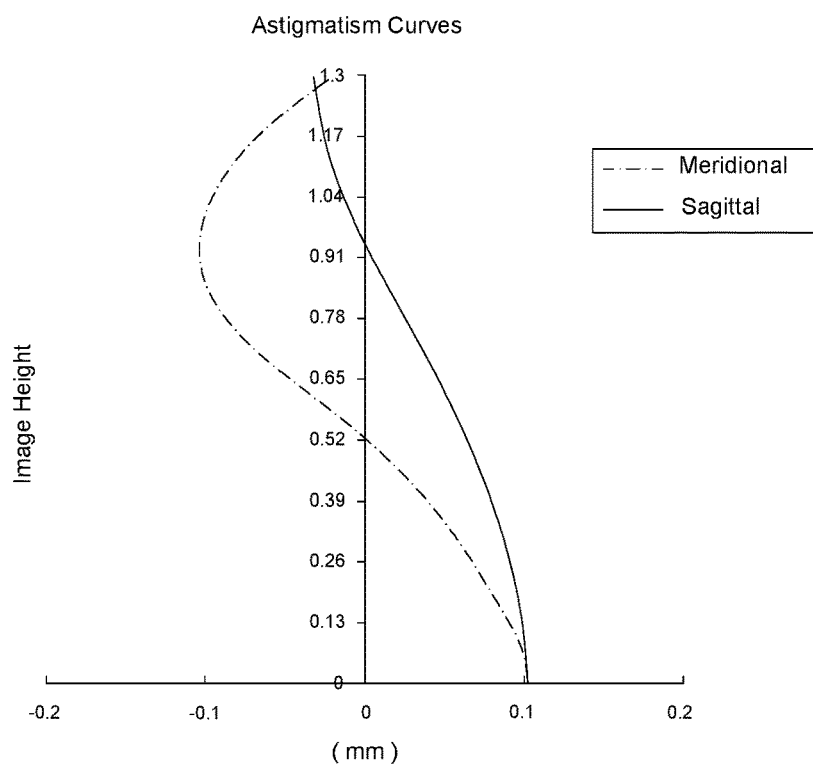
FIG. 56 is an astigmatism curves schematic view of a camera optics lens assembly according to the above preferred embodiment of the present invention.

As shown in FIG. 56 of the drawings, the astigmatism curves schematic view of the camera optics lens assembly when the aperture value is 2.4 is illustrated.

Figure 57:
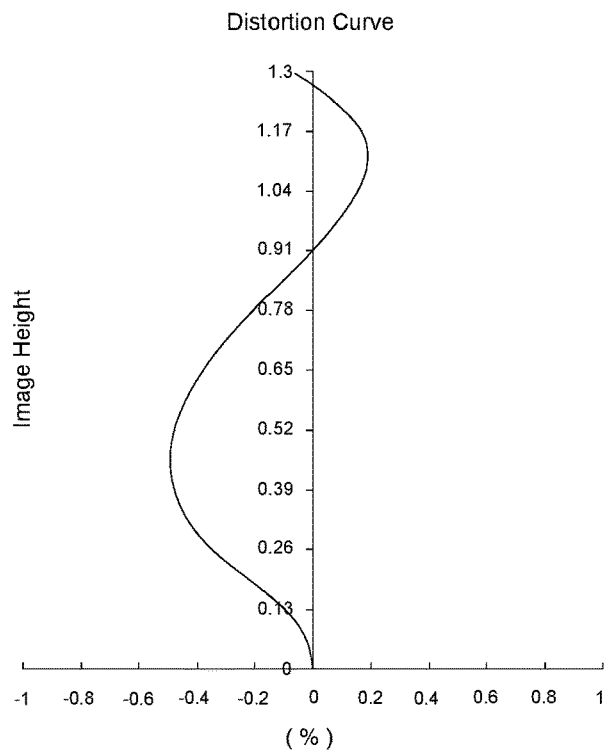
FIG. 57 is a distortion curve schematic view of a camera optics lens assembly according to the above preferred embodiment of the present invention.

As shown in FIG. 57 of the drawings, the distortion curve schematic view of the camera optics lens assembly when the aperture value is 2.4 is illustrated.

Figure 58:
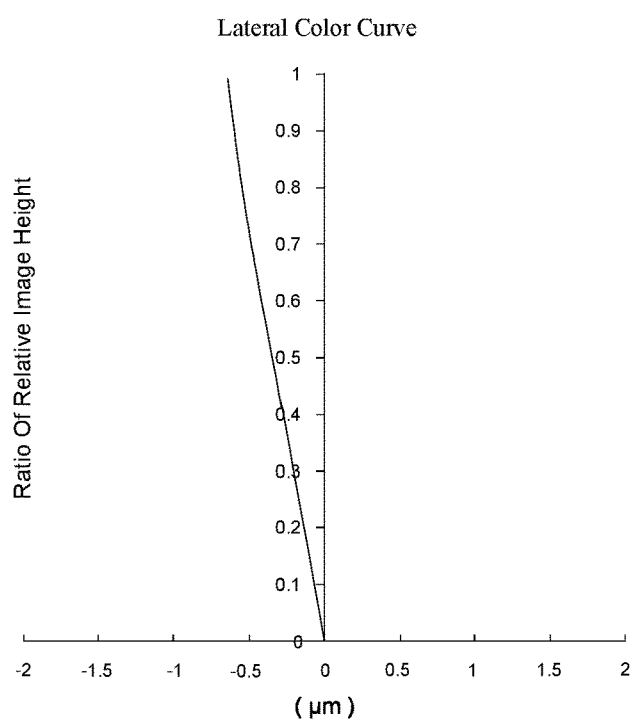
FIG. 58 is a lateral color curve schematic view of a camera optics lens assembly according to the above preferred embodiment of the present invention.

As shown in FIG. 58 of the drawings, the lateral color curve schematic view of the camera optics lens assembly when the aperture value is 2.4 is illustrated.

Fifth Embodiment

Figure 59:
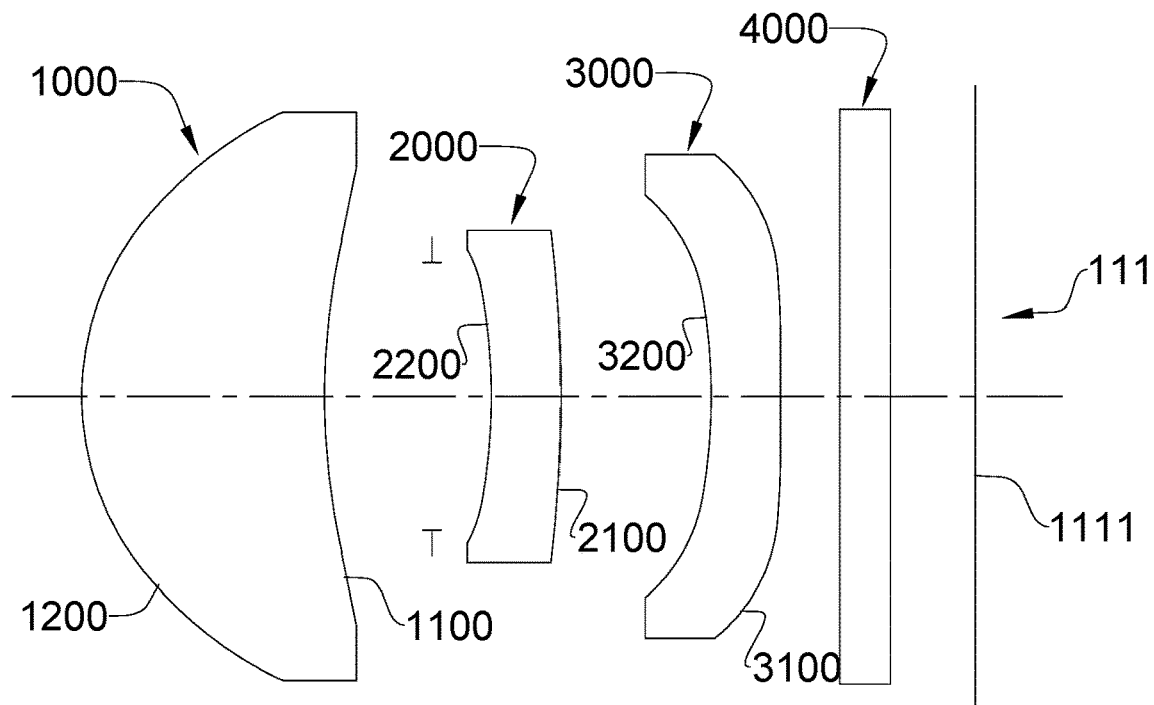
FIG. 59 is a main schematic view of a camera optics lens assembly according to another preferred embodiment of the present invention.

Combined with one or more objectives of the present invention, as shown in FIG. 59 to FIG. 63 of the drawings, in a fifth preferred embodiment of the present invention, a first lens 1000, a second lens 2000 and a third lens 3000 of the camera optics lens assembly are subsequently arranged from the object side to the image side (as shown in FIG. 59 of the drawings from left to right), the camera optics lens assembly is provided with an image sensor chip 111, wherein a side surface of the image sensor chip 111 which towards the camera optics lens assembly is defined as an imaging surface 1111.

In this embodiment, the first lens 1000 is a lens having a positive focal power to provide a positive refractive power, the second lens 2000 is a lens having a negative focal power to provide a negative refractive power, and the third lens 3000 is a lens having a negative focal power to provide a negative refractive power. Wherein the first lens object side surface 1200 is a convex surface, the second lens object side surface 2200 is a concave surface and the third lens object side surface 3200 is a concave surface. Furthermore, the second lens imaging side surface 2100 is a convex surface and the third lens imaging side surface 3100 is a concave surface.

The aperture slot is provided between the shot object and the second lens 2000, under the condition of the camera optics lens assembly being satisfied the above condition 1 to condition 6, in the fifth preferred embodiment of the present invention, the detailed parameters of the camera optics lens assembly are fully illustrated and disclosed, in which the aperture value Fno in the third preferred embodiment of the present invention is preferably 2.0 in Table 5-1.

TABLE 5-1

Fifth Embodiment

| Surface Type | Curvature Radius | Thickness | Refractive Index/Abbe. # | Effective Aperture | Conic co-efficient |
|---|---|---|---|---|---|
| Plano | Inf | 200 | | 127.8369 | |
| Asphere | 1.1528 | 1.0094 | 1.535/55.78 | 2.3894 | −0.2937 |
| Asphere | 3.2643 | 0.4501 | | 1.9289 | 9.8130 |
| Plano | Inf | 0.2465 | | 1.1249 | |
| Asphere | −2.4379 | 0.2893 | 1.535/55.78 | 1.2330 | −725.2177 |
| Asphere | −6.1552 | 0.6249 | | 1.3961 | −86.9410 |
| Asphere | −3.8764 | 0.2899 | 1.535/55.78 | 1.6963 | −110.6026 |
| Asphere | 10.6670 | 0.2475 | | 2.0283 | 30.0381 |
| Plano | Inf | 0.2100 | 1.517/64.17 | 2.3257 | |
| Plano | Inf | 0.3539 | | 2.4092 | |
| Plano | Inf | | | 2.6050 | |

In addition, the asphere higher term detailed parameters information of the aspheric lens are fully illustrated and disclosed in Table 5-2 can be fully explained and disclosed.

TABLE 5-2

Fifth Embodiment

| A4 | A6 | A8 | A10 | A12 | A14 | A16 |
|---|---|---|---|---|---|---|
| −4.401E−02 | 2.895E−01 | −8.084E−01 | 1.300E+00 | −1.193E+00 | 5.974E−01 | −1.284E−01 |
| −5.346E−02 | 5.182E−01 | −3.062E+00 | 8.853E+00 | −1.404E+01 | 1.126E+01 | −3.620E+00 |
| −1.722E+00 | 1.357E+01 | −8.563E+01 | 3.346E+02 | −7.576E+02 | 8.557E+02 | −3.214E+02 |
| −1.076E−01 | 1.256E−01 | −7.776E−01 | 4.240E+00 | −5.035E+00 | −9.900E+00 | 2.012E+01 |
| −6.401E−01 | 9.344E−01 | −2.556E+00 | 5.930E+00 | −7.946E+00 | 3.884E+00 | 2.235E−01 |
| −3.715E−01 | 1.697E−01 | −4.631E−02 | −1.015E−01 | 1.390E−01 | −1.617E−01 | 6.781E−02 |

In the fifth embodiment, the distance from the first lens object side surface 1200 to the imaging surface 1111 on the optical axis is TTL and is implemented as TTL=3.721.

In the fifth embodiment, the focal length of the camera optics lens assembly is f and is implemented as f=4.154; and TTL/f=0.896, which is accord with the range of the condition 1 (TTL/f<0.9).

In the fifth embodiment, the focal length of the first lens 1000 is f1 and is implemented as f1=2.893; and the f1/f=0.697, which is accord with the range of the condition 2 (0.6<f1/f<1.0).

In the fifth embodiment, the focal length of the second lens 2000 is f2 and is implemented as f2=−7.848.

In the fifth embodiment, the focal length of the third lens 3000 is f3 and is implemented as f3=−5.342.

In the fifth embodiment, the effective radius of the first lens object side surface 1200 is SD11 and the effective radius of the third lens imaging side surface 3100 is SD32, which is implemented as SD11/SD32=1.178 and which is accord with the range of the condition 3 (0.6<SD11/SD32<1.5).

In the fifth embodiment, the center thickness of the first lens 1000 is CT1 (a distance from the first lens imaging side surface 1100 to the first lens object side surface 1200 on the optical axis), which is implemented as CT1/f=0.243, and which is accord with the range of the condition 4 (0.2<CT1/f<0.5).

In the fifth embodiment, the center thickness of the second lens 2000 is CT2 (a distance from the second lens imaging side surface 2100 to the second lens object side surface 2200 on the optical axis), which is implemented as CT2/f=0.07, and which is accord with the range of the condition 5 (0<CT2/f<0.1).

Figure 60:
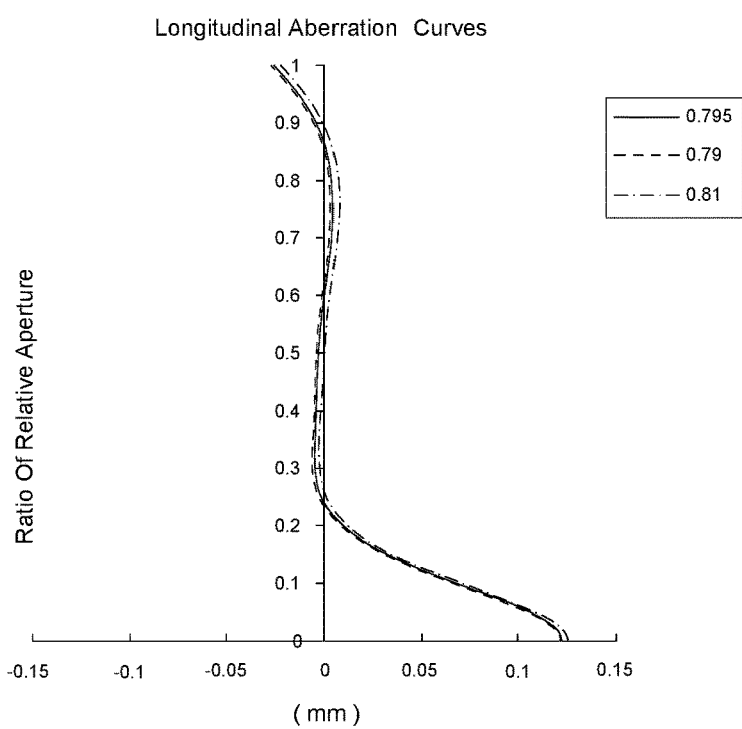
FIG. 60 is an aberration curves schematic view of a camera optics lens assembly according to the above preferred embodiment of the present invention.

As shown in FIG. 60 of the drawings, the aberration curves schematic view of the camera optics lens assembly when the aperture value is 2.0 is illustrated.

Figure 61:
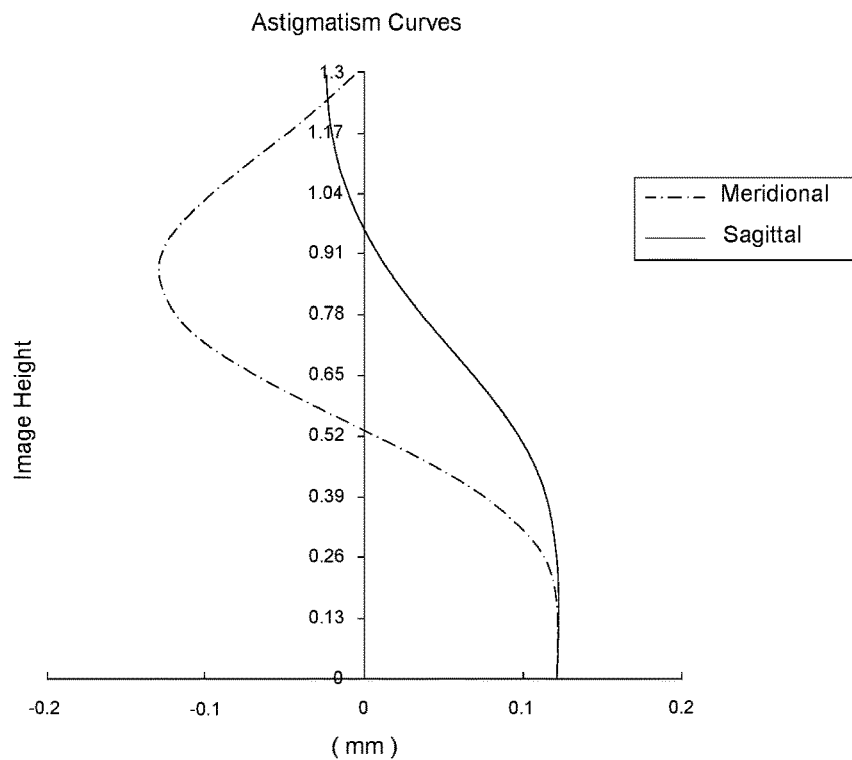
FIG. 61 is an astigmatism curves schematic view of a camera optics lens assembly according to the above preferred embodiment of the present invention.

As shown in FIG. 61 of the drawings, the astigmatism curves schematic view of the camera optics lens assembly when the aperture value is 2.0 is illustrated.

Figure 62:
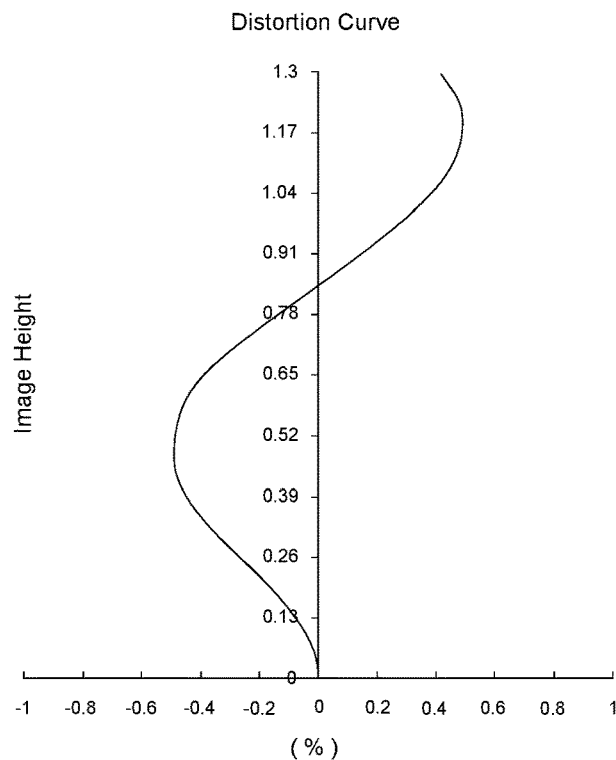
FIG. 62 is a distortion curve schematic view of a camera optics lens assembly according to the above preferred embodiment of the present invention.

As shown in FIG. 62 of the drawings, the distortion curve schematic view of the camera optics lens assembly when the aperture value is 2.0 is illustrated.

Figure 63:
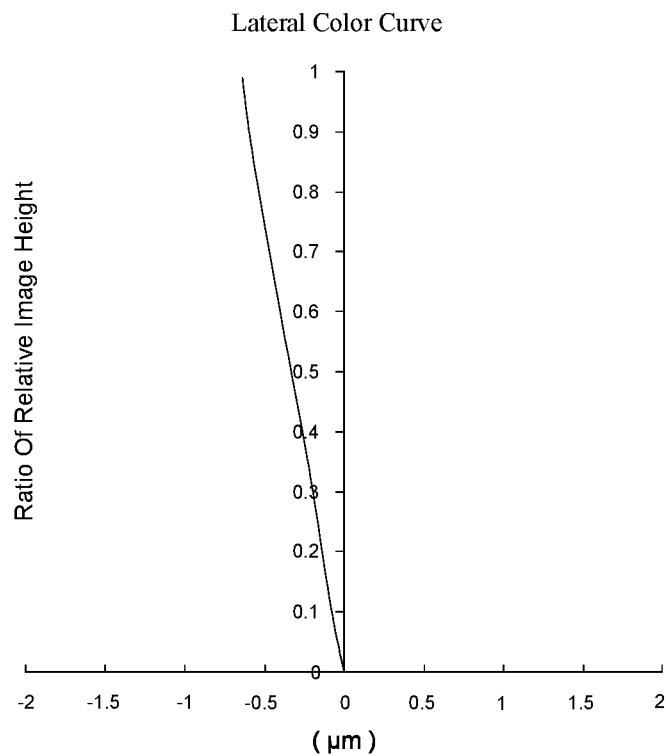
FIG. 63 is a lateral color curve schematic view of a camera optics lens assembly according to the above preferred embodiment of the present invention.

As shown in FIG. 63 of the drawings, the lateral color curve schematic view of the camera optics lens assembly when the aperture value is 2.0 is illustrated.

Figure 64:
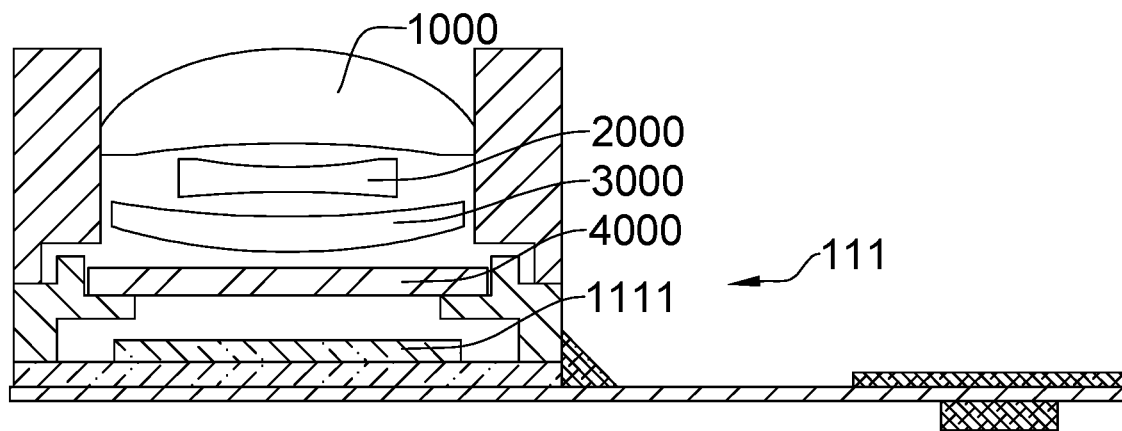
FIG. 64 is a sectional schematic view of the iris camera module of the present invention.

Accordingly, as shown in FIG. 64 of the drawings, the present invention also provides an iris camera module for long-distance user monocular or binoculus iris characteristics collection, and has a clear image, wherein the iris camera module comprises an image sensor chip 111 having an imaging surface 1111, and an camera optics lens assembly. The optical signal collected by the camera optics lens assembly is inverted in the image sensor chip 111 for optical-electrical signal conversion so as to collect user iris characteristics.

Furthermore, the iris camera module further comprises an infrared filter 4000, which is disposed between the third lens 3000 and the image sensor chip 111 for filtering the visible light portion in the optical collected by the camera optics lens assembly, so as to improve the user iris characteristics image accuracy collected by the iris camera module.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An application method for an iris and face recognition system, for a communication between a user and an external system comprising an operating component which comprises an information base, the method comprising the steps of:

(I) capturing iris and facial characteristics of said user by said iris and face recognition system, and generating identification information of said user;

(II) matching said generated identification information of said user with said identification information of said user which is stored in said information base by said operating component; and (III) communicating said user with said external system when said match is succeeded;

wherein said iris and face recognition system comprises:
an iris recognition module to capture iris characteristics of said user, a face recognition module to capture facial characteristics of said user, and
a background processing component, wherein said iris recognition module and said face recognition module are respectively communicatively connected with said background processing component, wherein iris characteristics and facial characteristics of said user which are captured by said iris recognition module and said face recognition module are respectively generated in an image data flow, and said image data flow is transmitted to said background processing component so as to generate said identification information of said user, wherein a horizontal field angle of said face recognition module is greater than a horizontal field angle of said iris recognition module and, accordingly, a vertical field angle of said face recognition module is greater than a vertical field angle of said iris recognition module.

2. The application method for an iris and face recognition system, as recited in claim 1, wherein, before said step (I), further comprises the steps of:
  detecting communication of said external system and said user by said operating component; and
  driving said iris and face recognition system to capture iris and facial characteristics of said user and generating said identification information of said user.

3. The application method for an iris and face recognition system, as recited in claim 2, further comprising the steps of:
  restoring said identification information of said user in said information base, and
  capturing iris and facial characteristics of said user by said iris and face recognition system and generating said identification information of said user to restore in said information base.

4. The application method for an iris and face recognition system, as recited in claim 3, wherein said external system is an apparatus comprising a panel, wherein when said operating component successfully matches said generated identification information of said user with said identification information of said user which is stored in said information base, said panel is opened.

5. The application method for an iris and face recognition system, as recited in claim 3, wherein said external system is an electronic device comprising said operating component, wherein when said operating component successfully matches said generated identification information of said user with said identification information of said user which is stored in said information base, said electronic device is unlocked, wherein when said operating component is failed to match said generated identification information of said user with said identification information of said user which is stored in said information base, said operating component prevents other operations between said user and said electronic device which are not relative to user authentication.

6. The application method for an iris and face recognition system, as recited in claim 3, wherein said external system has an application program coupling with said operation component, wherein when said operating component successfully matches said generated identification information of said user with said identification information of said user which is stored in said information base, said application program is executed, wherein before said operating component successfully matches said generated identification information of said user with said identification information of said user which is stored in said information base, reminder events are generated in said external system.

7. The application method for an iris and face recognition system, as recited in claim 3, wherein said face recognition module further captures iris characteristics of the user.

8. The application method for an iris and face recognition system, as recited in claim 2, wherein said external system is an apparatus comprising a panel, wherein when said operating component successfully matches said generated identification information of said user with said identification information of said user which is stored in said information base, said panel is opened.

9. The application method for an iris and face recognition system, as recited in claim 2, wherein said external system is an electronic device comprising said operating component, wherein when said operating component successfully matches said generated identification information of said user with said identification information of said user which is stored in said information base, said electronic device is unlocked, wherein when said operating component is failed to match said generated identification information of said user with said identification information of said user which is stored in said information base, said operating component prevents other operations between said user and said electronic device which are not relative to user authentication.

10. The application method for an iris and face recognition system, as recited in claim 2, wherein said external system has an application program coupling with said operation component, wherein when said operating component successfully matches said generated identification information of said user with said identification information of said user which is stored in said information base, said application program is executed, wherein before said operating component successfully matches said generated identification information of said user with said identification information of said user which is stored in said information base, reminder events are generated in said external system.

11. The application method for an iris and face recognition system, as recited in claim 1, wherein said external system is an apparatus comprising a panel, wherein when said operating component successfully matches said generated identification information of said user with said identification information of said user which is stored in said information base, said panel is opened.

12. The application method for an iris and face recognition system, as recited in claim 1, wherein said external system is an electronic device comprising said operating component, wherein when said operating component successfully matches said generated identification information of said user with said identification information of said user which is stored in said information base, said electronic device is unlocked, wherein when said operating component is failed to match said generated identification information of said user with said identification information of said user which is stored in said information base, said operating component prevents other operations between said user and said electronic device which are not relative to user authentication.

13. The application method for an iris and face recognition system, as recited in claim 1, wherein said external system has an application program coupling with said operation component, wherein when said operating component successfully matches said generated identification information of said user with said identification information of said user which is stored in said information base, said application program is executed, wherein before said operating component successfully matches said generated identification information of said user with said identification information of said user which is stored in said information base, reminder events are generated in said external system.

14. An online payment method based on an iris and face recognition system, comprising the steps of:
  (α) responding to an online payment event;
  (β) generating identification information of a user, and providing said iris and face recognition system to capture iris and facial characteristics of said user and generating said identification information of said user; and
  (γ) matching said generated identity information of said user with said identification information of said user which is stored in an information base, wherein when said match is succeeded, said response of said online payment event is succeeded;
  wherein said iris and face recognition system comprises:
  an iris recognition module to capture iris characteristics of the user, a face recognition module to capture facial characteristics of said user, and a background processing component, wherein said iris recognition module and said face recognition module are respectively communicatively connected with said background processing component, wherein iris characteristics and facial characteristics of said user which are captured by said iris recognition module and said face recognition module are respectively generated in an image data flow, and said image data flow is transmitted to said background processing component so as to generate said identification information of said user, wherein a horizontal field angle of said face recognition module is greater than a horizontal field angle of said iris recognition module and, accordingly, a vertical field angle of said face recognition module is greater than a vertical field angle of said iris recognition module.

15. The online payment method, as recited in claim 14, after the step (α), further comprising the steps of:

generating reminder events so as to remind said user for user authentication, and locking said online payment event after a response failing time of online payment event exceeds a preset time.

\* \* \* \* \*